United States Patent
Shiels et al.

(10) Patent No.: US 12,467,489 B2
(45) Date of Patent: Nov. 11, 2025

(54) TECHNIQUES FOR SECURING TOGETHER COMPONENTS OF ONE OR MORE SURGICAL CARTS

(71) Applicant: MAKO Surgical Corp., Weston, FL (US)

(72) Inventors: Paul Shiels, Albuquerque, NM (US); Mohammad Salaheldin Sallam, Jensen Beach, FL (US)

(73) Assignee: MAKO Surgical Corp., Weston, FL (US)

( * ) Notice: Subject to any disclaimer, the term of this patent is extended or adjusted under 35 U.S.C. 154(b) by 434 days.

(21) Appl. No.: 18/122,450

(22) Filed: Mar. 16, 2023

(65) Prior Publication Data
US 2023/0296121 A1 Sep. 21, 2023

Related U.S. Application Data

(60) Provisional application No. 63/320,812, filed on Mar. 17, 2022.

(51) Int. Cl.
*F16B 2/02* (2006.01)
*A61B 34/00* (2016.01)
(Continued)

(52) U.S. Cl.
CPC ............... *F16B 2/02* (2013.01); *A61B 34/25* (2016.02); *A61B 50/13* (2016.02); *A61B 90/50* (2016.02);
(Continued)

(58) Field of Classification Search
CPC . F16B 2/02; A61B 34/25; A61B 50/13; A61B 90/50; B25J 5/007; B25J 9/1697; B62B 3/10
See application file for complete search history.

(56) References Cited

U.S. PATENT DOCUMENTS

| 2,416,910 A | 3/1947 | Crosby et al. |
|---|---|---|
| 4,515,333 A | 5/1985 | Pugh et al. |

(Continued)

FOREIGN PATENT DOCUMENTS

| DE | 102016206541 A1 | 10/2017 |
|---|---|---|
| EP | 0470939 B1 | 12/1994 |

(Continued)

OTHER PUBLICATIONS

English language abstract and machine-assisted English translation for JP 2968513 B1 extracted from espacenet.com database on Mar. 20, 2023, 6 pages.

(Continued)

*Primary Examiner* — John D Walters
(74) *Attorney, Agent, or Firm* — Howard & Howard Attorneys PLLC

(57) ABSTRACT

A surgical cart includes a base and a plurality of wheels. The surgical cart also includes a first device coupled to the base and moveable relative to the base, and a first docking feature coupled to the base. The surgical cart further includes a second device coupled to the base and moveable relative to the base, and a second docking feature coupled to the second device. The surgical cart further includes a third device coupled to the base and a third docking feature coupled to the third device. The first docking feature is engageable with the second docking feature to selectively couple the first device and the second device together, and the third docking feature is engageable with the first docking feature and the second docking feature to selectively engage the first docking feature, the second docking feature, and the third docking feature together.

20 Claims, 29 Drawing Sheets

(51) Int. Cl.
*A61B 34/20* (2016.01)
*A61B 50/13* (2016.01)
*A61B 90/50* (2016.01)
*B25J 5/00* (2006.01)
*B25J 9/16* (2006.01)
*B62B 3/10* (2006.01)

(52) U.S. Cl.
CPC .............. *B25J 5/007* (2013.01); *B25J 9/1697* (2013.01); *B62B 3/10* (2013.01)

(56) References Cited

U.S. PATENT DOCUMENTS

| | | |
|---|---|---|
| 4,607,897 A | 8/1986 | Schwartz |
| 4,625,731 A | 12/1986 | Quedens et al. |
| 4,700,922 A | 10/1987 | Gross |
| 5,251,127 A | 10/1993 | Raab |
| 5,305,203 A | 4/1994 | Raab |
| 5,515,478 A | 5/1996 | Wang |
| 5,524,180 A | 6/1996 | Wang et al. |
| 5,553,198 A | 9/1996 | Wang et al. |
| 5,603,328 A | 2/1997 | Zucker et al. |
| 5,609,316 A | 3/1997 | Tigliev |
| 5,657,429 A | 8/1997 | Wang et al. |
| 5,732,712 A | 3/1998 | Adair |
| 5,748,767 A | 5/1998 | Raab |
| 5,754,741 A | 5/1998 | Wang et al. |
| 5,762,458 A | 6/1998 | Wang et al. |
| 5,765,565 A | 6/1998 | Adair |
| 5,815,640 A | 9/1998 | Wang et al. |
| 5,841,950 A | 11/1998 | Wang et al. |
| 5,855,583 A | 1/1999 | Wang et al. |
| 5,878,193 A | 3/1999 | Wang et al. |
| 5,907,664 A | 5/1999 | Wang et al. |
| 5,921,523 A | 7/1999 | South et al. |
| 5,933,191 A | 8/1999 | Ariga et al. |
| 5,961,527 A | 10/1999 | Whitmore, III et al. |
| 5,970,980 A | 10/1999 | Adair |
| 5,971,976 A | 10/1999 | Wang et al. |
| 6,001,108 A | 12/1999 | Wang et al. |
| 6,007,550 A | 12/1999 | Wang et al. |
| 6,063,095 A | 5/2000 | Wang et al. |
| 6,098,936 A | 8/2000 | Birrell |
| 6,102,850 A | 8/2000 | Wang et al. |
| 6,132,441 A | 10/2000 | Grace |
| 6,160,582 A | 12/2000 | Hill |
| 6,197,017 B1 | 3/2001 | Brock et al. |
| 6,226,548 B1 | 5/2001 | Foley et al. |
| 6,244,809 B1 | 6/2001 | Wang et al. |
| 6,248,101 B1 | 6/2001 | Whitmore, III et al. |
| 6,339,410 B1 | 1/2002 | Milner et al. |
| 6,386,742 B1 | 5/2002 | DeLine et al. |
| 6,424,885 B1 | 7/2002 | Niemeyer et al. |
| 6,432,112 B2 | 8/2002 | Brock et al. |
| 6,436,107 B1 | 8/2002 | Wang et al. |
| 6,445,287 B1 | 9/2002 | Schofield et al. |
| 6,466,432 B1 | 10/2002 | Beger |
| 6,471,363 B2 | 10/2002 | Howell et al. |
| 6,493,220 B1 | 12/2002 | Clark et al. |
| 6,554,472 B1 | 4/2003 | Dietz et al. |
| 6,554,844 B2 | 4/2003 | Lee et al. |
| 6,628,457 B2 | 9/2003 | Ito |
| 6,639,623 B2 | 10/2003 | Howell et al. |
| 6,640,128 B2 | 10/2003 | Vilsmeier et al. |
| 6,661,571 B1 | 12/2003 | Shioda et al. |
| 6,669,639 B1 | 12/2003 | Miller et al. |
| 6,671,581 B2 | 12/2003 | Niemeyer et al. |
| 6,692,485 B1 | 2/2004 | Brock et al. |
| 6,694,162 B2 | 2/2004 | Hartlep |
| 6,695,270 B1 | 2/2004 | Smed |
| 6,699,177 B1 | 3/2004 | Wang et al. |
| 6,714,839 B2 | 3/2004 | Salisbury, Jr. et al. |
| 6,721,178 B1 | 4/2004 | Clark et al. |
| 6,779,767 B2 | 8/2004 | Kuhn |
| 6,804,581 B2 | 10/2004 | Wang et al. |
| 6,810,281 B2 | 10/2004 | Brock et al. |
| 6,834,837 B2 | 12/2004 | Schilt et al. |
| 6,843,793 B2 | 1/2005 | Brock et al. |
| 6,860,878 B2 | 3/2005 | Brock |
| 6,863,417 B2 | 3/2005 | Hill |
| 6,891,518 B2 | 5/2005 | Sauer et al. |
| 6,899,442 B2 | 5/2005 | Howell et al. |
| 6,905,460 B2 | 6/2005 | Wang et al. |
| 6,905,491 B1 | 6/2005 | Wang et al. |
| 6,919,867 B2 | 7/2005 | Sauer |
| 6,947,783 B2 | 9/2005 | Immerz |
| 6,949,106 B2 | 9/2005 | Brock et al. |
| 6,985,765 B2 | 1/2006 | Morita et al. |
| 6,994,703 B2 | 2/2006 | Wang et al. |
| 6,999,849 B2 | 2/2006 | Bridges |
| 7,009,840 B2 | 3/2006 | Clark et al. |
| 7,025,064 B2 | 4/2006 | Wang et al. |
| 7,025,761 B2 | 4/2006 | Wang et al. |
| 7,027,892 B2 | 4/2006 | Wang et al. |
| 7,066,433 B2 | 6/2006 | Oddsen, Jr. |
| 7,073,765 B2 | 7/2006 | Newkirk |
| 7,074,179 B2 | 7/2006 | Wang et al. |
| 7,083,571 B2 | 8/2006 | Wang et al. |
| 7,090,683 B2 | 8/2006 | Brock et al. |
| 7,097,145 B2 | 8/2006 | Turner |
| 7,118,582 B1 | 10/2006 | Wang et al. |
| 7,155,315 B2 | 12/2006 | Niemeyer et al. |
| 7,169,141 B2 | 1/2007 | Brock et al. |
| 7,214,230 B2 | 5/2007 | Brock et al. |
| 7,297,142 B2 | 11/2007 | Brock |
| 7,319,897 B2 | 1/2008 | Leitner et al. |
| 7,371,210 B2 | 5/2008 | Brock et al. |
| 7,390,325 B2 | 6/2008 | Wang et al. |
| 7,410,138 B2 | 8/2008 | Parsons |
| 7,432,949 B2 | 10/2008 | Remy et al. |
| 7,448,583 B2 | 11/2008 | Kim et al. |
| 7,507,199 B2 | 3/2009 | Wang et al. |
| 7,542,791 B2 | 6/2009 | Mire et al. |
| 7,562,883 B2 | 7/2009 | Livengood et al. |
| 7,581,708 B2 | 9/2009 | Newkirk |
| 7,604,642 B2 | 10/2009 | Brock |
| 7,608,083 B2 | 10/2009 | Lee et al. |
| 7,612,999 B2 | 11/2009 | Clark et al. |
| 7,660,623 B2 | 2/2010 | Hunter et al. |
| 7,677,129 B2 | 3/2010 | Schena et al. |
| 7,695,481 B2 | 4/2010 | Wang et al. |
| 7,699,835 B2 | 4/2010 | Lee et al. |
| 7,708,404 B2 | 5/2010 | Gaida et al. |
| 7,713,190 B2 | 5/2010 | Brock et al. |
| 7,725,162 B2 | 5/2010 | Malackowski et al. |
| 7,727,185 B2 | 6/2010 | Weitzner et al. |
| 7,744,608 B2 | 6/2010 | Lee et al. |
| 7,744,622 B2 | 6/2010 | Brock et al. |
| 7,758,569 B2 | 7/2010 | Brock |
| 7,763,015 B2 | 7/2010 | Cooper et al. |
| 7,766,894 B2 | 8/2010 | Weitzner et al. |
| 7,775,972 B2 | 8/2010 | Brock et al. |
| 7,785,320 B2 | 8/2010 | Wang et al. |
| 7,789,875 B2 | 9/2010 | Brock et al. |
| 7,791,866 B2 | 9/2010 | Clark et al. |
| D626,237 S | 10/2010 | Nordgren et al. |
| 7,806,376 B2 | 10/2010 | Song et al. |
| 7,809,184 B2 | 10/2010 | Neubauer et al. |
| 7,819,884 B2 | 10/2010 | Lee et al. |
| 7,828,252 B2 | 11/2010 | Parsons |
| 7,831,295 B2 | 11/2010 | Friedrich |
| 7,837,674 B2 | 11/2010 | Cooper |
| 7,841,979 B2 | 11/2010 | Hirose |
| 7,854,738 B2 | 12/2010 | Lee et al. |
| 7,867,241 B2 | 1/2011 | Brock et al. |
| 7,894,872 B2 | 2/2011 | Sherman |
| 7,901,399 B2 | 3/2011 | Brock |
| 7,905,828 B2 | 3/2011 | Brock et al. |
| 7,914,521 B2 | 3/2011 | Wang et al. |
| 7,918,861 B2 | 4/2011 | Brock et al. |
| 7,931,586 B2 | 4/2011 | Brock et al. |
| 7,955,316 B2 | 6/2011 | Weitzner et al. |
| 7,974,677 B2 | 7/2011 | Mire et al. |
| 7,982,763 B2 | 7/2011 | King |

(56) References Cited

U.S. PATENT DOCUMENTS

| | | |
|---|---|---|
| 7,988,627 B2 | 8/2011 | Bagan |
| 7,988,628 B2 | 8/2011 | Bagan |
| 7,990,691 B2 | 8/2011 | Clark et al. |
| 8,010,177 B2 | 8/2011 | Csavoy et al. |
| 8,108,025 B2 | 1/2012 | Csavoy et al. |
| 8,114,097 B2 | 2/2012 | Brock et al. |
| 8,128,041 B2 | 3/2012 | Parsons |
| 8,147,494 B2 | 4/2012 | Leitner et al. |
| 8,165,658 B2 | 4/2012 | Waynik et al. |
| 8,187,229 B2 | 5/2012 | Weitzner et al. |
| 8,191,909 B2 | 6/2012 | Livengood et al. |
| 8,201,781 B2 | 6/2012 | Parsons |
| 8,241,306 B2 | 8/2012 | Grace |
| 8,265,734 B2 * | 9/2012 | Ishikawa ............ A61B 90/50 600/407 |
| 8,292,916 B2 | 10/2012 | Grace |
| 8,301,226 B2 | 10/2012 | Csavoy et al. |
| 8,303,576 B2 | 11/2012 | Brock |
| 8,310,468 B2 | 11/2012 | Martin |
| 8,311,611 B2 | 11/2012 | Csavoy et al. |
| 8,335,552 B2 | 12/2012 | Stiles |
| 8,342,054 B2 | 1/2013 | Schena et al. |
| 8,348,931 B2 | 1/2013 | Cooper et al. |
| 8,398,042 B2 | 3/2013 | Hardy et al. |
| 8,403,274 B1 | 3/2013 | Parsons |
| 8,411,131 B2 | 4/2013 | King |
| 8,414,505 B1 | 4/2013 | Weitzner et al. |
| 8,414,598 B2 | 4/2013 | Brock et al. |
| 8,424,833 B2 | 4/2013 | Muller et al. |
| 8,438,979 B2 | 5/2013 | Song et al. |
| 8,465,476 B2 | 6/2013 | Rogers et al. |
| 8,467,852 B2 | 6/2013 | Csavoy et al. |
| 8,474,771 B2 | 7/2013 | Ross |
| 8,500,722 B2 | 8/2013 | Cooper |
| 8,506,555 B2 | 8/2013 | Ruiz Morales |
| 8,521,331 B2 | 8/2013 | Itkowitz |
| 8,526,176 B2 | 9/2013 | Clark et al. |
| 8,543,240 B2 | 9/2013 | Itkowitz et al. |
| 8,545,515 B2 | 10/2013 | Prisco et al. |
| 8,551,115 B2 | 10/2013 | Steger et al. |
| 8,603,068 B2 | 12/2013 | Weitzner et al. |
| 8,623,028 B2 | 1/2014 | Rogers et al. |
| 8,662,605 B2 | 3/2014 | McRorie et al. |
| 8,670,017 B2 | 3/2014 | Stuart et al. |
| 8,682,489 B2 | 3/2014 | Itkowitz et al. |
| 8,684,952 B2 | 4/2014 | Weitzner et al. |
| 8,690,773 B2 | 4/2014 | Bagan |
| 8,702,045 B1 | 4/2014 | Parsons |
| 8,708,561 B2 | 4/2014 | Eaves |
| 8,734,466 B2 | 5/2014 | Appenrodt et al. |
| 8,773,270 B2 | 7/2014 | Paydar et al. |
| 8,831,782 B2 | 9/2014 | Itkowitz |
| 8,834,489 B2 | 9/2014 | Cooper et al. |
| 8,845,681 B2 | 9/2014 | Grace |
| 8,858,423 B2 | 10/2014 | Yasunaga et al. |
| 8,882,777 B2 | 11/2014 | Heavener et al. |
| 8,888,764 B2 | 11/2014 | Devengenzo et al. |
| 8,888,789 B2 | 11/2014 | Prisco et al. |
| 8,935,003 B2 | 1/2015 | Itkowitz et al. |
| 8,961,011 B2 | 2/2015 | Lalena |
| D724,736 S | 3/2015 | Kim |
| 8,996,165 B2 | 3/2015 | Wang et al. |
| 8,996,173 B2 | 3/2015 | Itkowitz et al. |
| 9,002,076 B2 | 4/2015 | Khadem et al. |
| 9,008,752 B2 | 4/2015 | Stiles |
| D728,790 S | 5/2015 | Kim |
| 9,023,060 B2 | 5/2015 | Cooper et al. |
| D735,342 S | 7/2015 | Asad et al. |
| 9,089,972 B2 | 7/2015 | Stuart et al. |
| 9,108,318 B2 | 8/2015 | Diolaiti |
| 9,168,103 B2 | 10/2015 | Hladio et al. |
| 9,179,832 B2 | 11/2015 | Diolaiti |
| 9,179,984 B2 | 11/2015 | Teichman et al. |
| 9,228,696 B2 | 1/2016 | Borloz et al. |
| 9,247,998 B2 | 2/2016 | Hladio et al. |
| 9,254,178 B2 | 2/2016 | Prisco et al. |
| 9,256,911 B1 | 2/2016 | Parsons |
| 9,259,274 B2 | 2/2016 | Prisco |
| 9,277,812 B2 | 3/2016 | Bennett et al. |
| 9,283,048 B2 | 3/2016 | Kostrzewski et al. |
| 9,283,050 B2 | 3/2016 | Prisco et al. |
| 9,289,270 B2 | 3/2016 | Gielen et al. |
| 9,291,793 B2 | 3/2016 | Cooper |
| 9,295,524 B2 | 3/2016 | Schena et al. |
| 9,358,074 B2 | 6/2016 | Schena et al. |
| 9,389,643 B1 | 7/2016 | Clark et al. |
| 9,393,361 B2 | 7/2016 | Stiles |
| 9,398,675 B2 | 7/2016 | Eaves |
| 9,402,619 B2 | 8/2016 | Grace |
| 9,452,020 B2 | 9/2016 | Griffiths et al. |
| 9,456,828 B2 | 10/2016 | Kerboul et al. |
| 9,504,447 B2 | 11/2016 | Messina et al. |
| 9,523,534 B2 | 12/2016 | Paydar et al. |
| 9,568,147 B2 | 2/2017 | Borloz et al. |
| 9,572,630 B2 | 2/2017 | Haimerl |
| 9,583,803 B2 | 2/2017 | Miller et al. |
| 9,587,792 B1 | 3/2017 | Parsons |
| 9,587,878 B2 | 3/2017 | Paydar et al. |
| 9,597,153 B2 | 3/2017 | Mohr et al. |
| 9,597,154 B2 | 3/2017 | Simon et al. |
| 9,600,631 B2 | 3/2017 | Stuart et al. |
| 9,622,721 B2 | 4/2017 | Nakajima |
| 9,649,500 B2 | 5/2017 | Ries |
| 9,655,749 B2 | 5/2017 | Hladio et al. |
| 9,666,915 B2 | 5/2017 | Miller et al. |
| 9,668,768 B2 | 6/2017 | Piron et al. |
| 9,717,563 B2 | 8/2017 | Tognaccini et al. |
| 9,743,989 B2 | 8/2017 | Itkowitz et al. |
| 9,759,371 B2 | 9/2017 | Borloz et al. |
| 9,782,159 B2 | 10/2017 | Tesar |
| 9,814,527 B2 | 11/2017 | Rogers et al. |
| 9,827,054 B2 | 11/2017 | Richmond et al. |
| 9,827,060 B2 | 11/2017 | Jagga |
| 9,837,646 B2 | 12/2017 | Miller et al. |
| 9,855,023 B2 | 1/2018 | Messina et al. |
| 9,859,594 B2 | 1/2018 | Miller et al. |
| 9,867,721 B2 | 1/2018 | Hunter |
| 9,877,792 B2 | 1/2018 | Cooper |
| 9,901,402 B2 | 2/2018 | Itkowitz et al. |
| 9,914,211 B2 | 3/2018 | Hynna et al. |
| 9,925,013 B2 | 3/2018 | Dell et al. |
| 9,931,173 B2 | 4/2018 | Prisco et al. |
| 9,936,879 B2 | 4/2018 | Piron |
| 9,949,800 B2 | 4/2018 | Prisco et al. |
| 9,955,859 B2 | 5/2018 | Diolaiti |
| 9,968,405 B2 | 5/2018 | Cooper et al. |
| 9,973,736 B2 | 5/2018 | Roberts et al. |
| 9,974,622 B2 | 5/2018 | Franjic et al. |
| 9,976,801 B2 | 5/2018 | Paydar et al. |
| 9,979,786 B2 | 5/2018 | Abu-Tarif et al. |
| 9,990,776 B2 | 6/2018 | Jagga et al. |
| 9,991,753 B2 | 6/2018 | Miller et al. |
| 10,022,194 B2 | 7/2018 | Prisco |
| 10,026,174 B2 | 7/2018 | Piron et al. |
| 10,028,651 B2 | 7/2018 | Tesar |
| 10,028,788 B2 | 7/2018 | Kang |
| 10,028,795 B2 | 7/2018 | Choi et al. |
| 10,034,716 B2 | 7/2018 | Crawford et al. |
| 10,034,718 B2 | 7/2018 | Griffiths et al. |
| 10,034,721 B1 | 7/2018 | Timm et al. |
| D827,139 S | 8/2018 | Henderson et al. |
| 10,045,829 B1 | 8/2018 | Norman et al. |
| 10,056,790 B2 | 8/2018 | Miller et al. |
| 10,058,394 B2 | 8/2018 | Johnson et al. |
| 10,064,689 B2 | 9/2018 | Swarup et al. |
| 10,070,931 B2 | 9/2018 | Itkowitz et al. |
| 10,070,940 B2 | 9/2018 | Bailey et al. |
| 10,071,488 B2 | 9/2018 | Robinson et al. |
| 10,073,950 B2 | 9/2018 | Wang et al. |
| 10,074,837 B2 | 9/2018 | Miller et al. |
| 10,098,074 B2 | 10/2018 | Baker et al. |
| 10,098,704 B2 | 10/2018 | Bowling et al. |
| 10,123,842 B2 | 11/2018 | Iceman et al. |
| 10,143,525 B2 | 12/2018 | Schena et al. |

(56) References Cited

U.S. PATENT DOCUMENTS

| | | |
|---|---|---|
| 10,154,239 B2 | 12/2018 | Casas |
| 10,188,477 B1 | 1/2019 | Norman et al. |
| 10,194,131 B2 | 1/2019 | Casas |
| 10,194,996 B2 | 2/2019 | Bakirtzian et al. |
| 10,206,749 B2 | 2/2019 | Cleary et al. |
| 10,231,791 B2 | 3/2019 | LeBoeuf, II et al. |
| 10,231,792 B2 | 3/2019 | Shiels et al. |
| 10,245,069 B2 | 4/2019 | Rogers et al. |
| 10,265,057 B2 | 4/2019 | Herzlinger et al. |
| 10,265,854 B2 | 4/2019 | Chen et al. |
| 10,292,771 B2 | 5/2019 | Wood et al. |
| 10,299,759 B2 | 5/2019 | Messina et al. |
| 10,314,662 B2 | 6/2019 | Jagga |
| 10,326,975 B2 | 6/2019 | Casas |
| 10,335,244 B2 | 7/2019 | Norman et al. |
| 10,339,719 B2 | 7/2019 | Jagga et al. |
| 10,342,625 B2 | 7/2019 | Loh et al. |
| 10,383,518 B2 | 8/2019 | Abu-Tarif et al. |
| D859,422 S | 9/2019 | Borloz et al. |
| 10,400,946 B2 | 9/2019 | Bennett et al. |
| 10,420,616 B2 | 9/2019 | Kostrzewski et al. |
| 10,463,447 B2 | 11/2019 | Sela et al. |
| 10,499,997 B2 | 12/2019 | Weinstein et al. |
| 10,511,822 B2 | 12/2019 | Casas |
| 10,531,927 B2 | 1/2020 | Crawford et al. |
| 10,548,681 B2 | 2/2020 | Seong et al. |
| 10,568,499 B2 | 2/2020 | Tesar |
| 10,568,704 B2 | 2/2020 | Savall et al. |
| 10,573,087 B2 | 2/2020 | Gallop et al. |
| 10,582,981 B2 * | 3/2020 | Childs .................... A61B 50/26 |
| 10,588,699 B2 | 3/2020 | Richmond et al. |
| 10,588,709 B2 | 3/2020 | Johnson |
| 10,593,052 B2 | 3/2020 | Abhari et al. |
| 10,594,998 B1 | 3/2020 | Casas |
| 10,602,114 B2 | 3/2020 | Casas |
| 10,631,820 B2 | 4/2020 | Takeda |
| 10,646,280 B2 | 5/2020 | Crawford et al. |
| 10,646,290 B2 | 5/2020 | Dell et al. |
| 10,646,298 B2 | 5/2020 | Johnson |
| 10,675,094 B2 | 6/2020 | Crawford et al. |
| 10,675,096 B2 | 6/2020 | Utz et al. |
| 10,682,193 B2 | 6/2020 | Choi et al. |
| 10,687,902 B2 | 6/2020 | Huang et al. |
| 10,695,028 B2 | 6/2020 | Zhao et al. |
| 10,702,353 B2 | 7/2020 | Tesar |
| 10,709,520 B2 | 7/2020 | Bailey et al. |
| 10,722,399 B2 * | 7/2020 | Rill .................... A61F 9/00834 |
| 10,739,827 B2 | 8/2020 | Choi et al. |
| 10,779,890 B2 | 9/2020 | Weir |
| 10,786,314 B2 | 9/2020 | Wood et al. |
| 10,792,119 B2 | 10/2020 | Timm et al. |
| 10,799,314 B2 | 10/2020 | Beaumont |
| 10,818,101 B2 | 10/2020 | Gallop et al. |
| 10,828,104 B2 | 11/2020 | Jagga et al. |
| 10,828,114 B2 | 11/2020 | Abhari et al. |
| 10,841,556 B2 | 11/2020 | Casas |
| 10,874,466 B2 | 12/2020 | Crawford et al. |
| 10,887,545 B2 | 1/2021 | Stuart et al. |
| 10,898,283 B2 | 1/2021 | Cleary et al. |
| 10,917,543 B2 | 2/2021 | Ramirez Luna et al. |
| 10,918,453 B2 | 2/2021 | Johnson |
| 10,925,681 B2 | 2/2021 | Johnson et al. |
| 10,932,766 B2 | 3/2021 | Tesar et al. |
| 10,948,946 B2 | 3/2021 | Borloz et al. |
| 10,959,783 B2 | 3/2021 | Gregerson et al. |
| 11,065,069 B2 | 7/2021 | Kang et al. |
| 2001/0030683 A1 | 10/2001 | Howell et al. |
| 2001/0034530 A1 | 10/2001 | Malackowski et al. |
| 2001/0055062 A1 | 12/2001 | Shioda et al. |
| 2002/0080016 A1 | 6/2002 | Keirstead |
| 2003/0091152 A1 | 5/2003 | Dietz et al. |
| 2003/0160142 A1 | 8/2003 | Brahler et al. |
| 2003/0164200 A1 | 9/2003 | Czeranna et al. |
| 2004/0019406 A1 | 1/2004 | Wang et al. |
| 2004/0145457 A1 | 7/2004 | Schofield et al. |
| 2004/0179332 A1 | 9/2004 | Smith et al. |
| 2004/0246469 A1 | 12/2004 | Hirose |
| 2004/0251390 A1 | 12/2004 | Wachob |
| 2005/0043615 A1 | 2/2005 | Natsumi et al. |
| 2005/0062238 A1 | 3/2005 | Broadfield et al. |
| 2005/0154295 A1 | 7/2005 | Quistgaard et al. |
| 2005/0242261 A1 | 11/2005 | Brahler et al. |
| 2007/0106128 A1 | 5/2007 | Lavallee |
| 2007/0225690 A1 | 9/2007 | Sekiguchi et al. |
| 2008/0234577 A1 | 9/2008 | Murkowski et al. |
| 2010/0243590 A1 | 9/2010 | Ross |
| 2011/0082462 A1 | 4/2011 | Suarez et al. |
| 2014/0236178 A1 | 8/2014 | Hyodo et al. |
| 2015/0297311 A1 | 10/2015 | Tesar |
| 2016/0095779 A1 | 4/2016 | Canady et al. |
| 2016/0119593 A1 | 4/2016 | Schultz et al. |
| 2016/0220320 A1 | 8/2016 | Crawford et al. |
| 2016/0242858 A1 | 8/2016 | Moctezuma de la Barrera et al. |
| 2016/0256225 A1 | 9/2016 | Crawford et al. |
| 2017/0020627 A1 | 1/2017 | Tesar et al. |
| 2017/0143442 A1 | 5/2017 | Tesar et al. |
| 2017/0172669 A1 | 6/2017 | Berkowitz et al. |
| 2017/0202634 A1 | 7/2017 | Gassner et al. |
| 2017/0215979 A1 | 8/2017 | Childs et al. |
| 2017/0239013 A1 | 8/2017 | Frame et al. |
| 2017/0245951 A1 | 8/2017 | Crawford et al. |
| 2017/0251990 A1 | 9/2017 | Kheradpir et al. |
| 2017/0252112 A1 | 9/2017 | Crawford et al. |
| 2017/0252114 A1 | 9/2017 | Crawford et al. |
| 2017/0258535 A1 | 9/2017 | Crawford et al. |
| 2017/0265774 A1 | 9/2017 | Johnson et al. |
| 2017/0273715 A1 | 9/2017 | Piron et al. |
| 2017/0290633 A1 | 10/2017 | Burke et al. |
| 2017/0296384 A1 * | 10/2017 | Fleischmann .......... A61B 90/50 |
| 2017/0304009 A1 | 10/2017 | Kheradpir et al. |
| 2017/0304013 A1 | 10/2017 | Crawford et al. |
| 2017/0304020 A1 | 10/2017 | Ng et al. |
| 2017/0305016 A1 | 10/2017 | Larkin et al. |
| 2017/0311843 A1 | 11/2017 | Bailey et al. |
| 2017/0316705 A1 | 11/2017 | Schultz et al. |
| 2017/0340483 A1 | 11/2017 | Rill et al. |
| 2017/0348061 A1 | 12/2017 | Joshi et al. |
| 2018/0064497 A1 | 3/2018 | Hussain et al. |
| 2018/0147018 A1 | 5/2018 | Crawford et al. |
| 2018/0177523 A1 | 6/2018 | Piron et al. |
| 2018/0207794 A1 | 7/2018 | Sebring et al. |
| 2018/0214221 A1 | 8/2018 | Crawford et al. |
| 2018/0228559 A1 | 8/2018 | Brierton et al. |
| 2018/0235715 A1 | 8/2018 | Amiot et al. |
| 2018/0256270 A1 | 9/2018 | Cooper et al. |
| 2018/0279993 A1 | 10/2018 | Crawford et al. |
| 2018/0280095 A1 | 10/2018 | Lattimore |
| 2018/0296283 A1 | 10/2018 | Crawford et al. |
| 2018/0296299 A1 | 10/2018 | Iceman |
| 2018/0318020 A1 | 11/2018 | Thompson et al. |
| 2018/0333213 A1 | 11/2018 | Johnson et al. |
| 2018/0333215 A1 | 11/2018 | Timm et al. |
| 2018/0338796 A1 | 11/2018 | Yao et al. |
| 2018/0360550 A1 | 12/2018 | Nakanishi |
| 2018/0362060 A1 | 12/2018 | Schaller et al. |
| 2018/0368656 A1 | 12/2018 | Austin et al. |
| 2019/0000571 A1 | 1/2019 | Johnson et al. |
| 2019/0021799 A1 | 1/2019 | Crawford et al. |
| 2019/0021800 A1 | 1/2019 | Crawford et al. |
| 2019/0029765 A1 | 1/2019 | Crawford et al. |
| 2019/0038366 A1 | 2/2019 | Johnson et al. |
| 2019/0053700 A1 | 2/2019 | Tesar |
| 2019/0083178 A1 | 3/2019 | Mata et al. |
| 2019/0099222 A1 | 4/2019 | Nahum et al. |
| 2019/0105116 A1 | 4/2019 | Johnson et al. |
| 2019/0117313 A1 | 4/2019 | Crawford |
| 2019/0167356 A1 | 6/2019 | Britton et al. |
| 2019/0167377 A1 | 6/2019 | Hirose et al. |
| 2019/0199915 A1 | 6/2019 | Coiseur |
| 2019/0209262 A1 | 7/2019 | Mustufa et al. |
| 2019/0231447 A1 | 8/2019 | Ebbitt et al. |
| 2019/0231460 A1 | 8/2019 | DiMaio et al. |
| 2019/0254759 A1 | 8/2019 | Azizian |
| 2019/0254763 A1 | 8/2019 | Lambrecht et al. |

(56) References Cited

U.S. PATENT DOCUMENTS

| | | |
|---|---|---|
| 2019/0269467 A1 | 9/2019 | Forsyth et al. |
| 2019/0274765 A1 | 9/2019 | Crawford et al. |
| 2019/0274776 A1 | 9/2019 | Ramirez Luna et al. |
| 2019/0290370 A1 | 9/2019 | Brummund et al. |
| 2019/0380794 A1 | 12/2019 | Al Jewad et al. |
| 2019/0388161 A1 | 12/2019 | Cicchini et al. |
| 2020/0008899 A1 | 1/2020 | Tripathi et al. |
| 2020/0059640 A1 | 2/2020 | Browd et al. |
| 2020/0060783 A1 | 2/2020 | Seong et al. |
| 2020/0069373 A1 | 3/2020 | Yu et al. |
| 2020/0155241 A1 | 5/2020 | Cascarano et al. |
| 2020/0170723 A1 | 6/2020 | Crawford et al. |
| 2020/0170730 A1 | 6/2020 | Cameron et al. |
| 2020/0179065 A1 | 6/2020 | Crawford et al. |
| 2020/0222124 A1 | 7/2020 | Savall et al. |
| 2020/0229888 A1 | 7/2020 | Crawford et al. |
| 2020/0237445 A1 | 7/2020 | Snyder et al. |
| 2020/0237468 A1 | 7/2020 | Johnson |
| 2020/0278074 A1 | 9/2020 | Borloz et al. |
| 2020/0289224 A1 | 9/2020 | Johnson et al. |
| 2020/0305979 A1 | 10/2020 | Crawford et al. |
| 2020/0315713 A1 | 10/2020 | Markey et al. |
| 2020/0345424 A1 | 11/2020 | Wolfsberger |
| 2020/0345425 A1 | 11/2020 | Wolfsberger |
| 2020/0397531 A1 | 12/2020 | Schrader et al. |
| 2020/0405432 A1 | 12/2020 | Timm et al. |
| 2021/0007811 A1 | 1/2021 | Troxell et al. |
| 2021/0015355 A1 | 1/2021 | Tesar |
| 2021/0022809 A1 | 1/2021 | Crawford et al. |
| 2021/0022821 A1 | 1/2021 | Chamorro et al. |
| 2021/0030479 A1 | 2/2021 | Marti et al. |
| 2021/0037224 A1 | 2/2021 | Casas |
| 2021/0063205 A1 | 3/2021 | LeBoeuf, II et al. |
| 2021/0128251 A1 | 5/2021 | Hettich et al. |

FOREIGN PATENT DOCUMENTS

| | | |
|---|---|---|
| JP | 2968513 B1 | 10/1999 |
| JP | H11290338 A | 10/1999 |
| JP | 3284254 B2 | 5/2002 |
| NL | 1039493 C2 | 9/2013 |
| WO | 0164481 A2 | 9/2001 |
| WO | 2012100663 A1 | 8/2012 |
| WO | 2020160143 A1 | 1/2016 |
| WO | 2017088108 A1 | 6/2017 |
| WO | 2020180717 A1 | 1/2018 |
| WO | 2020181063 A1 | 1/2018 |
| WO | 2018088203 A1 | 5/2018 |
| WO | 2018145100 A1 | 8/2018 |
| WO | 2018165320 A1 | 9/2018 |
| WO | 2019050797 A1 | 3/2019 |
| WO | 2020011688 A1 | 1/2020 |
| WO | 2020048511 A1 | 3/2020 |
| WO | 2020223490 A1 | 1/2022 |
| WO | 2020223504 A1 | 1/2022 |
| WO | 2020236778 A1 | 2/2023 |

OTHER PUBLICATIONS

English language abstract and machine-assisted English translation for JPH 11-290338 A extracted from espacenet.com database on Mar. 20, 2023, 21 pages.

English language abstract and machine-assisted English translation for JP 3284254 B2 extracted from espacenet.com database on Mar. 20, 2023, 22 pages.

Machine-assisted English translation for NL 1039493 C2 extracted from espacenet.com database on Mar. 20, 2023, 7 pages.

English language abstract for WO 2012/106663 A1 and machine-assisted English translation for equivalent CN 102613952 A extracted from espacenet.com database on Mar. 20, 2023, 20 pages.

English language abstract and machine-assisted English translation for WO 2017/088810 A1 extracted from espacenet.com database on Mar. 20, 2023, 20 pages.

English language abstract for WO 2020/011688 A1 extracted from espacenet.com database on Mar. 20, 2023, 1 page.

International Search Report for Application No. PCT/US2023/015363 dated Jun. 27, 2023, 3 pages.

Machine-assisted English language abstract and machine-assisted English language translation for DE 10 2016 206 541 A1 extracted from espacenet.com database on Jun. 30, 2023, 22 pages.

* cited by examiner

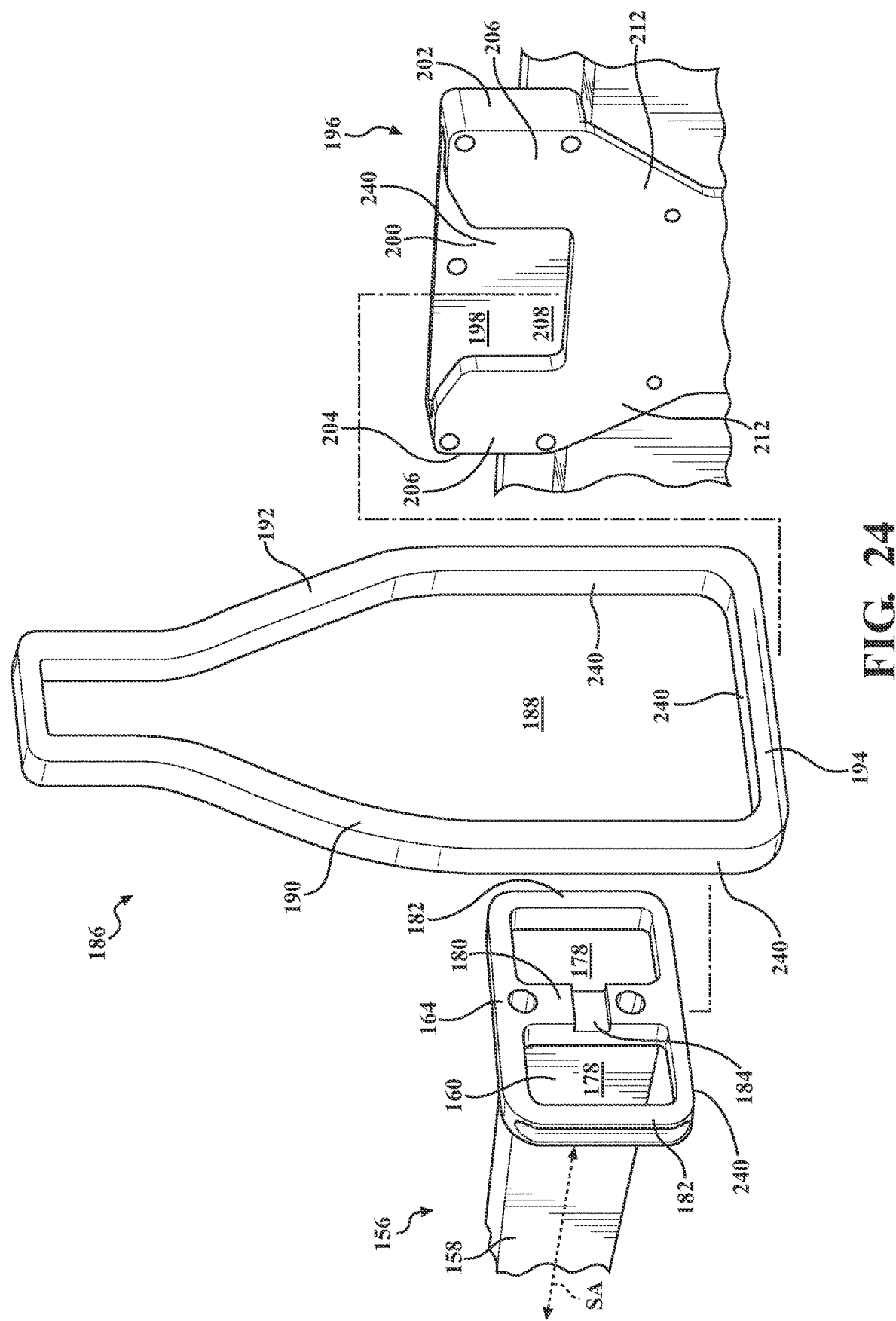

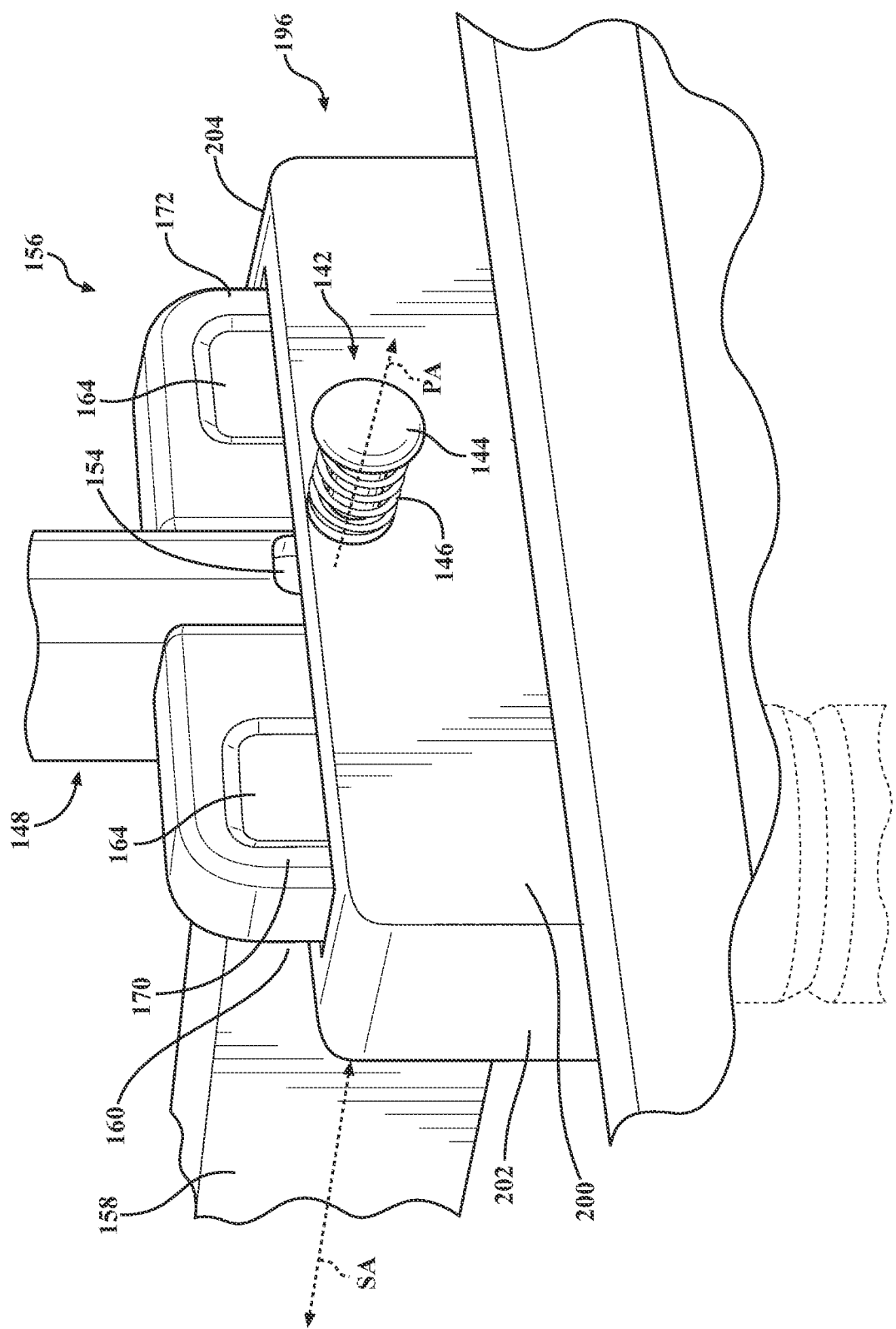

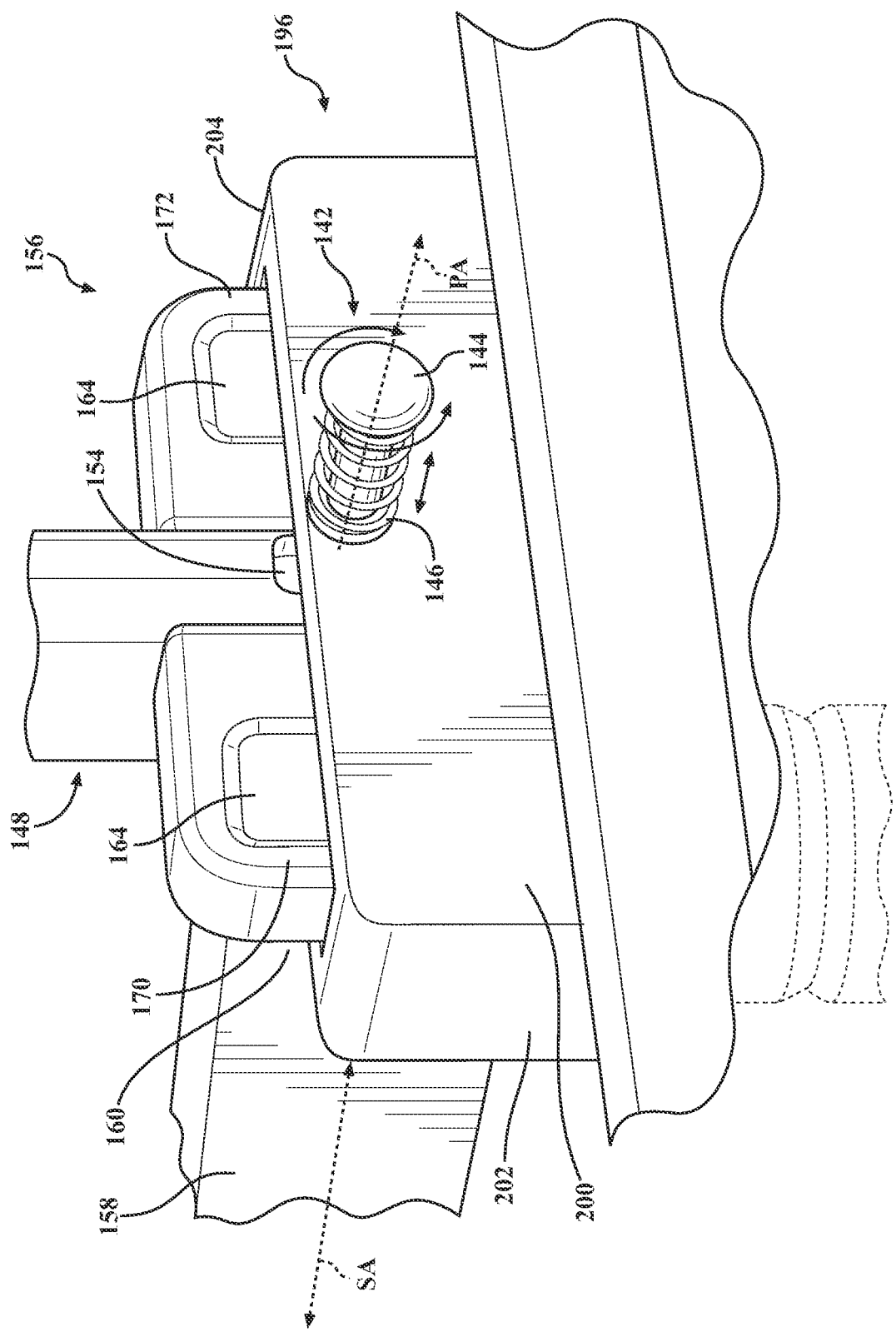

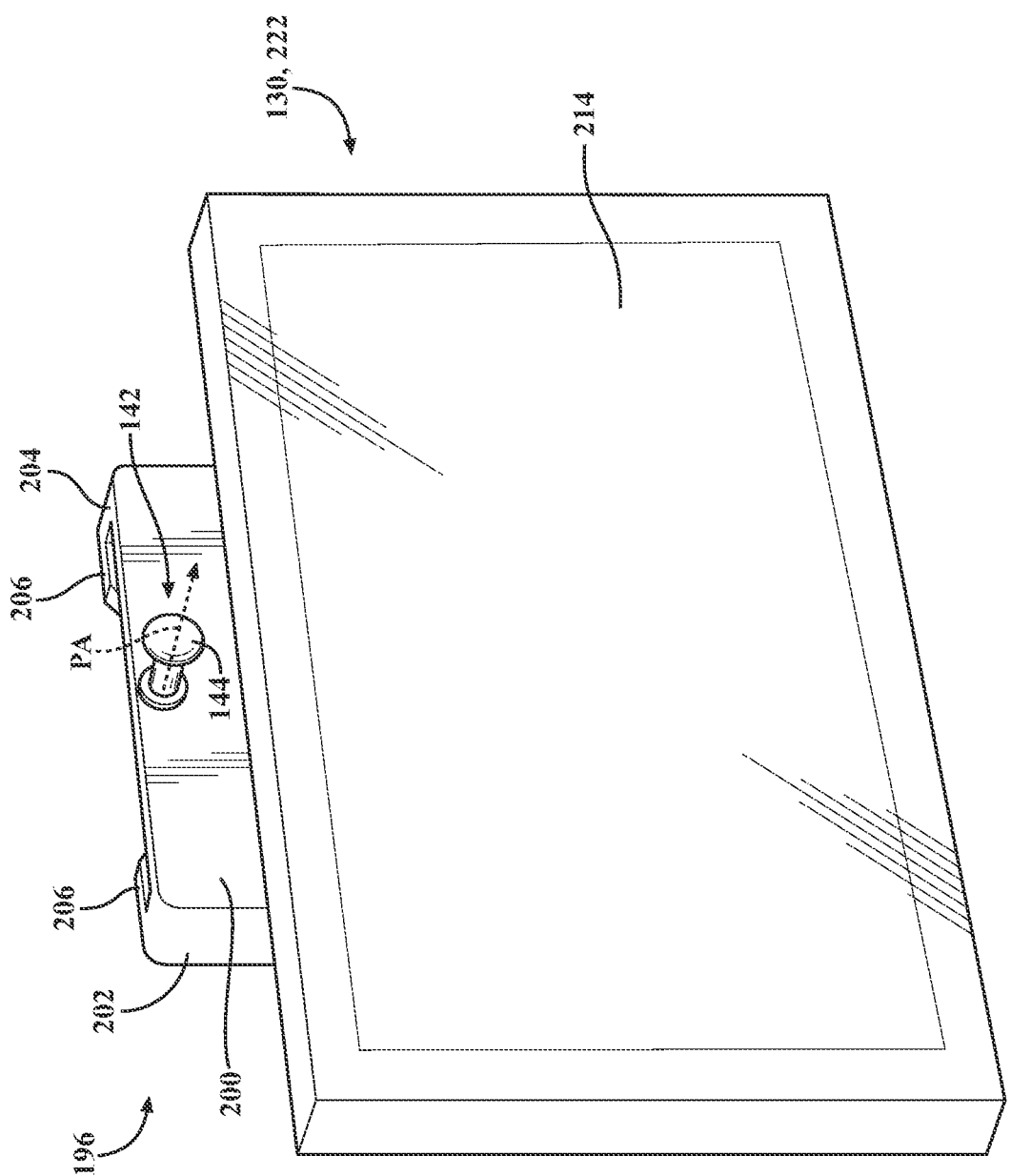

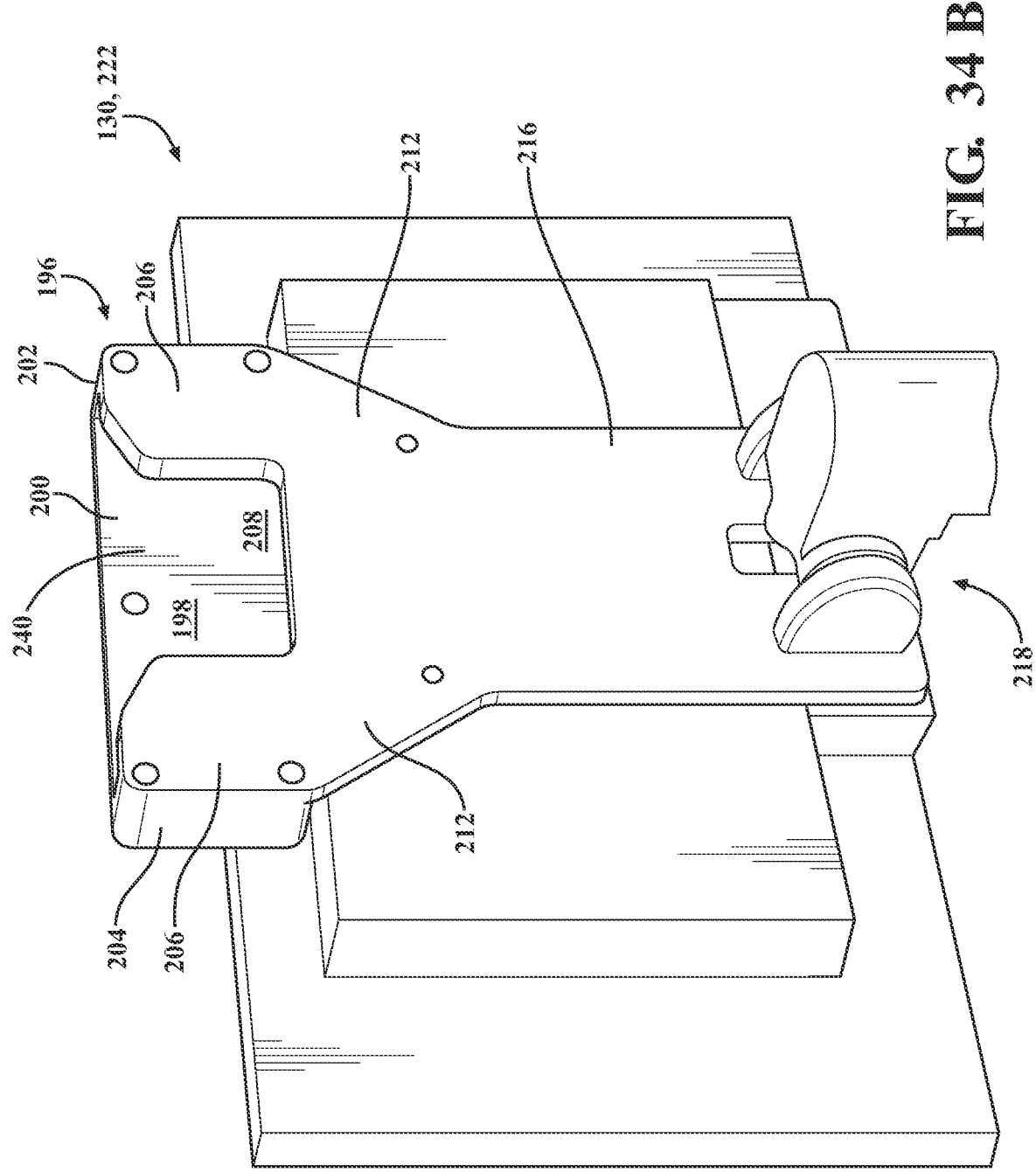

TECHNIQUES FOR SECURING TOGETHER COMPONENTS OF ONE OR MORE SURGICAL CARTS

CROSS-REFERENCE TO RELATED APPLICATIONS

The subject patent application claims priority to and all the benefits of U.S. Provisional Patent Application No. 63/320,812, which was filed on Mar. 17, 2022, which is herein incorporated by reference in its entirety.

BACKGROUND

Surgical carts are used to assist surgical procedures at surgical sites. Surgical carts typically include a base having wheels such that the base is moveable, an arm coupled to the base and moveable relative to the base, and a device supported by the arm and moveable with the arm relative to the base. The device is commonly a surgical monitor, a navigation camera, or an end effector. Often, the end effector includes a surgical tool to remove tissue at the surgical site. The arm and the device are moveable relative to the base to better position the device in the operating room.

However, during transportation of the cart or storage of the cart, the arm and the device are typically free to move unless some technique is employed to secure the arm and/or device in place. If unsecured, the arm and/or device may collide with each other, with other objects, and/or with personnel. This in turn may potentially cause damage to cart, the arm, the device, and/or other objects as well as potential harm to surrounding personnel. Additionally, if unsecured, the arm and/or device may sway in an unintended manner during transportation thereby causing the balance of the surgical cart to become unstable, which can also pose a risk of component damage or harm.

Furthermore, as surgical technology becomes increasingly more advanced, surgical carts are supporting more arms and devices. Also, multiple carts are being employed for surgical procedures. Therefore, the aforementioned issues surrounding unsecured arms and/or devices are intensifying. Accordingly, there remains a need for an improved surgical cart.

SUMMARY

This Summary introduces a selection of concepts in a simplified form that are further described below in the Detailed Description below. This Summary is not intended to limit the scope of the claimed subject matter nor identify key features or essential features of the claimed subject matter.

In a first aspect, a surgical cart is provided. The surgical cart includes a base and a plurality of wheels coupled to the base such that the base is moveable. The surgical cart also includes a first device coupled to the base and moveable relative to the base, and a first docking feature coupled to the base and moveable relative to the base. The surgical cart further includes a second device coupled to the base and moveable relative to the base, and a second docking feature coupled to the second device and moveable with the second device relative to the base. The first docking feature is engageable with the second docking feature to selectively couple the first device and the second device together.

In a second aspect, a surgical cart is provided. The surgical cart includes a base and a plurality of wheels coupled to the base such that the base is moveable. The surgical cart also includes a first device coupled to the base, and a first docking feature moveably supported with the first device relative to the base. The surgical cart further includes a second device coupled to the base, and a second docking feature moveably supported with the second device relative to the base. The first docking feature is engageable with the second docking feature to selectively couple the first device and the second device together.

In a third aspect, a surgical cart is provided. The surgical cart includes a base and a plurality of wheels coupled to the base such that the base is moveable. The surgical cart also includes a first device coupled to the base, and a first docking feature coupled to the first device. The surgical cart further includes a second docking feature coupled to the base. The first docking feature is engageable with the second docking feature. The surgical cart further includes a locking mechanism for selectively securing the first docking feature and the second docking feature together. The locking mechanism includes a plunger couplable to one of the first docking feature and the second docking feature. The plunger is moveable between a first plunger position where the first docking feature and the second docking feature are secured together, and a second plunger position where the first docking feature is disengageable from the second docking feature.

In a fourth aspect, a surgical cart is provided. The surgical cart includes a base and a plurality of wheels coupled to the base such that the base is moveable. The surgical cart also includes a first arm coupled the base, a first device supported by the first arm, and a first docking feature supported by at least one chosen from the first arm and the first device. The surgical cart further includes a second arm coupled the base, a second device supported by the second arm, and a second docking feature supported by at least one chosen from the second arm and the second device. The first docking feature is engageable with the second docking feature to selectively couple the first device and the second device together.

In a fifth aspect, a surgical cart is provided. The surgical cart includes a base and a plurality of wheels coupled to the base such that the base is moveable. The surgical cart also includes a first pillar extending from the base, a first device supported by the first pillar, and a first docking feature supported by the first device. The surgical cart further includes a second pillar extending from the base, and a second docking feature supported by the second pillar. The first docking feature is engageable with the second docking feature to selectively engage the first docking feature and the second docking feature together.

In a sixth aspect, a surgical cart is provided. The surgical cart includes a base and a plurality of wheels coupled to the base such that the base is moveable. The surgical cart also includes a first device coupled to the base, a first docking feature supported by the first device, and a second docking feature coupled to the base. The first docking feature is engageable with the second docking feature. The surgical cart further includes a third docking feature coupled to the base. The third docking feature is engageable with the first docking feature and the second docking feature to selectively engage the first docking feature, the second docking feature, and the third docking feature together.

In a seventh aspect, a surgical cart is provided. The surgical cart includes a base and a plurality of wheels coupled to the base such that the base is moveable. The surgical cart also includes a first arm and a second arm each coupled to the base. The surgical cart further includes a first surgical monitor supported by the first arm and moveable relative to the base, and a handle assembly coupled to the first surgical monitor and moveable with the first surgical monitor relative to the base. The surgical cart further includes a navigation camera supported by the second arm and moveable relative to the base, and a camera handle coupled to the navigation camera and moveable with the navigation camera relative to the base. The surgical cart further includes a second surgical monitor coupled to the base, and a holster coupled to the second surgical monitor. The holster is engageable with the handle assembly and the camera handle to selectively engage the holster, the handle assembly, and the camera together.

In an eighth aspect, a surgical cart is provided. The surgical cart includes a base and a plurality of wheels coupled to the base such that the base is moveable. The surgical cart also includes a first device coupled to the base and moveable relative to the base. The surgical cart further includes a first docking feature coupled to the first device and moveable with the first device relative to the base, and a second docking feature coupled to the base. The first docking feature is engageable with the second docking feature. The surgical cart may further include a damper disposable between the first docking feature and the second docking feature. The damper is configured to dampen movement between the first docking feature and the second docking feature.

In a ninth aspect, a surgical cart system is provided. The surgical cart system includes a first surgical cart including a first base, a plurality of wheels coupled to the first base such that the first base is moveable, a first device coupled to the first base, and a first docking feature supported with the first device. The surgical cart system also includes a second surgical cart including a second a second base, and a second docking feature coupled to the second base. The first docking feature of the first surgical cart is engageable with the second docking feature of the second surgical cart to selectively engage the first docking feature and the second docking feature together. In some implementations, the second surgical cart includes a second plurality of wheels coupled to the second base such that the second base is moveable.

In a tenth aspect, a method of securing components of a surgical cart is provided. The surgical cart includes a base, a plurality of wheels coupled to the base such that the base is moveable, and a first arm and a second arm each coupled to the base. The surgical cart also includes a first surgical monitor supported by the first arm and a handle assembly coupled to the first surgical monitor and moveable with the first surgical monitor relative to the base. The surgical cart further includes a navigation camera supported by the second arm and a camera handle coupled to the navigation camera and moveable with the navigation camera relative to the base. The surgical cart further includes a second surgical monitor coupled to the base and a holster coupled to the second surgical monitor. The method includes the step of inserting the handle assembly into the holster, and the step of inserting the camera handle into a slot collectively defined by the holster and the handle assembly. In some implementations, the holster includes a locking mechanism, and the method also includes the step of engaging the locking mechanism of the holster to the camera handle to selectively secure the camera handle and the handle assembly to the holster.

In an eleventh aspect, a method of securing components of a surgical cart is provided. The surgical cart includes a base, a plurality of wheels coupled to the base such that the base is moveable, and a first arm and a second arm each coupled to the base. The surgical cart also includes a first surgical monitor supported by the first arm and a handle assembly coupled to the first surgical monitor and moveable with the first surgical monitor relative to the base. The surgical cart further includes a navigation camera supported by the second arm and a camera handle coupled to the navigation camera and moveable with the navigation camera relative to the base. The surgical cart further includes a second surgical monitor coupled to the base and a holster coupled to the second surgical monitor. The method includes the step of inserting the camera handle into a slot defined by the handle assembly to secure the camera handle to the handle assembly, and the step of inserting the camera handle and the handle assembly, in combination, into the holster. In some implementations, the holster includes a locking mechanism, and the method also includes the step of engaging the locking mechanism of the holster to the camera handle to selectively secure the camera handle and the handle assembly to the holster.

In a twelfth aspect, a method of securing components of a surgical cart is provided. The surgical cart includes a base, a plurality of wheels coupled to the base such that the base is moveable, and a first arm and a second arm each coupled to the base. The surgical cart also includes a first surgical monitor supported by the first arm and a handle assembly coupled to the first surgical monitor and moveable with the first surgical monitor relative to the base. The surgical cart further includes a navigation camera supported by the second arm and a camera handle coupled to the navigation camera and moveable with the navigation camera relative to the base. The surgical cart further includes a second surgical monitor coupled to the base and a holster coupled to the second surgical monitor. The method includes the step of nesting the handle assembly and the camera handle together, and the step of inserting the nested handle assembly and the camera handle into the holster. In some implementations, the holster includes a locking mechanism, and the method also includes the step of engaging the locking mechanism of the holster to the handle assembly to selectively secure the camera handle and the handle assembly to the holster.

In a thirteenth aspect, a method of securing components of a surgical cart is provided. The surgical cart includes a base, a plurality of wheels coupled to the base such that the base is moveable, and a first arm and a second arm each coupled to the base. The surgical cart also includes a first surgical monitor supported by the first arm and a handle assembly coupled to the first surgical monitor and moveable with the first surgical monitor relative to the base. The surgical cart further includes a navigation camera supported by the second arm and a camera handle coupled to the navigation camera and moveable with the navigation camera relative to the base. The surgical cart further includes a second surgical monitor coupled to the base and a holster coupled to the second surgical monitor. The method includes the step of inserting the camera handle into the holster, and the step of inserting the handle assembly into a slot collectively defined by the holster and the camera handle. In some implementations, the holster includes a locking mechanism, and the method also includes the step of engaging the locking mechanism of the holster to the handle assembly to selectively secure the camera handle and the handle assembly to the holster.

In a fourteenth aspect, a method of selectively engaging a first docking feature and a second docking feature of a surgical cart together is provided. The surgical cart includes a base, a plurality of wheels coupled to the base such that the base is moveable, a first device coupled to the base, and a first docking feature supported with the first device. The surgical cart also includes a second docking feature coupled to the base, with the first docking feature engageable with the second docking feature, and a locking mechanism for selectively securing the first docking feature and the second docking feature together. The locking mechanism includes a plunger couplable to one of the first docking feature and the second docking feature. The method includes the step of engaging the first docking feature with the second docking feature, and the step of moving the plunger between a first plunger position where the first docking feature and the second docking feature are secured together, and a second plunger position where the first docking feature is disengageable from the second docking feature.

In some implementations, engagement of the first docking feature and the second docking feature limits relative movement between the first device and the second device. In some implementations, engagement of the first docking feature and the second docking feature limits relative movement between the first device and the base and limits relative movement between the second device and the base. In some implementations, the first docking feature and the second docking feature are engageable with one another in more than one spatial orientation. In some implementations, the first docking feature is configured to slidably connect to the second docking feature, thereby enabling selective engagement of the first docking feature and the second docking feature.

In some implementations, the surgical cart further includes a third docking feature coupled to the base, and the third docking feature is engageable with the first docking feature and the second docking feature to selectively engage the first docking feature, the second docking feature, and the third docking feature together. In some implementations, engagement of the first docking feature, the second docking feature, and the third docking feature limits relative movement between the first device and the second device. In some implementations, engagement of the first docking feature, the second docking feature, and the third docking feature limits relative movement between the first device and the base and limits relative movement between the second device and the base.

In some implementations, the surgical cart further includes a third device coupled to the base and with the third docking feature coupled to the third device. In some implementations, engagement of the first docking feature, the second docking feature, and the third docking feature limits relative movement between the first device and the second device, the second device and the third device, and the first device and the third device. In some implementations, engagement of the first docking feature, the second docking feature, and the third docking feature limits relative movement between the first device and the base, the second device and the base, and the third device and the base. In some implementations, the first docking feature, the second docking feature, and the third docking feature are engageable in more than one spatial orientation.

In some implementations, the surgical cart further includes a pillar extending from the base, and the pillar supports the first device and the first docking feature. In some implementations, the surgical cart further includes a first arm supported by the pillar, with the first arm supporting the first device, and with the first docking feature supported by at least one chosen from the first arm and the first device. In some implementations, the pillar supports the second device and the second docking feature. In some implementations, the surgical cart further includes a second arm coupled to the base, with the second arm supporting the second device, and with the second docking feature supported by at least one chosen from the second arm and the second device. In some implementations, the pillar supports the second arm.

In some implementations, the pillar is further defined as a first pillar, the surgical cart further includes a second pillar extending from the base and spaced from the first pillar, a third device supported by the second pillar, and a third docking feature supported by at least one chosen from the third device and the second pillar, and with the third docking feature engageable with the first docking feature and the second docking feature to selectively engage the first docking feature, the second docking feature, and the third docking feature together. In some implementations, the third device and the third docking feature are pivotably mounted relative to the second pillar. In some implementations, the third device and the third docking feature are moveable between a first spatial orientation and a second spatial orientation different from the first spatial orientation, and the first docking feature and the second docking feature are engageable with the third docking feature in either of the first spatial orientation and the second spatial orientation.

In some implementations, the pillar is further defined as a first pillar, and the surgical cart further includes a second pillar extending from the base and spaced from the first pillar, and the second device and the second docking feature are supported by the second pillar. In some implementations, the second docking feature and the second device are pivotably mounted relative to the second pillar. In some implementations, the second device and the second docking feature are moveable between a first spatial orientation and a second spatial orientation different from the first spatial orientation, and the first docking feature is engageable with the second docking feature in either of the first spatial orientation and the second spatial orientation.

In some implementations, the first device is at least one of a surgical monitor, a navigation camera, a localizer, a surgical tracker, a cart tracker that is coupled to the cart by an arm, a robotic arm, and an end effector. In some implementations, the second device is at least one of the surgical monitor, the navigation camera, the localizer, the surgical tracker, the robotic arm, and the end effector. In some implementations, the third device is at least one of the surgical monitor, the navigation camera, the localizer, the surgical tracker, the cart tracker, the robotic arm, and the end effector.

In some implementations, the surgical cart further includes a locking mechanism configured to selectively secure the first docking feature and the second docking feature together. In some implementations, the locking mechanism includes a plunger couplable to one of the first docking feature and the second docking feature, with the plunger moveable between a first plunger position in which the first docking feature and the second docking feature are secured together, and a second plunger position in which the first docking feature is disengageable from the second docking feature. In some implementations, the plunger is moveable in a linear direction between the first plunger position and the second plunger position. In some implementations, the plunger extends along a primary plunger axis, and wherein the plunger is moveable axially along the primary plunger axis between the first plunger position and the second plunger position. In some implementations, the locking mechanism further includes a biasing mechanism coupled to the plunger and configured to bias the plunger toward the first plunger position. In some implementations, the biasing member is disposed about the plunger. In some implementations, the plunger is configured to be retained in the second plunger position in response to rotation of the plunger about the primary plunger axis. In some implementations, the plunger is configured to move between the second plunger position and the first plunger position upon engagement of the first docking feature and the second docking feature.

In some implementations, the surgical cart further includes a third coking feature coupled to the base, and the third docking feature is engageable with the first docking feature and the second docking feature to selectively engage the first docking feature, the second docking feature, and the third docking feature together, and the plunger in the first plunger position is configured to selectively secure the first docking feature, the second docking feature, and the third docking feature together. In some implementations, securement of the first docking feature, the second docking feature, and the third docking feature together with the plunger limits relative movement between the first docking feature and the base, the second docking feature and the base, and the third docking feature and the base.

In some implementations, the first docking feature has a male configuration and the second docking feature has a female configuration such that the first docking feature is disposable in the second docking feature. In some implementations, the first docking feature has a female configuration and the second docking feature has a male configuration such that the second docking feature is disposable in the first docking feature.

In some implementations, one of the first docking feature and the second docking feature is a pole handle extending longitudinally from the first pole end to a second pole end, and the pole handle defines an indentation. In some implementations, one of the first docking feature and the second docking feature is the pole handle, and the other of the first docking feature and the second docking feature is a handle assembly, and the handle assembly includes a shaft extending along a shaft axis between a proximal shaft end and a distal shaft end spaced from the proximal shaft end along the shaft axis, and the handle assembly includes a graspable component coupled to the proximal shaft end of the shaft, with the graspable component extending radially away from the shaft axis.

In some implementations, the shaft includes a first shaft arm extending axially from the proximal shaft end, and a second shaft arm spaced from the first shaft arm and extending axially from the proximal shaft end, and the graspable component includes a first handle portion coupled to the first shaft arm, and a second handle portion coupled to the second shaft arm, and a slot is collectively defined by the first shaft arm, the second shaft arm, the first handle portion, and the second handle portion. In some implementations, the slot is configured to receive the pole handle to engage the handle assembly and the pole handle. In some implementations, each of the first handle portion and the second handle portion extend radially with respect to the shaft axis. In some implementations, the handle assembly further includes a connection portion extending between the first handle portion and the second handle portion, and the slot is further defined by the connection portion. In some implementations, the first handle portion, the second handle portion, and the connection portion collectively define an opening through which the pole handle is exposed.

In some implementations, the surgical cart further includes a locking mechanism configured to selectively secure the pole handle and the handle assembly, the locking mechanism including a plunger couplable to one of the pole handle and the handle assembly, with the plunger moveable between a first plunger position in which the pole handle and the handle assembly are secured together, and a second plunger position in which the pole handle is disengageable from the handle assembly, and the indentation of the pole handle is configured to receive the plunger to selectively secure the pole handle and the handle assembly together. In some implementations, the plunger is disposed at least partially in the indentation in the first plunger position. In some implementations, the indentation of the pole handle is exposed through the opening when the pole handle is received in the slot such that the plunger is enabled to be disposed at least partially in the indentation defined by the pole handle in the first plunger position.

In some implementations, the first device is further defined as a navigation camera and the pole handle is configured to adjust a position of the navigation camera, and the second device is further defined as a surgical monitor. In some implementations, the first arm is coupled to the base and the first arm is coupled to the shaft of the handle assembly to support the handle assembly, and the distal shaft end of the shaft of the handle assembly supports the surgical monitor.

In some implementations, one of the first docking feature and the second docking feature is a handle assembly, and the handle assembly includes a shaft extending along a shaft axis between a proximal shaft end and a distal shaft end spaced from the proximal shaft end along the shaft axis, and a graspable component coupled to the proximal shaft end of the shaft, the graspable component extending radially away from the shaft axis. In some implementations, the graspable component includes a base coupled to the proximal shaft end, a handle body supported by the base, and an indentation defined by one or both of the base and the handle body. In some implementations, an opening is defined between the base and the handle body to enable grasping of the handle body.

In some implementations, one of the first docking feature and the second docking feature is the handle assembly, and the other of the first docking feature and the second docking feature is a loop handle defining an aperture configured to receive the handle assembly. In some implementations, the loop handle is completely enclosed. In some implementations, the loop handle has a first loop arm, a second loop arm spaced from the first loop arm, and a loop base extending between the first loop arm and the second loop arm. In some implementations, the loop base is generally linear. In some implementations, the first loop arm and the second loop arm of the loop handle taper toward one another distal to the loop base.

In some implementations, the surgical cart further includes a locking mechanism configured to selectively secure the handle assembly and the loop handle, and the locking mechanism includes a plunger couplable to one of the handle assembly and the loop handle, and the plunger is moveable between a first plunger position in which the handle assembly and the loop handle are secured together, and a second plunger position in which the handle assembly is disengageable from the loop handle, and the indentation of the graspable component of the handle assembly is configured to receive the plunger to selectively secure the handle assembly and the loop handle together. In some implementations, the plunger is disposed at least partially in the indentation in the first plunger position.

In some implementations, one of the first docking feature and the second docking feature is a holster defining a holster interior, and the other of the first docking feature and the second docking feature is disposable in the holster interior of the holster to engage the holster and the other of the first docking feature and the second docking feature. In some implementations, the holster has a first wall, a second wall extending away from the first wall, a third wall opposite from the second wall and extending away from the first wall, and a fourth wall opposite from the first wall and extending in part from the second wall and in part from the third wall, and wherein the first, second, third, and fourth walls collectively define the holster interior. In some implementations, the fourth wall defines a gap, and at least a portion of one of the first docking feature and the second docking feature is configured to extend through the gap when disposed in the holster interior of the holster.

In some implementations, one of the first docking feature and the second docking feature is a holster, and the other of the first docking feature and the second docking feature is a handle assembly, the handle assembly including a shaft extending along a shaft axis between a proximal shaft end and a distal shaft end spaced from the proximal shaft end along the shaft axis, and a graspable component coupled to the proximal shaft end of the shaft, the graspable component extending radially away from the shaft axis, and with at least a portion of the graspable component disposable in the holster interior, and with at least a portion of the shaft disposable in the gap defined by the fourth wall. In some implementations, the graspable component includes a first handle portion coupled to the shaft and a second handle portion coupled to the shaft, with at least a portion of the first handle portion and at least a portion of the second handle portion disposable in the holster interior. In some implementations, the first and second handle portions each comprise a tapered handle edge, and the holster defines a tapered holster edge in the holster interior that is shaped to correspond to the tapered handle edges.

In some implementations, one of the first device and the second device is a surgical monitor having a monitor screen and a back panel opposite the monitor screen, and with the holster fixed to the back panel of the surgical monitor. In some implementations, the surgical cart further includes a tiltable linkage connecting the second pillar to at least one chosen from the back panel of the surgical monitor and the holster.

In some implementations, the third docking feature has a female configuration, and engagement of the first docking feature and the second docking feature collectively forms a male configuration, and the male configuration of the first docking feature and the second docking feature is disposable in the female configuration of the third docking feature. In some implementations, the third docking feature has a male configuration, and engagement of the first docking feature and the second docking feature collectively forms a female configuration, and the male configuration of the third docking feature is disposable in the female configuration of one of the first docking feature and the second docking feature.

In some implementations, the first docking feature is a pole handle, the second docking feature is a handle assembly, and the third docking feature is a holster. In some implementations, the handle assembly is insertable into a holster interior defined by the holster and the pole handle is insertable into a slot collectively defined by the holster and the handle assembly. In some implementations, the pole handle is insertable into a slot defined at least partially by the handle assembly, and the pole handle and the handle assembly, in combination, are insertable into a holster interior defined by the holster. In some implementations, the holster includes a locking mechanism to selectively secure the pole handle, the handle assembly, and the holster together, and the locking mechanism engages an indentation defined by the pole handle. In some implementations, the handle assembly defines an opening to expose the indentation of the pole handle, and the locking mechanism is extendable through the opening of the handle assembly to be disposable in the indentation of the pole handle.

In some implementations, the first docking feature is a loop handle, the second docking feature is a handle assembly, and the third docking feature is a holster. In some implementations, the loop handle is insertable into a holster interior defined by the holster and the handle assembly is insertable into both an aperture defined by the loop handle and the holster interior of the holster. In some implementations, the handle assembly is insertable into an aperture defined by the loop handle, and the loop handle and the handle assembly, in combination, are insertable into a holster interior defined by the holster. In some implementations, the holster includes a locking mechanism to selectively secure the loop handle, the handle assembly, and the holster together, and the locking mechanism engages an indentation defined by the handle assembly. In some implementations, the loop handle defines an aperture to expose the indentation of the handle assembly, and the locking mechanism is extendable through the aperture of the loop handle to be disposable in the indentation of the handle assembly.

In some implementations, the handle assembly is insertable into the holster and the camera handle is insertable into a slot collectively defined by the holster and the handle assembly. Additionally, in some implementations, the camera handle is configured to be nested with the handle assembly, and the camera handle and the handle assembly, in combination, are insertable into the holster. Further, in some implementations, the holster includes a locking mechanism to selectively secure the camera handle and the handle assembly to the holster. Moreover, in some implementations, the camera handle defines an indentation, the handle assembly defines an opening to expose the indentation of the camera handle, and the locking mechanism extends through the opening of the handle assembly to engage the indentation of the camera handle.

In some implementations, a damper is disposable between the first docking feature and the second docking feature, between the first docking feature and the third docking feature, and/or between the second docking feature and the third docking feature. The damper is configured to dampen movement between the first docking feature and the second docking feature, between the first docking feature and the third docking feature, and/or between the second docking feature and the third docking feature. The damper can be a spring biased element, an elastic material or element, or the like.

Any of the above aspects can be combined in full or in part. Any features of the above aspects can be combined in full or in part. Any of the above implementations can be combined, in full or in part, with any other aspect. Any of the above implementations can be combined with any other implementation whether for the same aspect or different aspect.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 24 is a perspective view of one implementation of the handle assembly, a loop handle, and the holster;

FIG. 32 is a perspective view of one implementation of the locking mechanism, with the locking mechanism including a biasing member disposed about the plunger, and with the plunger in a first plunger position where the docking features are secured together;

FIG. 33 is a perspective view of one implementation of the locking mechanism, with the plunger in the second plunger position where the docking features are disengageable with one another, and with the plunger configured to be retained in the second plunger position in response to rotation of the plunger;

FIG. 34A is a perspective view of one implementation of a surgical monitor having a monitor screen;

FIG. 34B is a perspective view of one implementation of the surgical monitor having a back panel, with the holster fixed to the back panel of the surgical monitor;

DETAILED DESCRIPTION OF THE INVENTION

Figure 1:
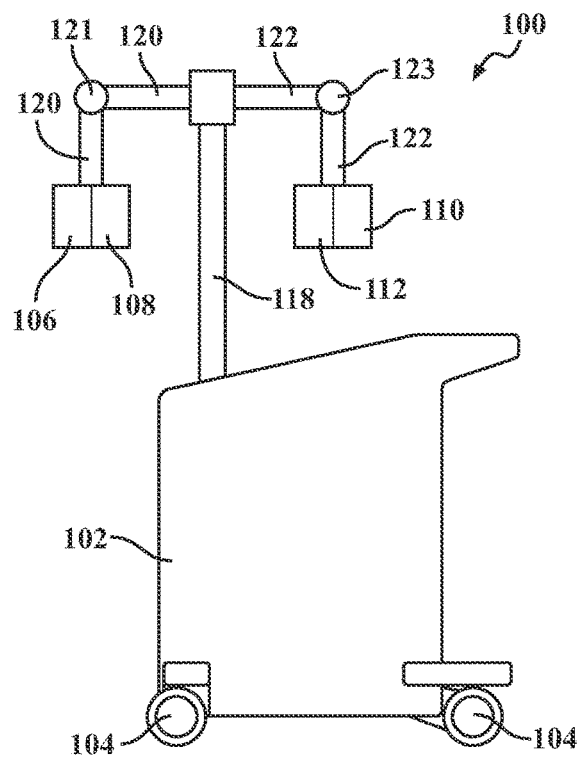
FIG. 1 is a schematic illustration of one implementation of a surgical cart including a base, a plurality of wheels coupled to the base, a first device moveable relative to the base, a first docking feature moveable with the first device, a second device moveable relative to the base, and a second docking feature moveable with the second device, with the first docking feature engageable with the second docking feature to selectively couple the first device and the second device together.

With reference to the Figures, wherein like numerals indicate like parts throughout the several views, techniques for securing together or "docking" components of one or more carts are described. Examples of systems that can employ carts that can be used with the techniques described herein can be like those described in: U.S. Pat. No. 10,098,704, entitled "System and Method for Manipulating an Anatomy"; U.S. Pat. No. 11,065,069, entitled "Robotic Spine Surgery System And Methods"; U.S. Pat. No. 10,499,997 entitled "Systems and Methods for Surgical Navigation"; and/or U.S. Pat. No. 10,959,783 entitled "Integrated medical imaging and surgical robotic system", the contents of each of the aforementioned patents being hereby incorporated by reference in their entirety.

Examples of carts that can be employed with the techniques described herein include, but are not limited to: surgical carts, medical carts, robotic carts, navigation carts, imaging device carts including x-ray carts and c-arm carts, gantry carts, computer workstation carts, surgical storage carts, ultrasound carts, surgeon console carts, surgical bed carts, table mountable carts, surgical illumination device carts, bedside carts, IV carts, surgical aspirator or irrigation carts, surgical material (e.g., bone cement) storage and delivery carts, suction or surgical waste disposal carts, surgical additive manufacturing carts, and the like.

One implementation of a surgical cart 100 is shown in FIGS. 1-9. The surgical cart 100 includes a base 102 and a plurality of wheels 104 coupled to the base 102 such that the base 102 is moveable. The surgical cart 100 may also include a first device 106 coupled to the base 102. Although not required, the first device 106 may be moveable relative to the base 102. The surgical cart 100 may also include a first docking feature 108 coupled to the first device 106. The first docking feature 108 may be supported with the first device 106. The first docking feature 108 may also be moveable with the first device 106 relative to the base 102. More specifically, the first docking feature 108 may be moveably supported with the first device 106 relative to the base 102.

The surgical cart 100 may also include a second device 110 coupled to the base 102. Although not required, the second device 110 may be moveable relative to the base 102. Additionally, the surgical cart 100 may include a second docking feature 112 coupled to the base. The second docking feature 112 may be coupled to the second device 110. The second docking feature 112 may be supported with the second device 110. The second docking feature 112 may also be moveable with the second device 110 relative to the base 102. More specifically, the second docking feature 112 may be moveably supported with the second device 110 relative to the base 102.

The first docking feature 108 is engageable with the second docking feature 112. The first docking feature 108 being engageable with the second docking feature 112 may limit relative movement between the first docking feature 108 and the second docking feature 112. Limiting relative movement between the first docking feature 108 and the second docking feature 112 assists in enabling the first docking feature 108 to be engageable with the second docking feature 112 to selectively couple the first device 106 and the second device 110 together. In turn, engagement of the first docking feature 108 and the second docking feature 112 may limit relative movement between the first device 106 and the second device 110. Limiting relative movement between the first device 106 and the second device 110 prevents damage to the surgical cart, particularly to either the first device 106 and/or the second device 110, while the surgical cart 100 is moved between different surgical sites or between different locations or different orientations relative to the same surgical site. More specifically, engagement of the first docking feature 108 and the second docking feature 112 prevents contact between the first device 106 and/or the second device 110 and surrounding objects, such as but not limited to other surgical carts, other surgical instruments at the surgical sites, surrounding personnel, and other surgical instruments, and walls. Additionally, preventing contact between the first device 106 and/or the second device 110 with surrounding objects such as other surgical carts, other surgical instruments, surrounding personnel, or walls may prevent misalignment of correctly positioned surgical carts and other surgical instruments, removing the need for operators to manually reset the positions of the surgical carts and other surgical instruments.

Although not required, engagement of the first docking feature 108 and the second docking feature 112 may limit relative movement between the first device 106 and the base 102, and engagement of the first docking feature 108 and the second docking feature 112 may limit relative movement between the second device 110 and the base 102. Limiting relative movement between the first device 106 and the base 102 as well as between the second device 110 and the base 102 further assists in preventing contact between the first device 106 and/or the second device 110 and surrounding objects such as other surgical carts, other surgical instruments, personnel, and walls.

Additionally, the first docking feature 108 and the second docking feature 112 may be engageable with one another in more than one spatial orientation. In other words, either the first docking feature 108, the second docking feature 112, or both the first docking feature 108 and the second docking feature 112 may be rotated, inverted, or otherwise spatially rearranged from a first spatial orientation to a second spatial orientation, and the first docking feature 108 and the second docking feature 112 may be engageable with one another in either of the first spatial orientation and the second spatial orientation. The first docking feature 108 and the second docking feature 112 being engageable with one another in more than one spatial orientation permits modularity of the surgical cart 100 and permits the operator to easily engage the first docking feature 108 and the second docking feature 112 together regardless of the particular spatial orientations of the first docking feature 108 and the second docking feature 112.

The first docking feature 108 may be configured to slidably connect to the second docking feature 112, thereby enabling selective engagement of the first docking feature 108 and the second docking feature 112 together. Said differently, the first docking feature 108 may slide into the second docking feature 112, or the second docking feature 112 may slide into the first docking feature 108. The first docking feature 108 or the second docking feature 112 slidably connecting to the other of the first docking feature 108 and the second docking feature 112 permits selective engagement of the first docking feature 108 and the second docking feature 112. Engagement of the first docking feature 108 and the second docking feature 112 may be selective.

Referring now to FIGS. 4-9, the surgical cart 100 may further include a third docking feature 114 coupled to the base 102. The third docking feature 114 is engageable with the first docking feature 108 and the second docking feature 112 to selectively engage the first docking feature 108, the second docking feature 112, and the third docking feature 114 together. Engagement of the first docking feature 108, the second docking feature 112, and the third docking feature 114 may limit relative movement between the first device 106 and the second device 110, further preventing contact between the first device 106, the second device 110 and surrounding objects. Engagement of the first docking feature 108, the second docking feature 112, and the third docking feature 114 may limit relative movement between the first device 106 and the base 102 and limits relative movement between the second device 110 and the base 102, even further preventing contact between the first device 106, the second device 110, and surrounding objects.

Figure 7:
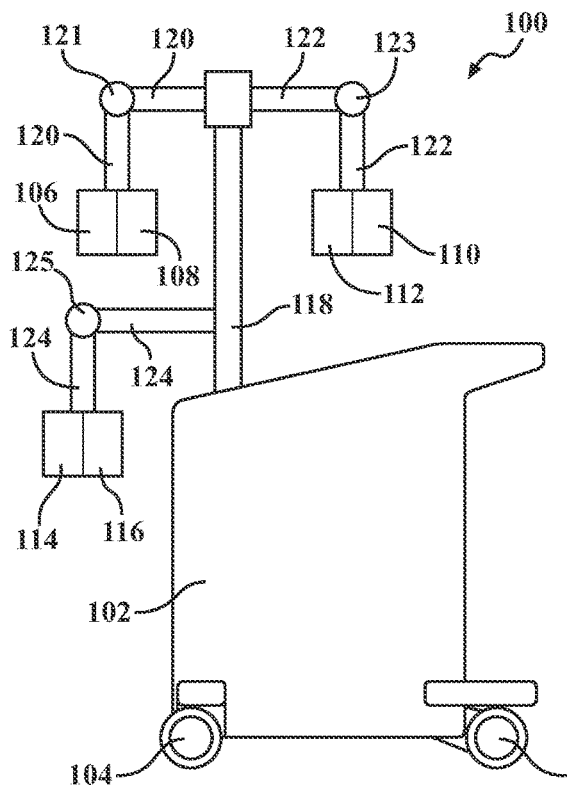
FIG. 7 is a schematic illustration of one implementation of the surgical cart, with the surgical cart including the pillar supporting the first arm, the first docking feature, and the first device, and with the pillar supporting the second arm, the second docking feature, and the second device, and with the pillar further supporting a third arm, the third docking feature, and a third device.
Figure 8:
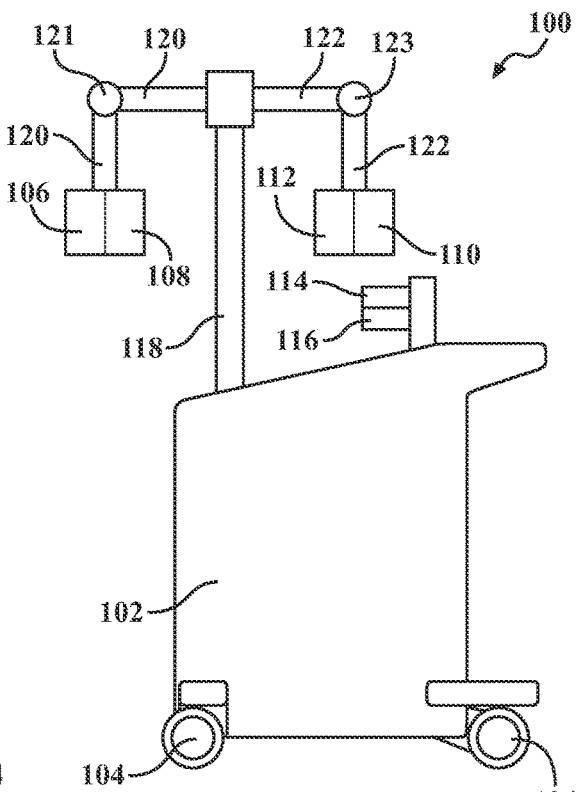
FIG. 8 is a schematic illustration of one implementation of the surgical cart, with the surgical cart including the pillar supporting the first arm, the first docking feature, and the first device, and with the pillar supporting the second arm, the second docking feature, and the second device, and further including the second pillar supporting the third docking feature and the third device.
Figure 9:
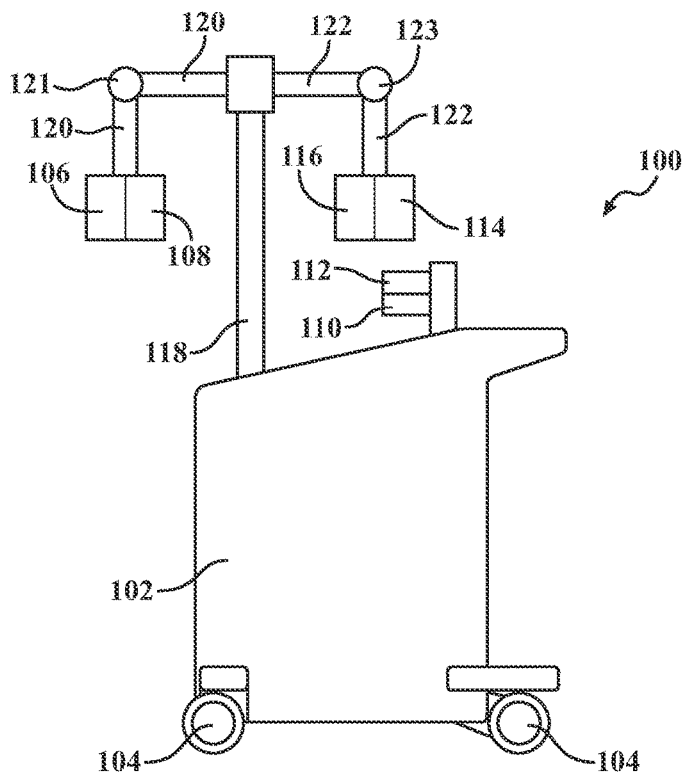
FIG. 9 is a schematic illustration of one implementation of the surgical cart, with the surgical art including the pillar supporting the first arm, the first docking feature, and the first device, and with the pillar supporting the second arm, the third docking feature, and the third device, and further including the second pillar supporting the second docking feature and the second device.

Although not required, as shown in FIGS. 7-9, the surgical cart 100 may further include a third device 116 coupled to the base 102. The third docking feature 114 may be coupled to the third device 116. The third device 116 may be moveable relative to the base 102. The third docking feature 114 may be supported with the third device 116. The third docking feature 114 may also be moveable with the third device 116 relative to the base 102. More specifically, the third docking feature 114 may be moveably supported with the third device 116 relative to the base 102.

Engagement of the first docking feature 108, the second docking feature 112, and the third docking feature 114 may limit relative movement between the first device 106 and the second device 110, the second device 110 and the third device 116, and the first device 106 and the third device 116.

As such, engagement of the first docking feature 108, the second docking feature 112, and the third docking feature 114 further prevents contact between the first device 106, the second device 110, the third device 116, and surrounding objects. Engagement of the first docking feature 108, the second docking feature 112, and the third docking feature 114 may limit relative movement between the first device 106 and the base 102, the second device 110 and the base 102, and the third device 116 and the base 102, even further preventing contact between the first device 106, the second device 110, the third device 116, and surrounding objects.

Additionally, the first docking feature 108, the second docking feature 112, and the third docking feature 114 may be engageable with one another in more than one spatial orientation. In other words, either the first docking feature 108, the second docking feature 112, the third docking feature 114, or any combinations thereof may be rotated, inverted, or otherwise spatially rearranged from a first spatial orientation to a second spatial orientation, and the first docking feature 108, the second docking feature 112, and the third docking feature 114 may be engageable with one another in either of the first spatial orientation and the second spatial orientation. The first docking feature 108, the second docking feature 112, and the third docking feature 114 being engageable with one another in more than one spatial orientation permits modularity of the surgical cart 100 and permits the operator to easily engage the first docking feature 108, the second docking feature 112, and the third docking feature 114 together regardless of the particular spatial orientations of the first docking feature 108, the second docking feature 112, and the third docking feature 114.

As shown in FIGS. 1-9, the surgical cart 100 may include a pillar 118 extending from the base 102. The pillar 118 may support the first device 106 and the first docking feature 108. In other words, the first device 106 may be connected to the base 102 through the pillar 118. The surgical cart 100 may also include a first arm 120 coupled to the base 102, and the first arm 120 may be supported by the pillar 118. The first arm 120 may support the first device 106, and the first docking feature 108 may be supported by at least one chosen from the first arm 120 and the first device 106. In other words, the first docking feature 108 may be supported by the first arm 120, the first docking feature 108 may be supported by the first device 106, or the first docking feature 108 may be supported by both the first arm 120 and the first device 106. The first docking feature 108 may be connected to the base 102 through the first arm 120 or through both the first device 106 and the first arm 120.

The first arm 120 and the first device 106 may be moveable away from a center of gravity of the base 102. Therefore, the first docking feature 108 may prevent the surgical cart 100 from becoming off balance and tipping over during movement of the base 102 between different surgical sites or between different locations or different orientations relative to the same surgical site, thus preventing potential damage to the surgical cart 100, to other surgical carts, and to other surgical instruments, as well as preventing potential injury to the operators.

Referring now to FIGS. 1, 4, 5, and 7-9, the surgical cart 100 may further include a second arm 122 coupled the base 102. As shown in FIGS. 1, 4, 5, 7, and 8, the second arm 122 may support the second device 110, and the second docking feature 112 may be supported by at least one chosen from the second arm 122 and the second device 110. In other words, the second docking feature 112 may be supported by the second arm 122, the second docking feature 112 may be supported by the second device 110, or the second docking feature 112 may be supported by both the second arm 122 and the second device 110. The second docking feature 112 may be connected to the base 102 through the second arm 122 or through both the second device 110 and the second arm 122. The second arm 122 may support the third device 116 and the third docking feature 114, as shown in FIG. 9.

Although not required, the pillar 118 may support the second device 110 and the second docking feature 112, as shown in FIGS. 1, 4, 5, 7, and 8. In other words, the second device 110 and the second docking feature 112 may be connected to the base through the pillar 118. Additionally, the second arm 122 may be supported by the pillar 118. In other words, the second arm 122 may be connected to the base 102 through the pillar 118. Moreover, the second device 110 and the second docking feature 112 may be connected to the base 102 through the pillar 118.

Additionally, as shown in FIG. 7, the surgical cart 100 may further include a third arm 124 coupled to the base 102. The third arm 124 may support the third device 116, and the third docking feature 114 may be supported by at least one chosen from the third arm 124 and the third device 116. In other words, the third docking feature 114 may be supported by the third arm 124, the third docking feature 114 may be supported by the third device 116, or the third docking feature 114 may be supported by both the third arm 124 and the third device 116. The third docking feature 114 may be connected to the base 102 through the third arm 124 or through both the third device 116 and the third arm 124.

Although not required, the first arm 120 may include a first joint 121, the second arm 122 may include a second joint 123, and the third arm 124 may include a third joint 125. The first arm 120, the second arm 122, and the third arm 124 may also include additional joints. In other words, the first arm 120, the second arm 122, and the third arm 124 may each be polyarticular.

Figure 2:
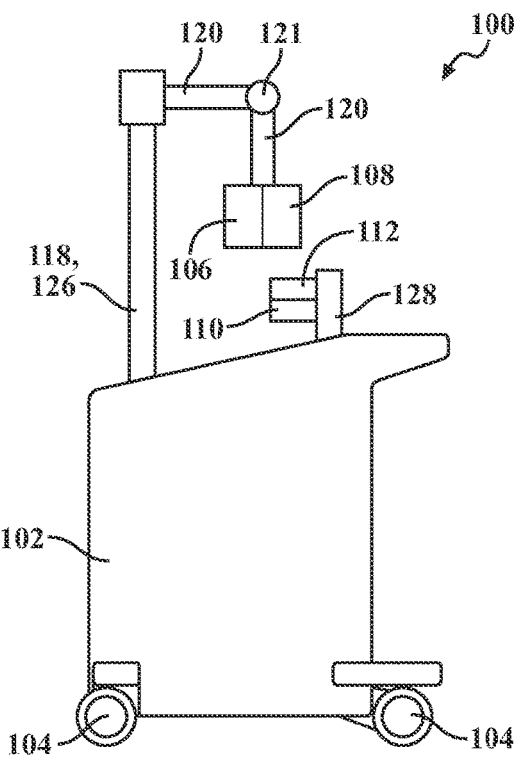
FIG. 2 is a schematic illustration of one implementation of the surgical cart, with the surgical cart including a pillar extending from the base and supporting the first device and the first docking feature, and a second pillar extending from the base and supporting the second device and the second docking feature.
Figure 3:
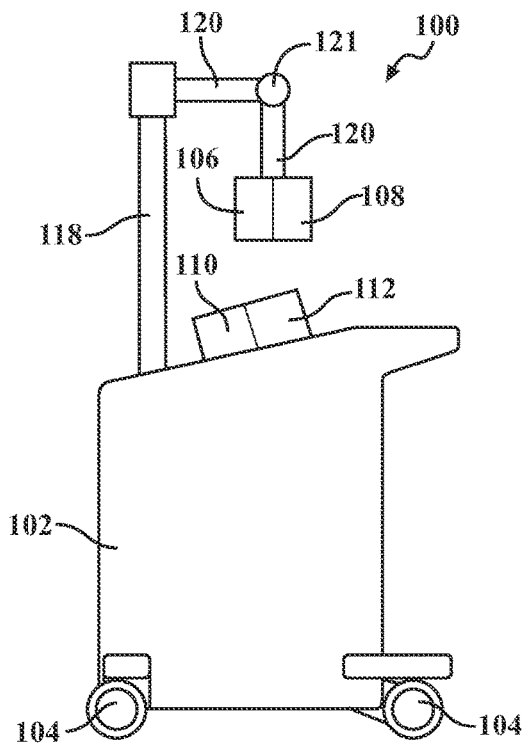
FIG. 3 is a schematic illustration of one implementation of the surgical cart, with the surgical cart including the pillar supporting a first arm, the first arm supporting the first device, and the first docking feature supported by the first arm and the first device, and with the base supporting the second docking feature and the second device.
Figure 4:
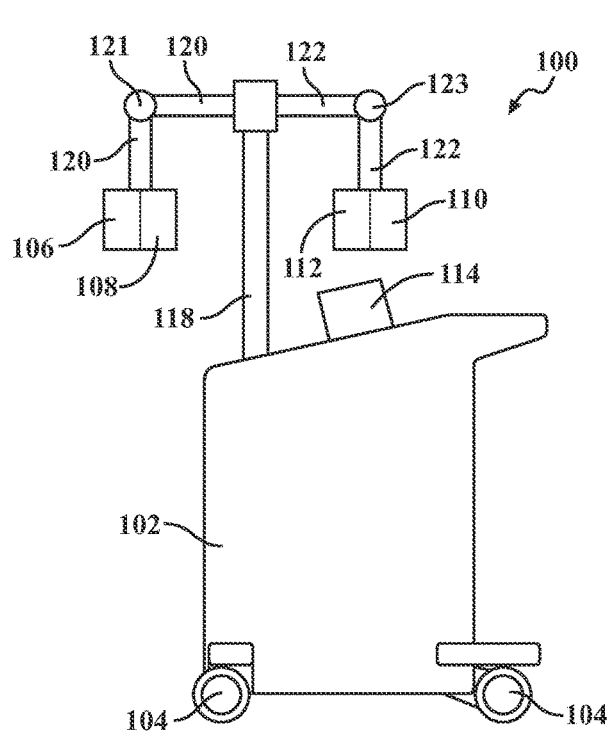
FIG. 4 is a schematic illustration of one implementation of the surgical cart, with the surgical cart including the pillar supporting the first arm, the first docking feature, and the first device, and with the pillar supporting a second arm, the second docking feature, and the second device, and further including a third docking feature supported by the base.
Figure 5:
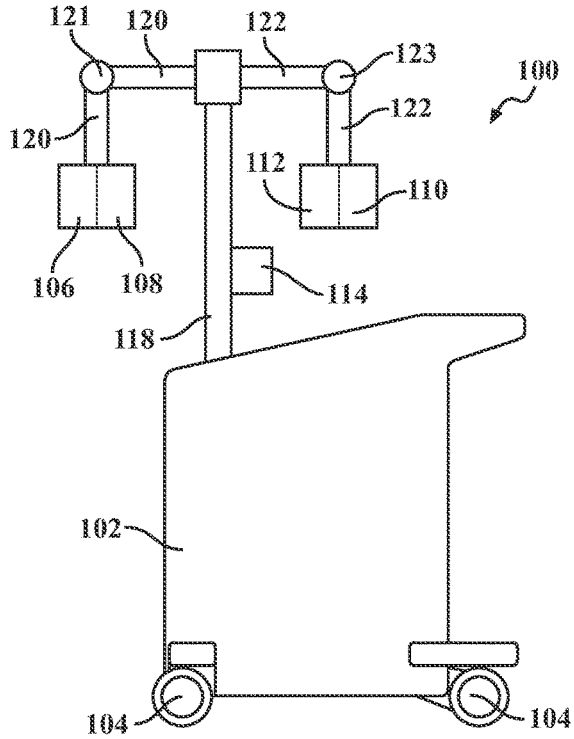
FIG. 5 is a schematic illustration of one implementation of the surgical cart, with the surgical cart including the pillar supporting the first arm, the first docking feature, and the first device, and with the pillar supporting the second arm, the second docking feature, and the second device, and with the pillar supporting the third docking feature.
Figure 6:
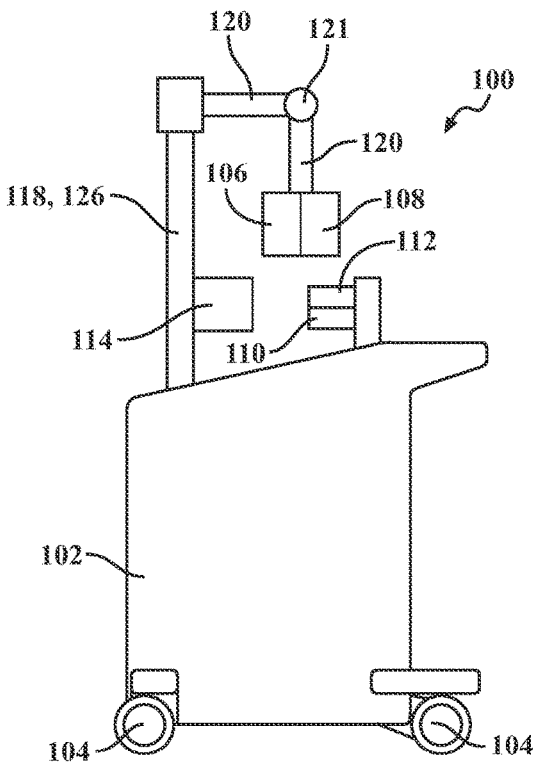
FIG. 6 is a schematic illustration of one implementation of the surgical cart, with the surgical cart including the pillar supporting the first arm, the first docking feature, and the first device, and including the second pillar supporting the second docking feature and the second device, and with the first pillar supporting the third docking feature.

Moreover, the pillar 118 may be further defined as a first pillar 126, and the surgical cart 100 may further include a second pillar 128 extending from the base 102 and spaced from the first pillar 126. In one implementation, as shown in FIGS. 2, 6, and 9, the second device 110 and the second docking feature 112 may be supported by the second pillar 128. More specifically, in some implementations, the second docking feature 112 and the second device 110 may be pivotably mounted relative to the second pillar 128. In other implementations, the second pillar 128 may support the second arm 122, and the second arm 122 may support the second docking feature 112 and the second device 110. The second device 110 and the second docking feature 112 may be moveable between a first spatial orientation and a second spatial orientation different from the first spatial orientation. The first docking feature 108 is engageable with the second docking feature 112 in either of the first spatial orientation and the second spatial orientation.

In another implementation, as shown in FIG. 8, the third device 116 may be supported by the second pillar 128 and the third docking feature 114 may be supported by at least one chosen from the third device 116 and the second pillar 128. In other words, the third docking feature 114 is supported by the third device 116, the third docking feature 114 is supported by the second pillar 128, or the third docking feature 114 is supported by both the third device 116 and the second pillar 128. More specifically, the third device 116 and the third docking feature 114 may be pivotably mounted relative to the second pillar 128. The third device 116 and the third docking feature 114 may be moveable between a first spatial orientation and a second spatial orientation different from the first spatial orientation, and the first docking feature 108 and the second docking feature 112 may be engageable with the third docking feature 114 in either of the first spatial orientation and the second spatial orientation.

Figure 34C:
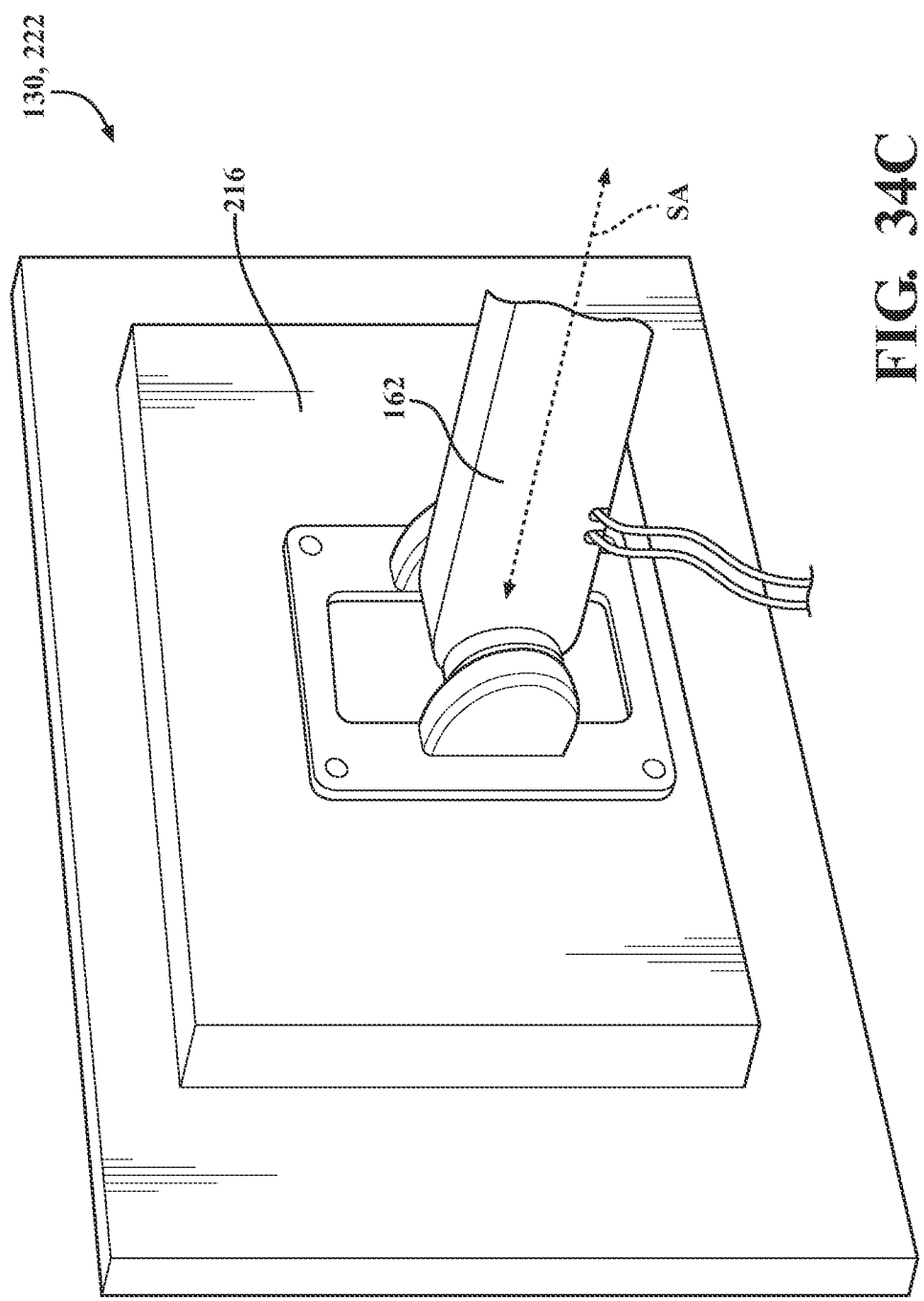
FIG. 34C is a perspective view of one implementation of the back panel of the surgical monitor, with the handle assembly including a shaft having a distal shaft end supporting the surgical monitor.
Figure 35:
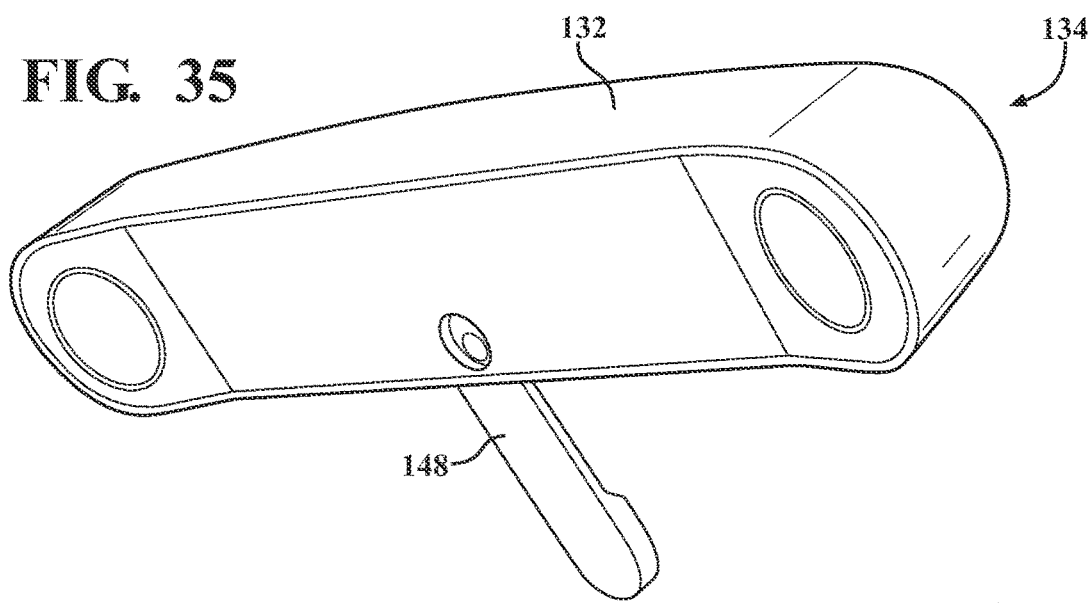
FIG. 35 is a perspective view of one implementation of a localizer, such as a navigation camera.
Figure 36:
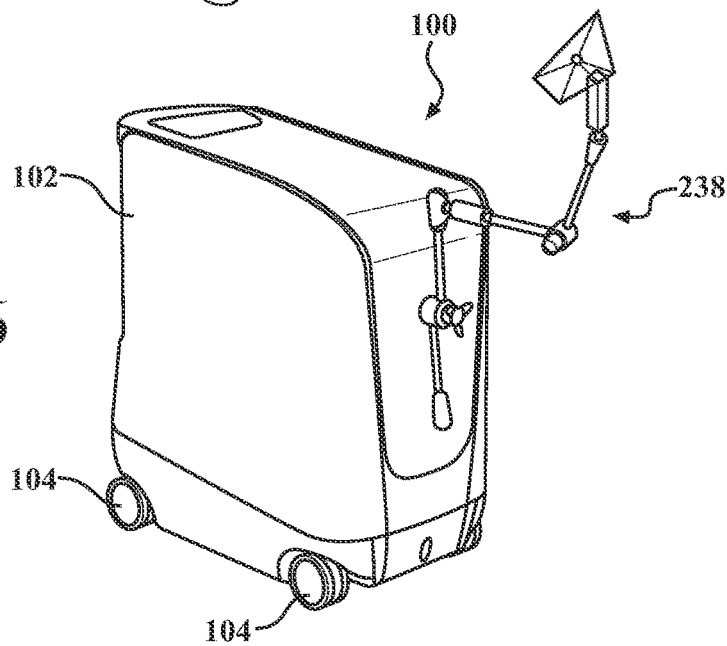
FIG. 36 is a perspective view of one implementation of a cart tracker couplable to the surgical cart.
Figure 37:
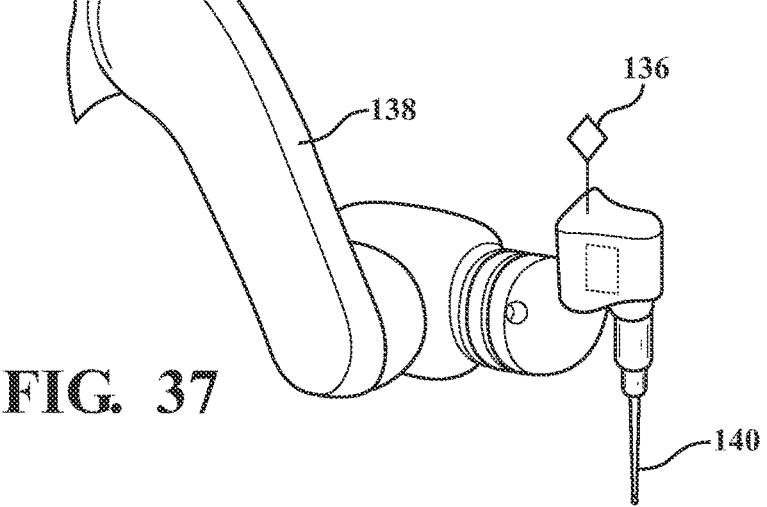
FIG. 37 is a perspective view of one implementation of a robotic arm supporting an end effector and a surgical tracker.

As shown in FIGS. 34A-37, in some implementations, the first device 106 is at least one of a display device or surgical monitor 130, a navigation camera 132, a localizer 134, a surgical tracker 136, a cart tracker 238 that can be coupled to the cart 100 with a (rigid or adjustable) arm, a robotic arm 138, an end effector 140, and a limb holder. In some implementations, the second device 110 is at least one of the display device or surgical monitor 130, the navigation camera 132, the localizer 134, the surgical tracker 136, the cart tracker 238, the robotic arm 138, the end effector 140, and a limb holder. In some implementations, the third device 116 is at least one of the surgical monitor 130, the navigation camera 132, the localizer 134, the surgical tracker 136, the cart tracker 238, the robotic arm 138, the end effector 140, and the limb holder. Although not required, the navigation camera 132 may be a type of localizer 134. The first device 106, the second device 110, and the third device 116 may also be any sensitive electronic component. The first device 106 may be any of the above listed devices, the second device 110 may be any of the above listed devices irrespective of the particular device of the first device 106, and the third device 116 may be any of the above listed devices irrespective of the particular devices of the first device 106 and the second device 110. In other words, the first, second, and third devices 106, 110, 116 may all be surgical monitors 130, or may all be navigation cameras 132, or may all be localizers 134, or may all be trackers 136, or may all be robotic arms 138, or may all be end effectors 140. Moreover, any combination thereof is additionally contemplated. The surgical monitor 130 is shown in FIGS. 34A-34C, the navigation camera 132 and the localizer 134 are shown in FIG. 35, the cart tracker 238 is shown in FIG. 36, and the surgical tracker 136, the robotic arm 138, and the end effector 140 are all shown in FIG. 37. It is also contemplated that the first device 106, the second device 110, and the third device 116 may be other surgical devices.

As shown in FIGS. 23, 25B, 26, 28, 30B-34A, the surgical cart 100 may also include a locking mechanism 142 for selectively securing the first docking feature 108 and the second docking feature 112 together. The locking mechanism 142 may be configured to selectively secure the first docking feature 108 and the second docking feature 112 together. The locking mechanism 142 may either have a passive configuration or an active configuration. Said differently, the locking mechanism 142 may have the passive configuration which secures the first docking feature 108 and the second docking feature 112 together upon engagement of the first docking feature 108 and the second docking feature 112 and without any additional input from a user, or the locking mechanism may have an the active configuration which requires input from the user to secure the first docking feature 108 and the second docking feature 112 together before, after, and/or concurrently with engagement of the first docking feature 108 and the second docking feature 112.

In a non-limiting example of the passive configuration of the locking mechanism 142, the locking mechanism 142 may include a detent such as but not limited to a ball and spring detent having a ball, a spring both coupled to the ball and coupled to one of the first docking feature 108 and the second docking feature 112, and a recess defined into the other of the first docking feature 108 and the second docking feature 112. The ball may be disposable in the recess to secure the first docking feature 108 and the second docking feature 112 together.

In another non-limiting example of the passive configuration of the locking mechanism 142, one or both of the first docking feature 108 and the second docking feature 112 may include a permanent magnet to secure the first docking feature 108 and the second docking feature 112 together. In the implementations where both the first docking feature 108 and the second docking feature 112 both include a permanent magnet, the permanent magnets may have opposite polarities to attract one another and to secure the first docking feature 108 to the second docking feature 112. In the implementations where only one of the first docking feature 108 and the second docking feature 112 includes a permanent magnet, the other of the first docking feature 108 and the second docking feature 112 may include a ferromagnetic material to which the permanent magnet may be attracted to secure the first docking feature 108 and the second docking feature 112.

In a non-limiting example of the active configuration of the locking mechanism 142, the locking mechanism 142 may include an electromagnetic switch configured to selectively secure the first docking feature 108 and the second docking feature 112 together. The electromagnetic switch may be initiated upon engagement of the first docking feature 108 and the second docking feature 112. Moreover, the electromagnetic switch may be configured to selectively magnetize one or both of the first docking feature 108 and the second docking feature 112 to attract and secure the other of the first docking feature 108 and the second docking feature 112.

In another non-limiting example of the active configuration of the locking mechanism 142, the locking mechanism 142 may have a push-push configuration or a catch configuration. Moreover, the locking mechanism 142 may include a plunger 144 couplable to one of the first docking feature 108 and the second docking feature 112. In other words, the plunger 144 may be couplable to the first docking feature 108, to the second docking feature 112, or to both the first docking feature 108 and the second docking feature 112. Moreover, the plunger 144 may be directly affixed to another component of the locking mechanism 142 while still being couplable to one of the first docking feature 108 and the second docking feature 112.

The plunger 144 may be moveable between a first plunger position, as shown in FIG. 32, and a second plunger position, as shown in FIG. 33. In the first plunger position, the first docking feature 108 and the second docking feature 112 are secured together. More specifically, after the first docking feature 108 and the second docking feature 112 are engaged, the plunger 144 may be moved to the first plunger position to secure the first docking feature 108 and the second docking feature 112 together and prevent disengagement of the first docking feature 108 and the second docking feature 112. In the second plunger position, the first docking feature 108 is disengageable from the second docking feature 112. In other words, after the first docking feature 108 and the second docking feature 112 are engaged, the plunger 144 may be moved to the second plunger position and the first docking feature 108 and the second docking feature 112 may be disengaged from one another.

The plunger 144 may be moveable in a linear direction between the first plunger position and the second plunger position. More specifically, the plunger 144 may extend along a primary plunger axis PA, and the plunger 144 may be moveable axially along the primary plunger axis PA between the first plunger position and the second plunger position. The locking mechanism 142 may further include a biasing mechanism 146 coupled to the plunger 144. More specifically, the biasing mechanism 146 may be disposed about the plunger 144. The biasing mechanism may extend circumferentially about the primary plunger axis PA. The biasing mechanism 146 may be configured to bias the plunger 144 toward the first plunger position. In other words, the biasing mechanism 146 assists in securing the first docking feature 108 and the second docking feature 112 together. The biasing mechanism 146 may be a spring. In non-limiting examples, the biasing mechanism 146 may be a coil spring, a wave spring of any type, a Belleville spring, a disc spring, a conical spring, or a leaf spring, among other possibilities.

Further, the plunger 144 may be configured to be retained in the second plunger position in response to rotation of the plunger about the primary plunger axis PA. In non-limiting examples, the plunger 144 may be positioned in the first plunger position, moved to the second plunger position, and rotated approximately 90 degrees, approximately 180, approximately 270 degrees, or approximately 360 degrees either clockwise or counterclockwise about the primary plunger axis PA to prevent the plunger 144 from moving from the second plunger position back to the first plunger position. Retainment of the plunger 144 in the second plunger position permits easy disengagement of the first docking feature 108 and the second docking feature 112 by allowing an operator use of both hands to disengage the first docking feature 108 and the second docking feature 112. Said differently, an operator is not required to use one hand to manually hold the plunger 144 in the second plunger position, optionally against the force exerted by the biasing mechanism 146, while simultaneously using the other hand to disengage the first docking feature 108 and the second docking feature 112.

Further still, the plunger 144 may be configured to move between the second plunger position and the first plunger position upon engagement of the first docking feature 108 and the second docking feature 112. Said differently, engagement of the first docking feature 108 and the second docking feature 112 may cause the plunger 144 to move between the second plunger position and the first plunger position. More specifically, engagement of the first docking feature 108 and the second docking feature 112 may cause the plunger 144 to move from the second plunger position to the first plunger position, thereby securing the first docking feature 108 and the second docking feature 112 together without requiring the operator to manually move the plunger 144.

However, the biasing mechanism 146 may bias the plunger 144 toward the second plunger position. As such, the biasing mechanism 146 may assist in disengaging the first docking feature 108 and the second docking feature 112 after the first docking feature 108 and the second docking feature 112 have been secured by the plunger 144.

Moreover, in the implementations with the third docking feature 114, the plunger 144 in the first plunger position may be configured to selectively secure the first docking feature 108, the second docking feature 112, and the third docking feature 114 together. Securement of the first docking feature 108, the second docking feature 112, and the third docking feature 114 together with the plunger 144 may limit relative movement between the first docking feature 108 and the base 102, the second docking feature 112 and the base 102, and the third docking feature 114 and the base 102.

It is also to be appreciated that the plunger 144 may be disposed within one of the first docking feature 108, the second docking feature 112, or the third docking feature 114 such that the plunger 114 is approximately flush with the first docking feature 108, the second docking feature 112, or the third docking feature 114 such that the plunger 144 takes the form of a button which may be pressed to release the first docking feature 108, the second docking feature 112, and optionally the third docking feature 114 from securement with one another.

In one implementation, the first docking feature 108 has a male configuration and the second docking feature 112 has a female configuration such that the first docking feature 108 is disposable in the second docking feature 112. In another implementation, the first docking feature 108 has a female configuration and the second docking feature 112 has a male configuration such that the second docking feature 112 is disposable in the first docking feature 108.

Figure 29A:
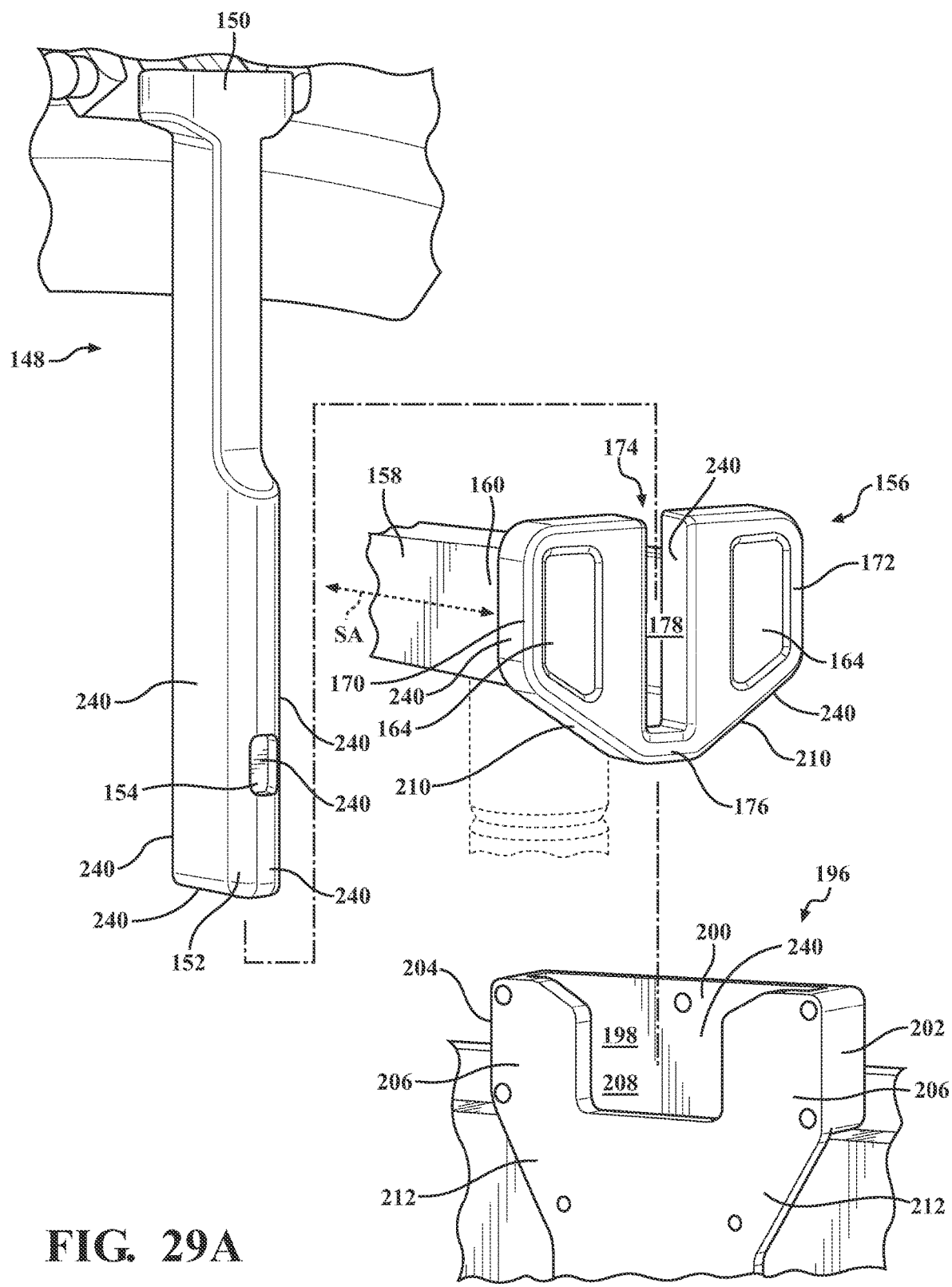
FIG. 29A is a perspective view of one implementation of the handle assembly, a pole handle, and the holster.
Figure 30A:
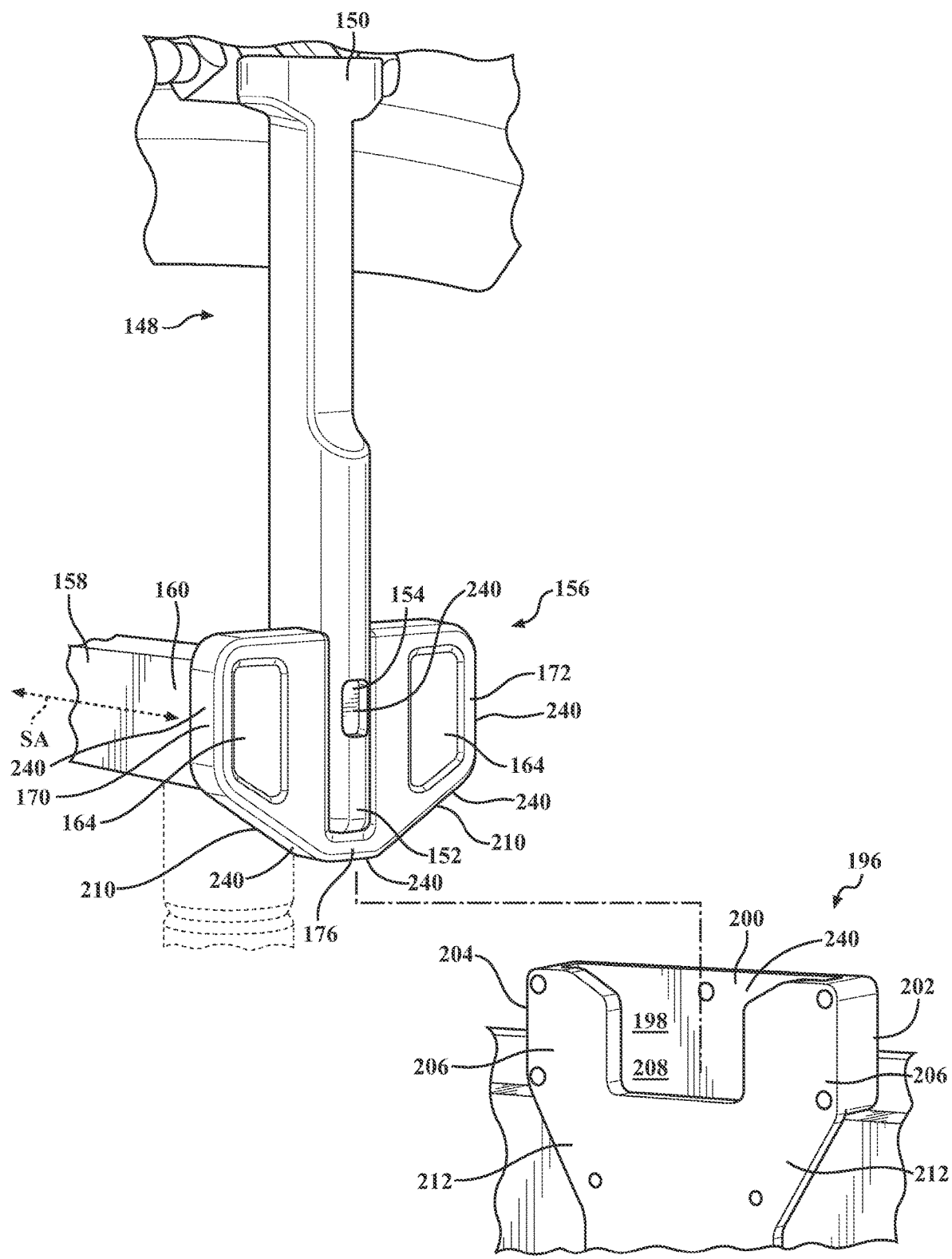
FIG. 30A is a perspective view of the handle assembly, the pole handle, and the holster of FIG. 29, with the pole handle inserted into the handle assembly, and with the pole handle and the handle assembly, in combination, insertable into the holster interior of the holster.
Figure 30B:
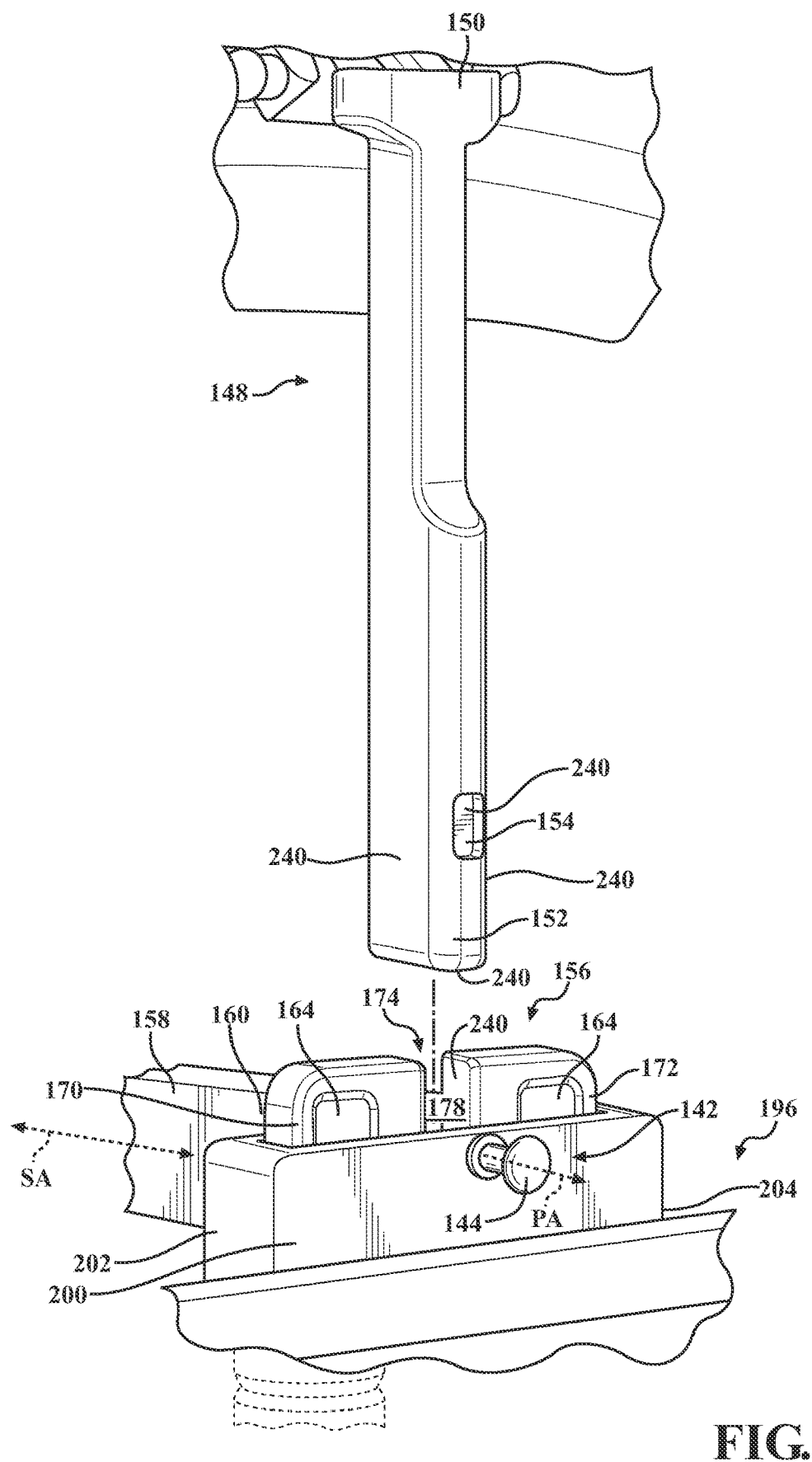
FIG. 30B is a perspective view of the handle assembly, the pole handle, and the holster of FIG. 29, with the handle assembly inserted into the holster interior of the holster, and with the pole handle insertable into the handle assembly and the holster interior of the holster.
Figure 31A:
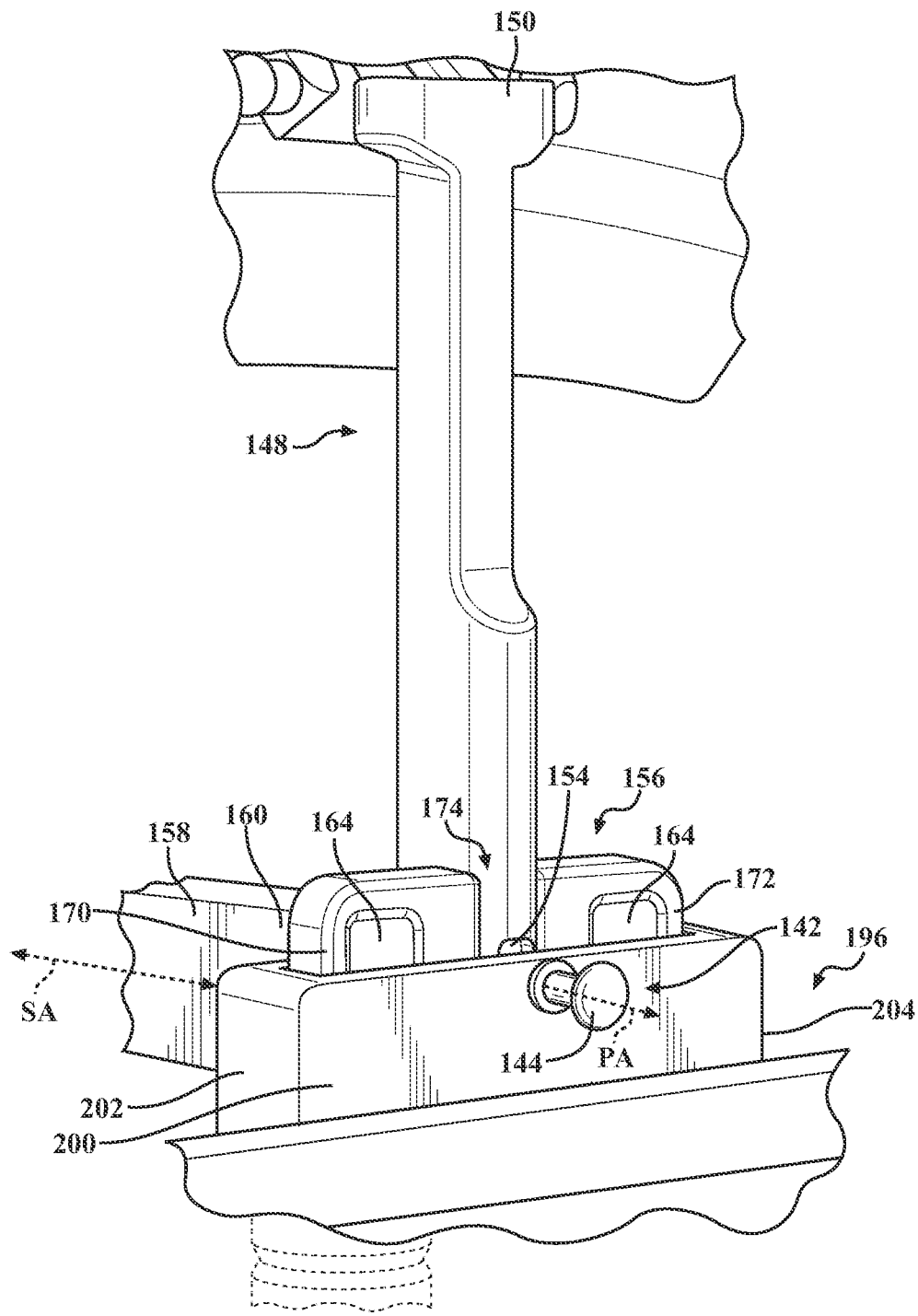
FIG. 31A is a perspective view of the handle assembly, the pole handle, and the holster of FIG. 29, with the handle assembly, the pole handle, and the holster engaged with one another through the locking mechanism including the plunger.

Referring now to FIGS. 29-31, one of the first docking feature 108 and the second docking feature 112 may be a pole handle 148 extending from a first pole end 150 to a second pole end 152. The pole handle 148 may extend longitudinally between the pole ends 150, 152. The pole handle 148 can be a straight handle, curved handle, or any other suitable shape to enable a user to grab the handle 148. The pole handle 148 may define an indentation 154. The pole handle 148 has a male configuration. The other of the first docking feature 108 and the second docking feature 112 may be a handle assembly 156. In relation to the pole handle 148, the handle assembly 156 has a female configuration. It is also possible for the pole handle 148 to have a female configuration and for the handle assembly 156 to have a male configuration. The handle assembly 156 may include a shaft 158 extending along a shaft axis SA between a proximal shaft end 160 and a distal shaft end 162 spaced from the proximal shaft end 160 along the shaft axis SA. The handle assembly 156 may also include a graspable component 164 coupled to the proximal shaft end 160 of the shaft 158. The graspable component 164 extends radially away from the shaft axis SA. Moreover, although not required, the shaft axis SA may be co-axial with the primary plunger axis PA when the first docking feature 108, the second docking feature 112, and optionally the third docking feature 114 are engaged with one another. Alternatively, the plunger 144 may be disposed such that the plunger axis PA is normal to, or skew relative to, the shaft axis SA when the first docking feature 108, the second docking feature 112, and optionally the third docking feature 114 are engaged with one another.

Figure 29B:
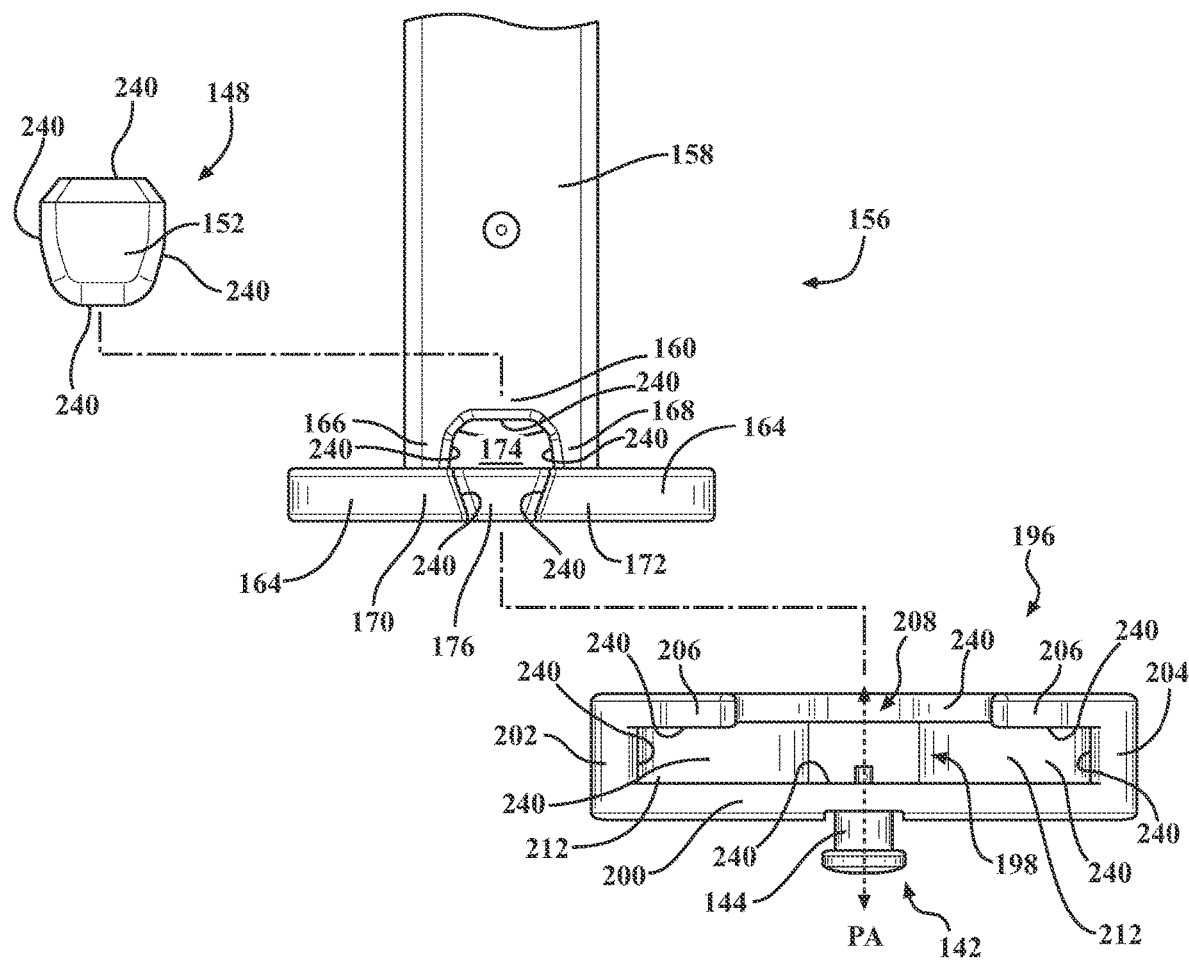
FIG. 29B is a top view partially in cross-section of the handle assembly, the pole handle, and the holster of FIG. 29A.
Figure 31B:
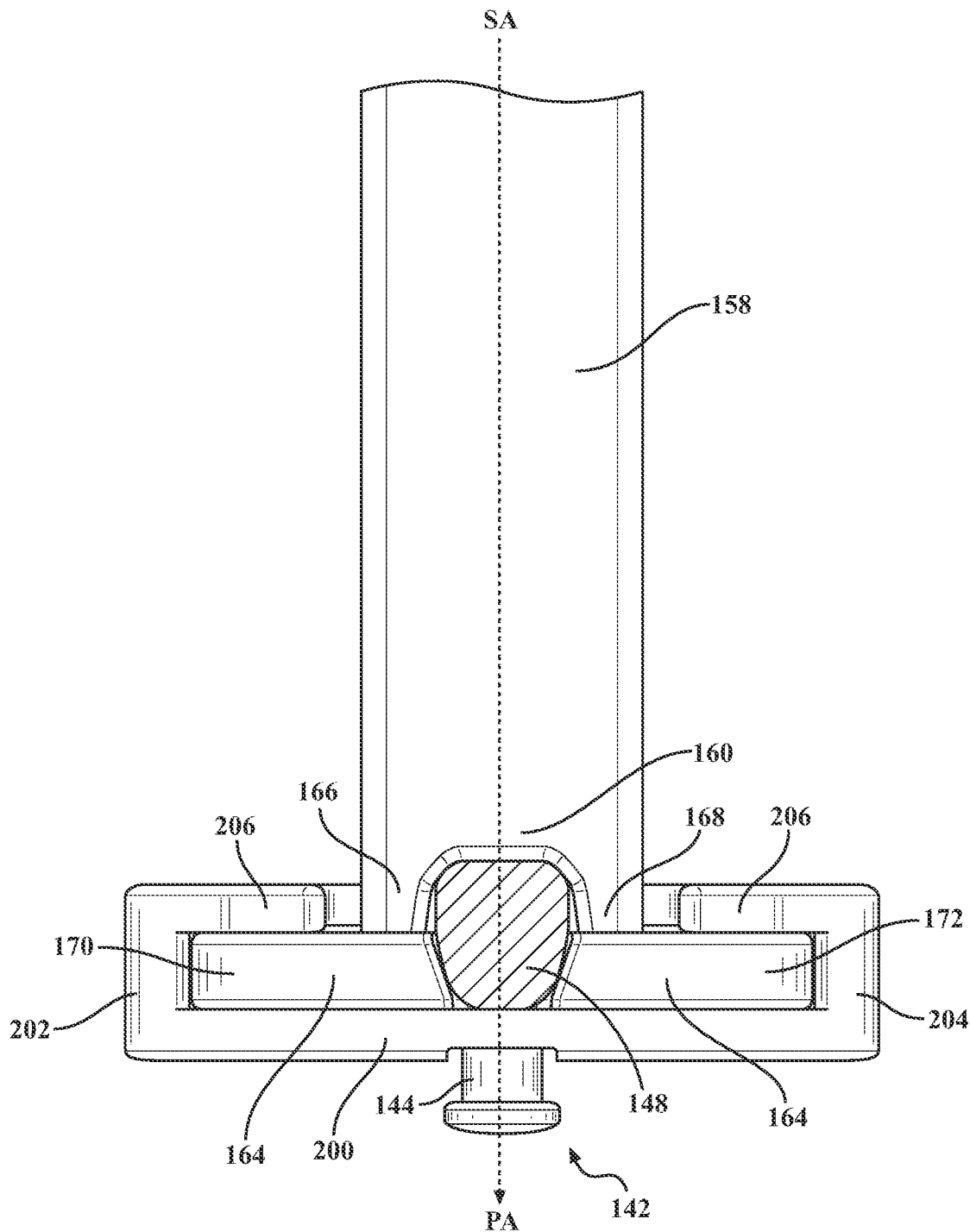
FIG. 31B is a top view partially in cross-section of the handle assembly, the pole handle, and the holster of FIG. 31A.

Further, the shaft 158 may include a first shaft arm 166 extending axially from the proximal shaft end 160 of the shaft 158, and a second shaft arm 168 spaced from the first shaft arm 166 and extending axially from the proximal shaft end 160. Moreover, in non-limiting examples as shown in FIGS. 29B and 31B, the graspable component 164 may include a first handle portion 170 coupled to the first shaft arm 166 of the shaft 158, and a second handle portion 172 coupled to the second shaft arm 168 of the shaft 158. A slot 174 may be collectively defined by the first shaft arm 166, the second shaft arm 168, the first handle portion 170, and the second handle portion 172. The slot 174 may be configured to receive the pole handle 148 to engage the handle assembly 156 and the pole handle 148.

Moreover, the slot 174 may be shaped, sized, and/or configured to only permit insertion of the pole handle 148 in a particular orientation. Insertion of the pole handle 148 into the slot 174 in a particular orientation allows the particular device (i.e., the first device 106, the second device 110, or the third device 116) moveable with the pole handle 148 to be positioned in a particular orientation relative to the base 102 of the surgical cart 100. More specifically, in the implementations where the device moveable with the pole handle 148 is the localizer 134 and/or the navigation camera 132, insertion of the pole handle 148 into the slot 174 may allow the localizer 134 and/or the navigation camera 132 to face inwardly relative to the base 102 of the surgical cart 100. The localizer 134 and/or the navigation camera 132 facing inwardly relative to the base 102 of the surgical cart 100 further prevents potential damage to the localizer 134 and/or the navigation camera 132. Further, insertion of the pole handle 148 into the slot 174 in a particular orientation ensures alignment of the indentation 154 of the pole handle 148 with the plunger 148.

Moreover, each of the first handle portion 170 and the second handle portion 172 of the handle assembly 156 may extend radially with respect to the shaft axis SA. The handle assembly 156 may also further include a connection portion 176 extending between the first handle portion 170 and the second handle portion 172. The slot 174 may be further defined by the connection portion 176. In other words, the slot 174 may be collectively defined by the first shaft arm 166, the second shaft arm 168, the first handle portion 170, the second handle portion 172, and the connection portion 176.

The first handle portion 170, the second handle portion 172, and the connection portion 176 may collectively define an opening 178 through which the pole handle 148 is exposed. The plunger 144 of the locking mechanism 142 may be disposable at least partially in the indentation 154 to secure the pole handle 148 to the handle assembly 156. More specifically, the plunger 144 may be disposed at least partially in the indentation 154 in the first plunger position. Additionally, the indentation 154 of the pole handle 148 may be exposed through the opening 178 when the pole handle 148 is received in the slot 174 such that the plunger 144 is enabled to be disposed at least partially in the indentation 154 defined by the pole handle 148 in the first plunger position. Thus, in the first plunger position, the plunger 144 extends through the opening 178 and into the indentation 154. The slot 174 being shaped, sized, and/or configured to only permit insertion of the pole handle 148 in a particular orientation ensures alignment of the indentation 154 of the pole handle 148 with the opening 148 through which the plunger 144 may extend. The indentation 154 may be shaped, sized, and/or configured to receive the plunger 144.

In one implementation, the first device 106 is further defined as the navigation camera 132, the pole handle 148 is configured to adjust a position of the navigation camera 132, and the second device 110 is further defined as the surgical monitor 130. More specifically, an operator may manually move the navigation camera 132 by grasping the pole handle 148 to adjust the position of the navigation camera 132. The surgical monitor 130 may display anything related to the surgical procedure, including but not limited to: a GUI, patient images, pictures, video, positional information, or other information from the navigation camera 132. Additionally, the first arm 120 may be coupled to the base 102 and the first arm 120 may be coupled to the shaft 158 of the handle assembly 156 to support the handle assembly 156. The distal shaft end 162 of the shaft 158 of the handle assembly 156 may support the surgical monitor 130, as shown in FIG. 34C.

In the implementations shown in FIGS. 22-26, one of the first docking feature 108 and the second docking feature 112 is the handle assembly 156 including the graspable component 164. The graspable component 164 may include a component base 180 coupled to the proximal shaft end 160 of the shaft 158 and a handle body 182 supported by the component base 180. An indentation 184 may be defined by one or both of the component base 180 of the graspable component 164 and the handle body 182. Moreover, an opening 178 may be defined between the component base 180 and the handle body 182 to enable grasping of the handle body 182.

Figure 25A:
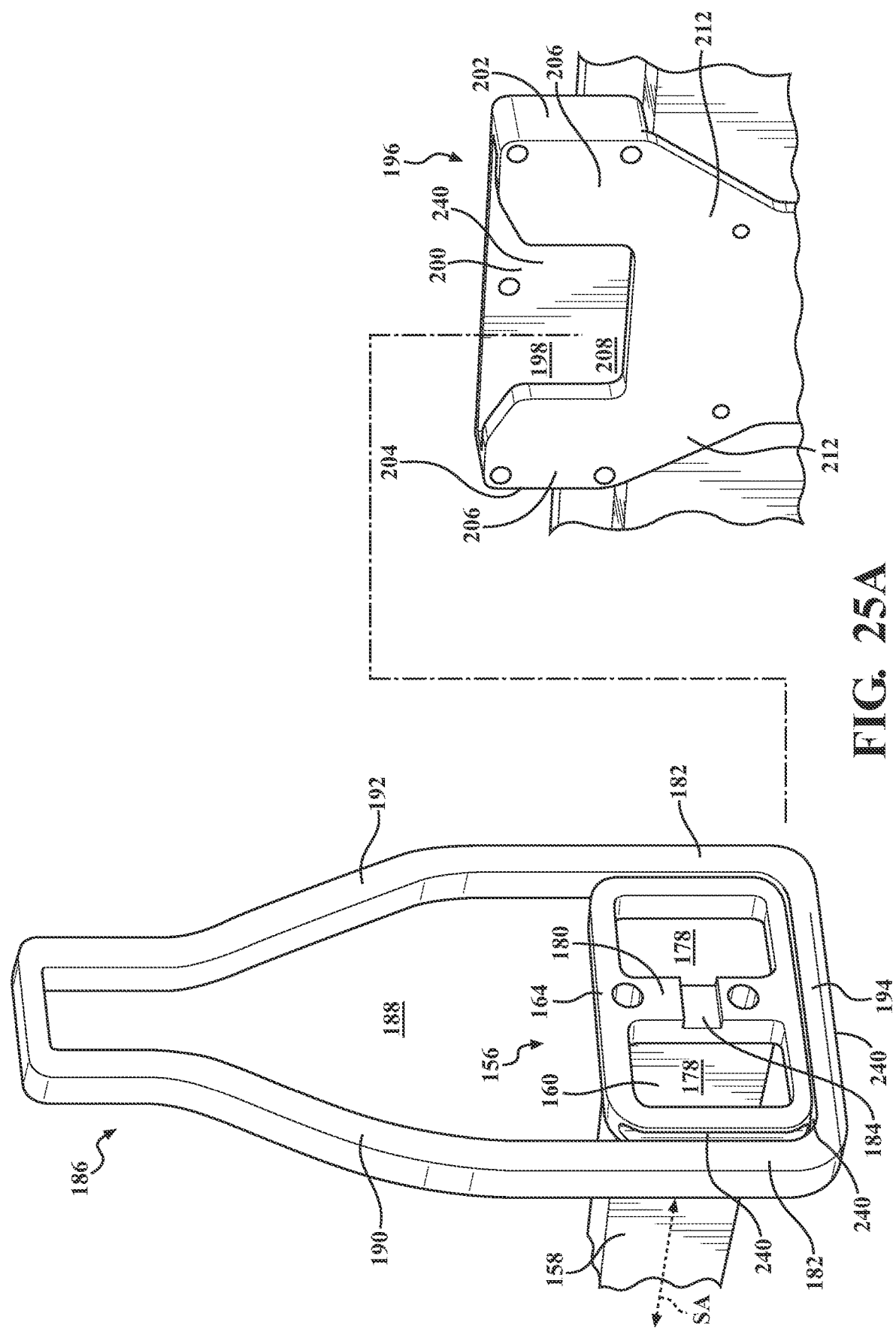
FIG. 25A is a perspective view of the handle assembly, the loop handle, and the holster of FIG. 24, with the handle assembly inserted into the loop handle, and with the handle assembly and the loop handle, in combination, insertable into the holster interior of the holster.
Figure 25B:
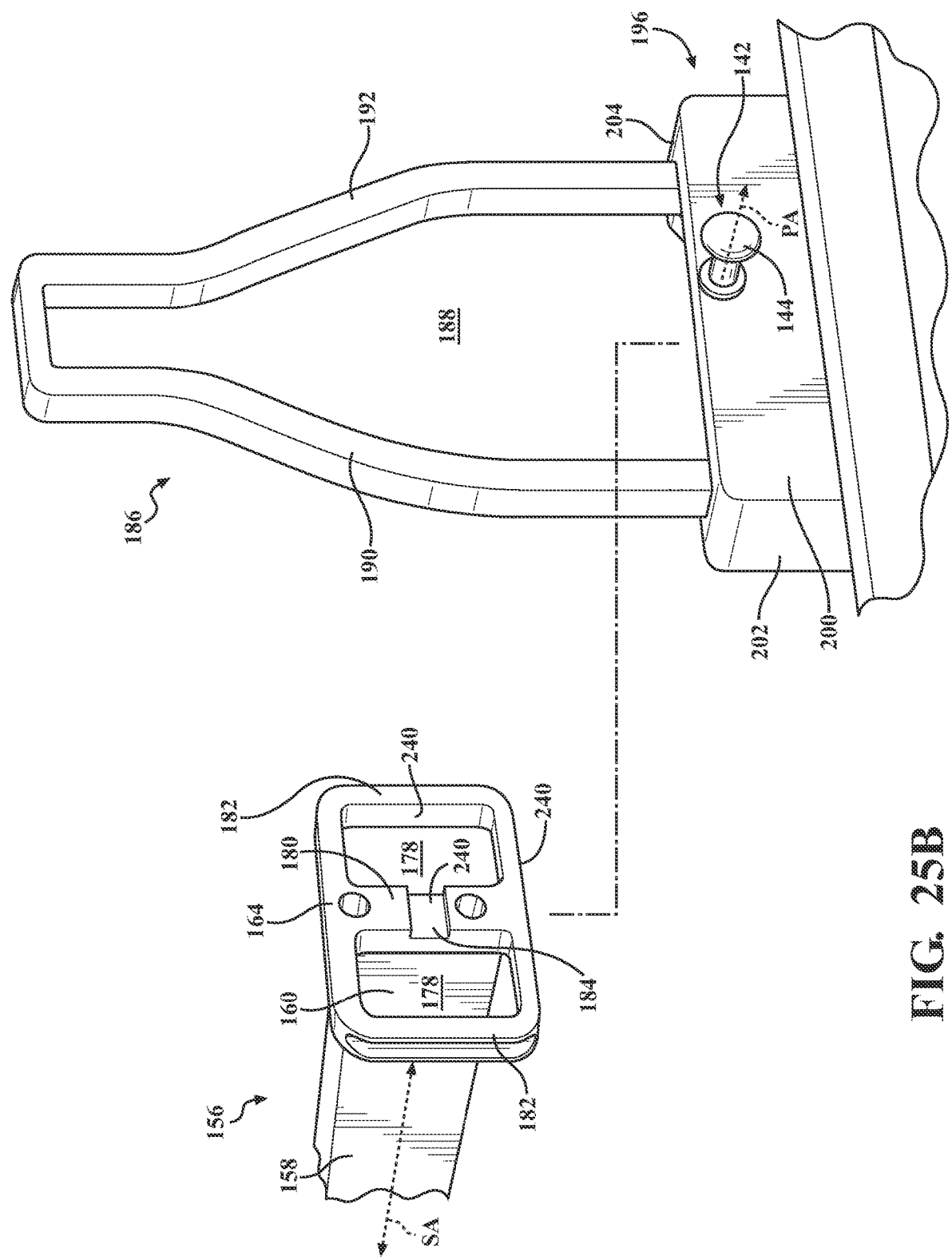
FIG. 25B is a perspective view of the handle assembly, the loop handle, and the holster of FIG. 24, with the loop handle inserted into the holster interior of the holster, and with the handle assembly insertable into both the loop handle and the holster interior of the holster.
Figure 26:
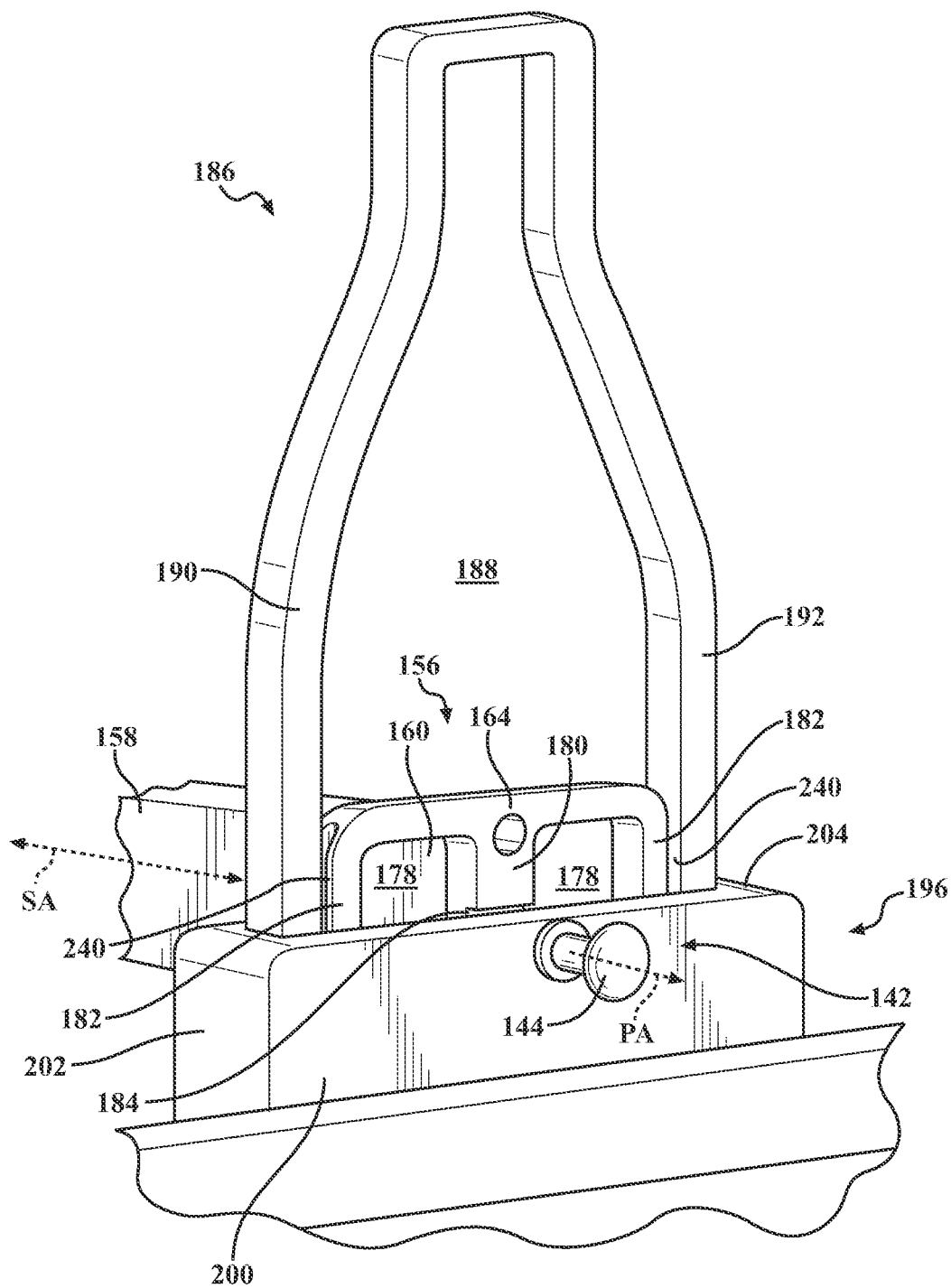
FIG. 26 is a perspective view of the handle assembly, the loop handle, and the holster of FIG. 24, with the handle assembly, the loop handle, and the holster engaged with one another through a locking mechanism including a plunger.

Additionally, as shown in FIGS. 24-26, the other of the first docking feature 108 and the second docking feature 112 may be a loop handle 186 defining an aperture 188 configured to receive the handle assembly 156. The loop handle 186 may be completely enclosed, as shown in FIGS. 24 and 25A. However, the loop handle 186 may be discontinuous and approximate a completed loop. Moreover, the loop handle 186 may have a first loop arm 190, a second loop arm 192 spaced from the first loop arm 190, and a loop base 194 extending between the first loop arm 190 and the second loop arm 192. Although not required, the loop base 194 may be generally linear (e.g., flat). Additionally, the first loop arm 190 and the second loop arm 192 of the loop handle 186 may taper toward one another distal to the loop base 194.

The plunger 144 of the locking mechanism 142 may be couplable to one of the handle assembly 156 and the loop handle 186. In other words, the plunger 144 may be couplable to the handle assembly 156, to the loop handle 186, or to both the handle assembly 156 and the loop handle 186. Moreover, the plunger 144 may be directly affixed to another component of the locking mechanism 142 while still being couplable to one of the handle assembly 156 and the loop handle 186. The plunger 144 may be moveable between a first plunger position in which the handle assembly 156 and the loop handle 186 are secured together, and a second plunger position in which the handle assembly 156 is disengageable from the loop handle 186. Additionally, the indentation 184 of the graspable component 164 of the handle assembly 156 may be configured to receive the plunger 144 to selectively secure the handle assembly 156 and the loop handle 186 together. More specifically, the plunger 144 is disposed at least partially in the indentation 184 in the first plunger position to selectively secure the handle assembly 156 and the loop handle 186 together.

In another implementation, as shown in FIGS. 22-34B, one of the first docking feature 108 and the second docking feature 112 is a holster 196 defining a holster interior 198, and the other of the first docking feature 108 and the second docking feature 112 is disposable in the holster interior 198 of the holster 196 to engage the holster 196 and the other of the first docking feature 108 and the second docking feature 112. The holster 196 may have a first wall 200, a second wall 202 extending away from the first wall 200, a third wall 204 opposite from the second wall 202 and extending away from the first wall 200, and a fourth wall 206 opposite from the first wall 200 and extending in part from the second wall 202 and in part from the third wall 204. The first wall 200, the second wall 202, the third wall 204, and the fourth wall 206 collectively define the holster interior 198. The fourth wall 206 defines a gap 208, and at least a portion of one of the first docking feature 108 and the second docking feature 112 is configured to extend through the gap 208 when disposed in the holster interior 198 of the holster 196.

Figure 22:
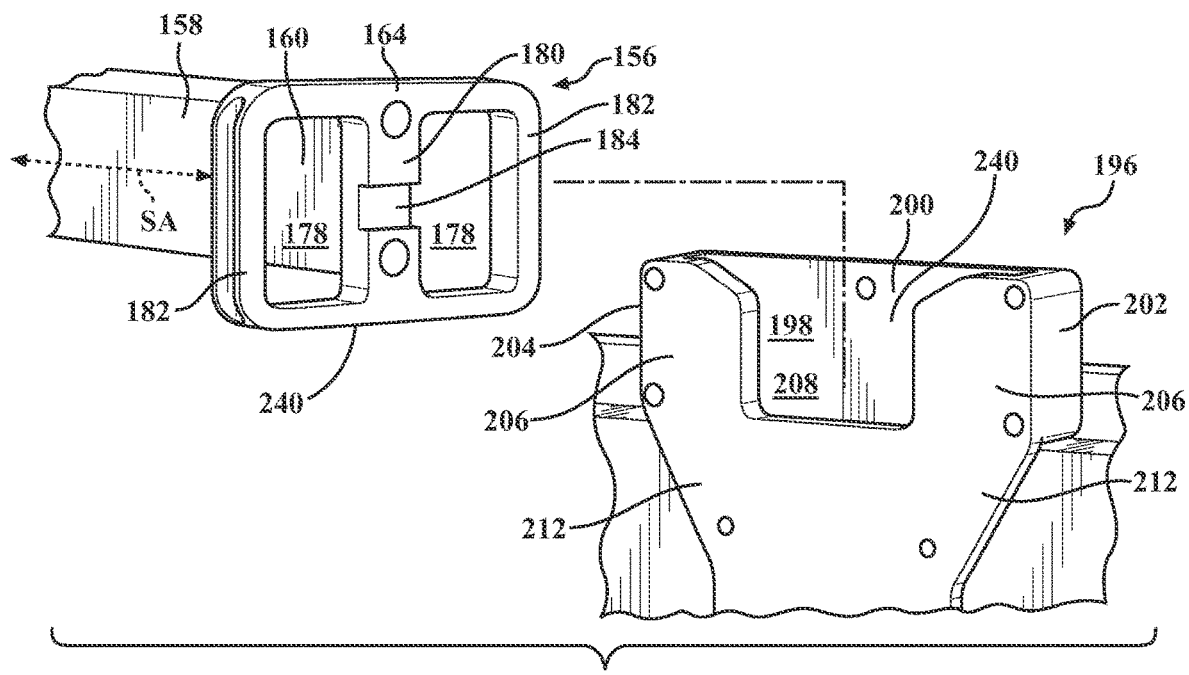
FIG. 22 is a perspective view of one implementation of a handle assembly and a holster defining a holster interior, with the handle assembly including a shaft having a proximal shaft end coupled to a graspable component, and with the handle assembly insertable in the holster interior of the holster.
Figure 23:
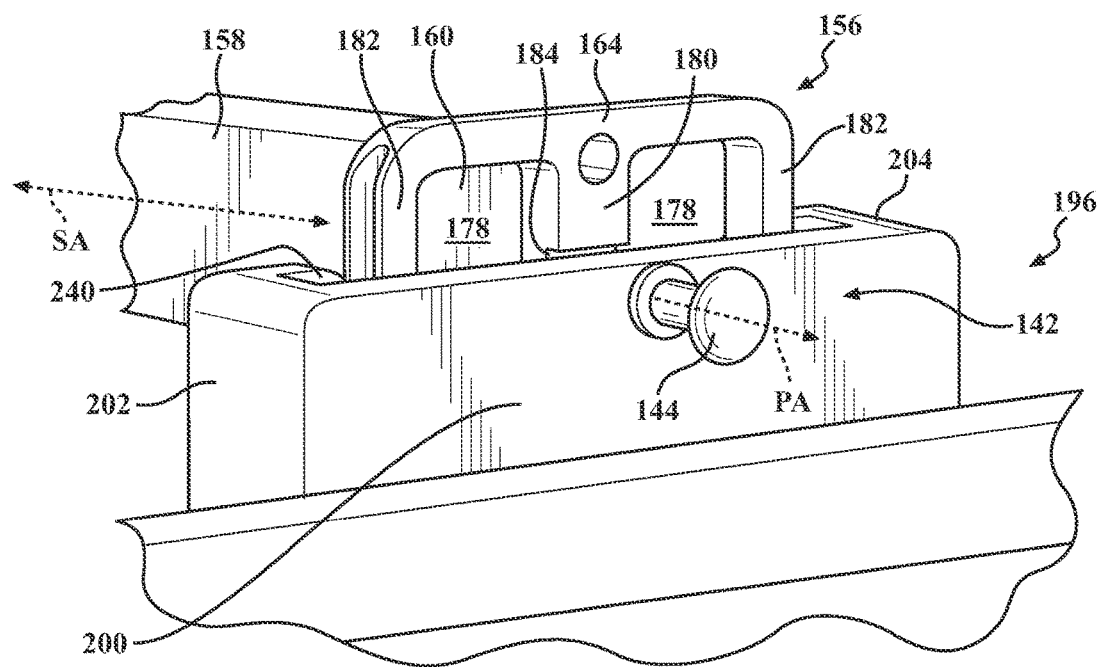
FIG. 23 is a perspective view of the handle assembly and the holster of FIG. 22, with the handle assembly inserted into the holster interior of the holster, and with the handle assembly and the holster engaged with one another.
Figure 27A:
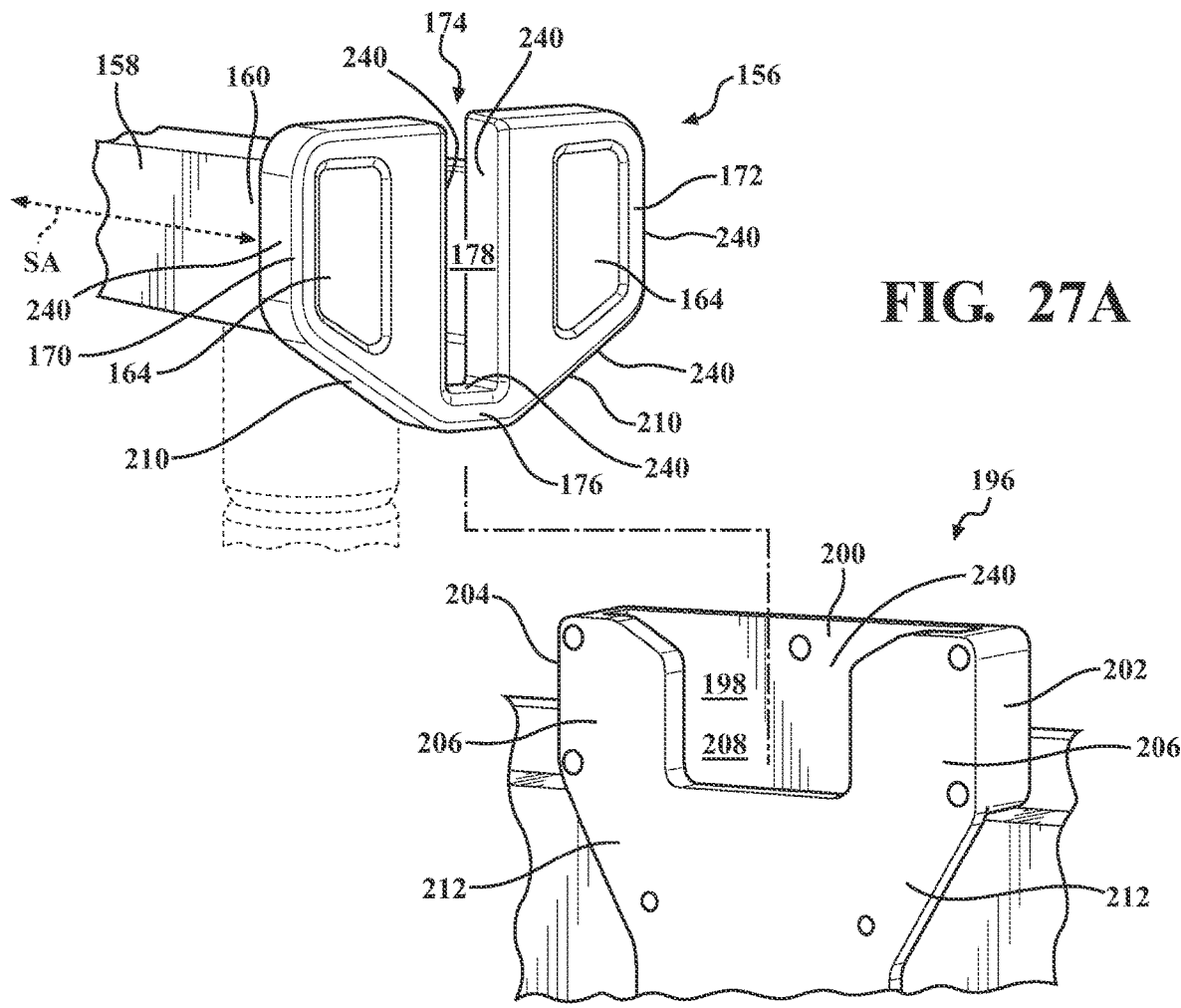
FIG. 27A is a perspective view of one implementation of the handle assembly and the holster, with the handle assembly insertable into the holster interior of the holster.

In the implementations where one of the first docking feature 108 and the second docking feature 112 is the holster 196, the other of the first docking feature 108 and the second docking feature 112 may be the handle assembly 156, as shown in FIGS. 22, 23, and 27A-, 28. At least a portion of the graspable component 164 of the handle assembly 156 may be disposable in the holster interior 198 of the holster 196, and at least a portion of the shaft 158 may be disposable in the gap 208 defined by the fourth wall 206. More specifically, at least a portion of the first handle portion 170 and at least a portion of the second handle portion 172 is disposable in the holster interior 198. The first and second handle portions 170, 172 may each include a tapered handle edge 210, as shown in FIGS. 27A, 27B, 29A, and 30A, and the holster 196 may define a tapered holster edge 212 in the holster interior 198 that is shaped to correspond to the tapered handle edge 210 of the first and second handle portions 170, 172, as shown in FIGS. 27C and 29B. The tapered handle edge 210 and the tapered holster edge 212 may allow the handle assembly 156 and the holster 196 to be engaged together in a particular orientation without requiring manual positioning.

Additionally, in the implementations where one of the first device 106, the second device 110, and the third device 116 is the surgical monitor 130, the surgical monitor 130 may have a monitor screen 214 and a back panel 216 opposite the monitor screen 214. The holster 196 may be fixed to the back panel 216 of the surgical monitor 130, as shown in FIGS. 34A and 34B. Moreover, the surgical cart 100 may include a tiltable linkage 218 connecting one of the first pillar 126 and the second pillar 128 to at least one chosen from the back panel 216 of the surgical monitor 130 and the holster 196. The tiltable linkage 218 may connect the first pillar 126 to the back panel 216 of the surgical monitor 130, may connect the first pillar 126 to the holster 196, or may connect the first pillar 126 to both the back panel 216 and the holster 196. Additionally, as shown in FIG. 34B, the tiltable linkage 218 may connect the second pillar 128 to the back panel 216 of the surgical monitor 130, may connect the second pillar 128 to the holster 196, or may connect the second pillar 128 to both the back panel 216 and the holster 196.

In the implementations with the third docking feature 114, the third docking feature 114 may have a female configuration, engagement of the first docking feature 108 and the second docking feature 112 collectively forms a male configuration, and the male configuration of the first docking feature 108 and the second docking feature 112 is disposable in the female configuration of the third docking feature 114. Alternatively, the third docking feature 114 may have a male configuration, engagement of the first docking feature 108 and the second docking feature 112 collectively forms a female configuration, and the male configuration of the third docking feature 114 is disposable in the female configuration of the first docking feature 108 and the second docking feature 112.

In one implementation, one of the first docking feature 108 and the second docking feature 112 is the pole handle 148, the other of the first docking feature 108 and the second docking feature 112 is the handle assembly 156, and the third docking feature 114 is the holster 196. In other words, the first docking feature 108 may be the pole handle 148, the second docking feature 112 may be the handle assembly 156, and the third docking feature 114 may be the holster 196. Alternatively, the first docking feature 108 may be the handle assembly 156, the second docking feature 112 may be the pole handle 148, and the third docking feature 114 may be the holster 196.

As shown in FIG. 30B, the handle assembly 156 may be insertable into the holster interior 198 defined by the holster 196, and the pole handle 148 may be insertable into the slot 174 collectively defined by the holster 196 and the handle assembly 156. Alternatively, as shown in FIG. 30A, the pole handle 148 may be insertable into the slot 174 defined at least partially by the handle assembly 156, and the pole handle 148 and the handle assembly 156, in combination, are insertable into the holster interior 198 defined by the holster 196. The alternative engagement configurations as described immediately above offers further modularity for an operator to engage the first docking feature 108, the second docking feature 112, and the third docking feature 114.

Moreover, as discussed above, the holster 196 may include the locking mechanism 142 to selectively secure the pole handle 148, the handle assembly 156, and the holster 196 together. The locking mechanism 142 may engage the indentation 154 defined by the pole handle 148. Additionally, the handle assembly 156 may define the opening 178 to expose the indentation 154 of the pole handle 148, and the locking mechanism 142 may be extendable through the opening 178 of the handle assembly 156 to be disposable in the indentation 154 of the pole handle 148.

In another implementation, one of the first docking feature 108 and the second docking feature 112 is the loop handle 186, the other of the first docking feature 108 and the second docking feature 112 is the handle assembly 156, and the third docking feature 114 is the holster 196. In other words, the first docking feature 108 may be the loop handle 186, the second docking feature 112 may be the handle assembly 156, and the third docking feature 114 may be the holster 196. Alternatively, the first docking feature 108 may be the handle assembly 156, the second docking feature 112 may be the loop handle 186, and the third docking feature 114 may be the holster 196.

As shown in FIG. 25B, the loop handle 186 may be insertable into the holster interior 198 defined by the holster 196 and the handle assembly 156 may be insertable into both the aperture 188 defined by the loop handle 186 and the holster interior 198 of the holster 196. Alternatively, as shown in FIG. 25A, the handle assembly 156 may be insertable into the aperture 188 defined by the loop handle 186, and the loop handle 186 and the handle assembly 156, in combination, may be insertable into the holster interior 198 defined by the holster 196. The alternative engagement configurations as described immediately above offers further modularity for an operator to engage the first docking feature 108, the second docking feature 112, and the third docking feature 114.

Moreover, as discussed above, the holster 196 may include the locking mechanism 142 to selectively secure the loop handle 186, the handle assembly 156, and the holster 196 together. The locking mechanism 142 may engage the indentation 184 defined by the handle assembly 156. Additionally, the loop handle 186 may define the aperture 188 to expose the indentation 184 of the handle assembly 156, and the locking mechanism 142 may be extendable through the aperture 188 of the loop handle 186 to be disposable in the indentation 184 of the handle assembly 156.

The pole handle 148 may be referred to as a camera handle 148 when supported with the navigation camera 132. In one implementation, the surgical cart 100 includes a first surgical monitor 220 supported by the first arm 120, and the first surgical monitor 220 is moveable relative to the base 102. The handle assembly 156 may be coupled to the first surgical monitor 220, and the handle assembly 156 may be moveable with the first surgical monitor 220 relative to the base 102. The surgical cart 100 may also include a navigation camera 132 supported by the second arm 122, and the navigation camera 132 is moveable relative to the base 102. The surgical cart 100 may also include a second surgical monitor 222 coupled to the base 102, a holster 196 coupled to the second surgical monitor 222, and the holster 196 is engageable with the handle assembly 156 and the camera handle 148 to selectively engage the holster 196, the handle assembly 156, and the camera handle 148 together.

Moreover, in the implementation described in the paragraph immediately above, the handle assembly 156 may be insertable into the holster 196 and the camera handle 148 is insertable into the slot 174 collectively defined by the holster 196 and the handle assembly 156. Moreover, the camera handle 148 may be configured to be nested with the handle assembly 156, and the camera handle 148 and the handle assembly 156, in combination, are insertable into the holster 196. As previously discussed, the holster 196 may include the locking mechanism 142 to selectively secure the camera handle 148 and the handle assembly 156 to the holster 196. The camera handle 148 may also define the indentation 154, the handle assembly 156 may define the opening 178 to expose the indentation 154 of the camera handle 148, and the locking mechanism 142 may extend through the opening 178 of the handle assembly 156 to engage the indentation 154 of the camera handle 148. Alternatively, the handle assembly 156 may define the indentation 184, the camera handle 148 defines the opening 178 to expose the indentation 184 of the handle assembly 156, and the locking mechanism 142 extends through the opening 178 of the camera handle 148 to engage the indentation 184 of the handle assembly 156.

Figure 27B:
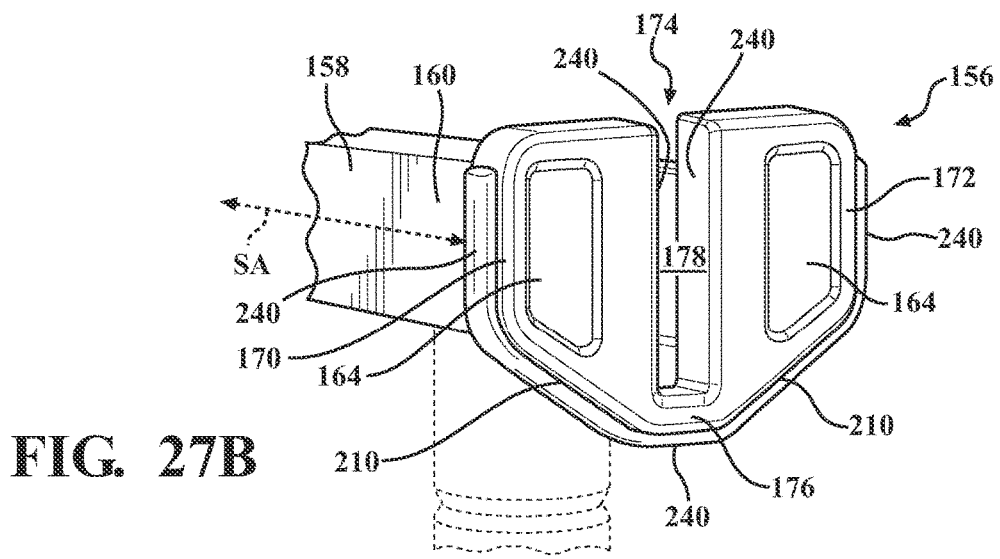
FIG. 27B is a perspective view of the handle assembly of FIG. 27A, with the handle assembly including a damper.
Figure 27C:
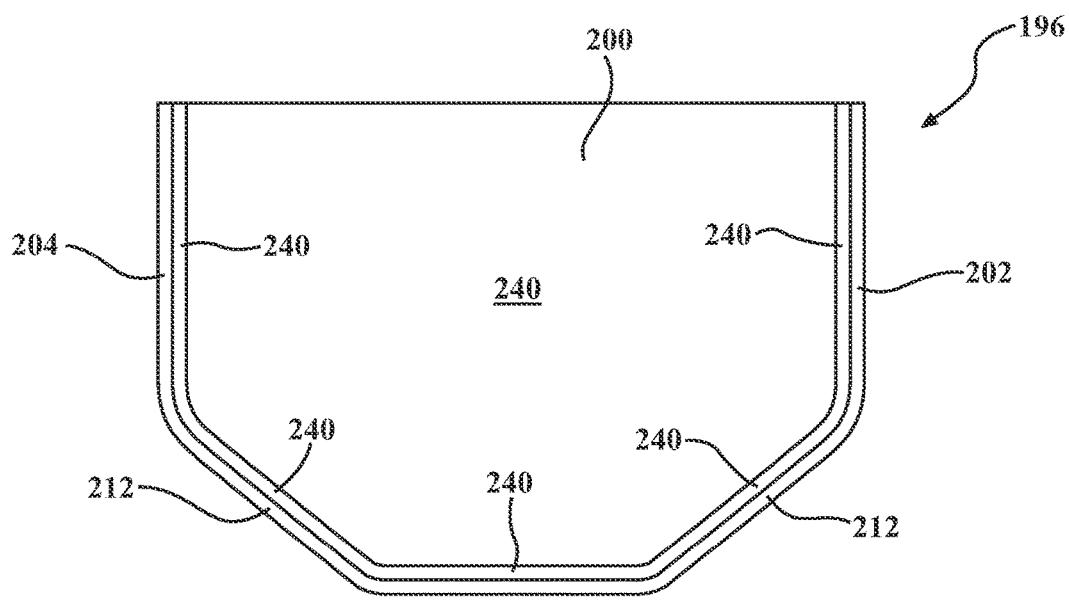
FIG. 27C is a perspective view partially in cross-section of the holster of FIG. 27A, with the holster including a damper.
Figure 28:
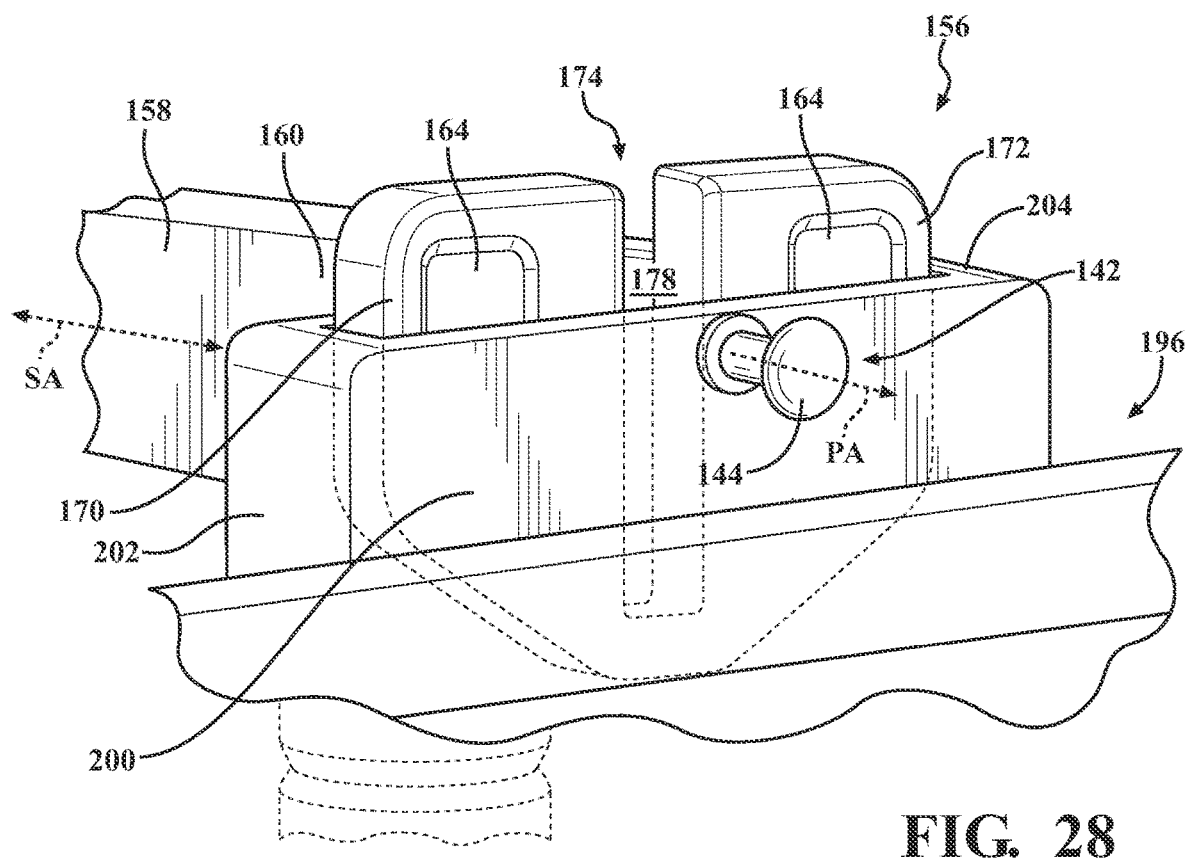
FIG. 28 is a perspective view partially in phantom of the handle assembly and the holster of FIG. 27A, with the handle assembly inserted into the holster interior of the holster, and with the handle assembly and the holster engaged with one another.

Moreover, as shown in FIGS. 27B and 27C, the surgical cart 100 may further include a damper 240 disposable between the first docking feature 108 and the second docking feature 112. The damper may be configured to dampen movement between the first docking feature 108 and the second docking feature 112. More specifically, the damper 240 may be fixed to the first docking feature 108, may be fixed to the second docking feature 112, or may be fixed to neither the first docking feature 108 or the second docking feature 112 but may nonetheless be disposable between the first docking feature 108 and the second docking feature 112.

Additionally or alternatively, the surgical cart 100 may include the damper 240 disposable between the third docking feature 114 and one of the first docking feature 108 and the second docking feature 112. In other words, the damper 240 may be disposable between the third docking feature 114 and the first docking feature 108 or may be disposable between the third docking feature 114 and the second docking feature 112. The damper 240 may be disposable between the first docking feature 108, the second docking feature 112, and the third docking feature 114. The damper 240 may be configured to dampen movement between the third docking feature and first docking feature 108 and the second docking feature 112. More specifically, the damper 240 may be fixed to the first docking feature 108, may be fixed to the second docking feature 112, may be fixed to the third docking feature 114, or may be fixed to neither the first docking feature 108, the second docking feature 112, or the third docking feature 114 but may nonetheless be disposable between the third docking feature 114 and one of the first docking feature 108 and the second docking feature 112.

Although not necessarily present, gaps may be defined between the first docking feature 108, the second docking feature 112, and/or the third docking feature 114 when engaged with one another. Gaps may lead to relative movement (e.g., vibration) between the first docking feature 108, the second docking feature 112, and/or the third docking feature 114 as well as between the devices associated with the docking features. Relative movement (e.g., vibration) of the first device 106, the second device 110, and/or the third device 116 may cause damage to the devices. More specifically, in the implementations where the device is the localizer 134 and/or the navigation camera 132, the localizer 134 and/or the navigation camera 132 may capture inaccurate images which may result in errors occurring in the positioning and control of end effectors during surgical procedures, potentially damaging patients. The damper 240 prevents relative movement between the first docking feature 108, the second docking feature 112, and/or the third docking feature 114 which may result from gaps defined therebetween, and thus also prevents damage to the devices moveable with the docking features. Moreover, the damper 240 may result in more accurate images being taken by the localizer 134 and/or the navigation camera 132.

The damper 240 may be attached to, or disposed between, any of the first docking feature 108, the second docking feature 112, and/or the third docking feature 114, including all designs thereof disclosed herein. More specifically, the damper 240 may be attached to the tapered handle edge 210 of the first and second handle portions 170, 172, as shown in FIG. 27B. The damper 240 may additionally or alternatively be attached to the tapered holster edge 212 in the holster interior 198, as shown in FIG. 27C. Moreover, the damper 240 may be attached to the plunger 144, and may even be attached to either the first surgical monitor 220 or the second surgical monitor 222.

As non-limiting examples, the damper 240 may include polymeric materials such as but not limited to rubber, and/or may include springs. The damper 240 may also include a liner or a coating such as but not limited to a paint to limit wear on the first docking feature 108, the second docking feature 112, and/or the third docking feature 114. The damper 240 may be flexible in whole or in part.

More specifically, the damper 240 may include a biasing mechanism. The biasing mechanism may be a spring such as a coil spring, a wave spring of any type, a Belleville spring, a disc spring, a conical spring, or a leaf spring, among other possibilities. The biasing mechanism may be in direct contact with one or more of the first docking feature 108, the second docking feature 112, and the third docking feature 114 and may be referred to as a naked spring. Additionally, the damper 240 may further include a platform coupled to the biasing mechanism, with the biasing mechanism configured to bias the platform against one or more of the first docking feature 108, the second docking feature 112, and the third docking feature 114. Moreover, the biasing mechanism may be compressed when the first docking feature 108, the second docking feature 112, and/or the third docking feature 114 are engaged with one another, and may be relaxed when the first docking feature 108, the second docking feature 112, and the third docking feature 114 are disengaged with one another.

Alternatively or additionally, the damper 240 may include polymeric materials such as but not limited to rubber. The rubber may result in the damper 240 functioning as a bumper or a snubber. Moreover, the rubber may be shaped to form various patterns, including but not limited to projections such as conical projections or pointed projections, flat treading, or grooved surfaces. It is also to be appreciated that the rubber may form a flat, smooth surface. The damper 240 may also include the biasing mechanism, the platform, and rubber disposed on the platform.

The damper 240 may also assist in ejecting one of the first docking feature 108, the second docking feature 112, and/or the third docking feature 114 from the other(s) of the first docking feature 108, the second docking feature 112, and/or the third docking feature 114. In the implementations where the damper 240 includes the biasing mechanism, the biasing mechanism may assist in exerting a force on the docking feature being ejected. More specifically, the biasing mechanism may move from compressed to relax during ejection of the docking feature. Thus, the damper 240 may further assist in usability of the surgical cart 100.

The surgical cart 100 may be used in a surgical cart system 224, as shown in FIGS. 10-21. More specifically, the surgical cart system 224 may include the surgical cart 100, which is further defined as a first surgical cart 226, and may include a second surgical cart 228. The first surgical cart 226 and the second surgical cart 228 may include any combination of components of the surgical cart 100 as described herein. The surgical cart system 224 may also include a third surgical cart or more surgical carts.

More specifically, in one implementation of the surgical cart system 224 as shown in FIGS. 10-14 and 19-21, the first may include a first base 230, a plurality of wheels 104 coupled to the first base 230 such that the first base 230 is moveable, a first device 106 coupled to the first base 230, and a first docking feature 108 supported with the first device 106. The second surgical cart 228 may include a second base 232 and a second docking feature 112 coupled to the second base 232. The first docking feature 108 of the first surgical cart 226 may be engageable with the second docking feature 112 of the second surgical cart 228 to selectively engage the first docking feature 108 and the second docking feature 112 together. Further, the second surgical cart 228 may include a second plurality of wheels 234 coupled to the second base 232 such that the second base 232 is moveable. Engagement of the first docking feature 108 of the first surgical cart 226 and the second docking feature 112 of the second surgical cart 228 may limit relative movement between the first surgical cart 226 and the second surgical cart 228.

Figure 10:
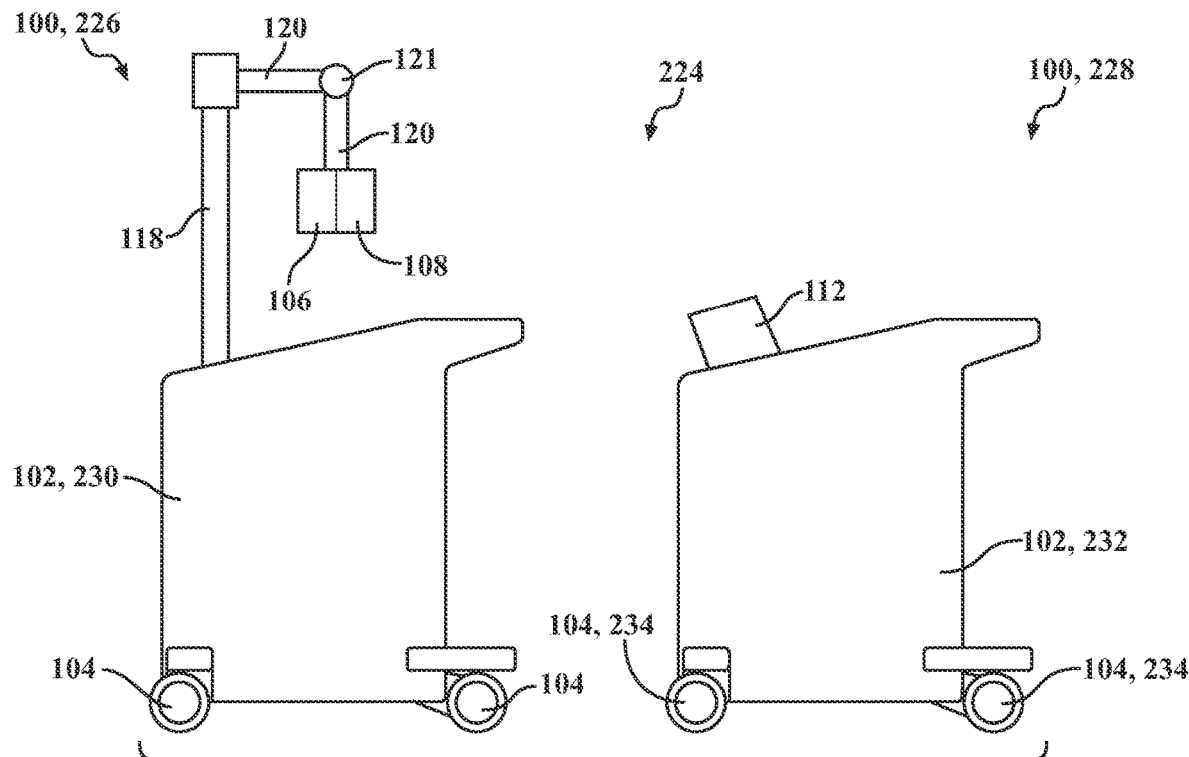
FIG. 10 is a schematic illustration of one implementation of a surgical cart system including a first surgical cart including a first base, a first plurality of wheels, the pillar supporting the first arm, the first docking feature, and the first device, and with the surgical cart system including a second surgical cart including a second base, a second plurality of wheels, and the second docking feature.

As shown in FIG. 10 as a non-limiting example, the first surgical cart 226 may include the pillar 118 supporting the first arm 120, with the first arm 120 supporting the first docking feature 108 and the first device 106. Referring still to FIG. 10, the second surgical cart 228 may include the second base 232 supporting the second docking feature 112.

Figure 11:
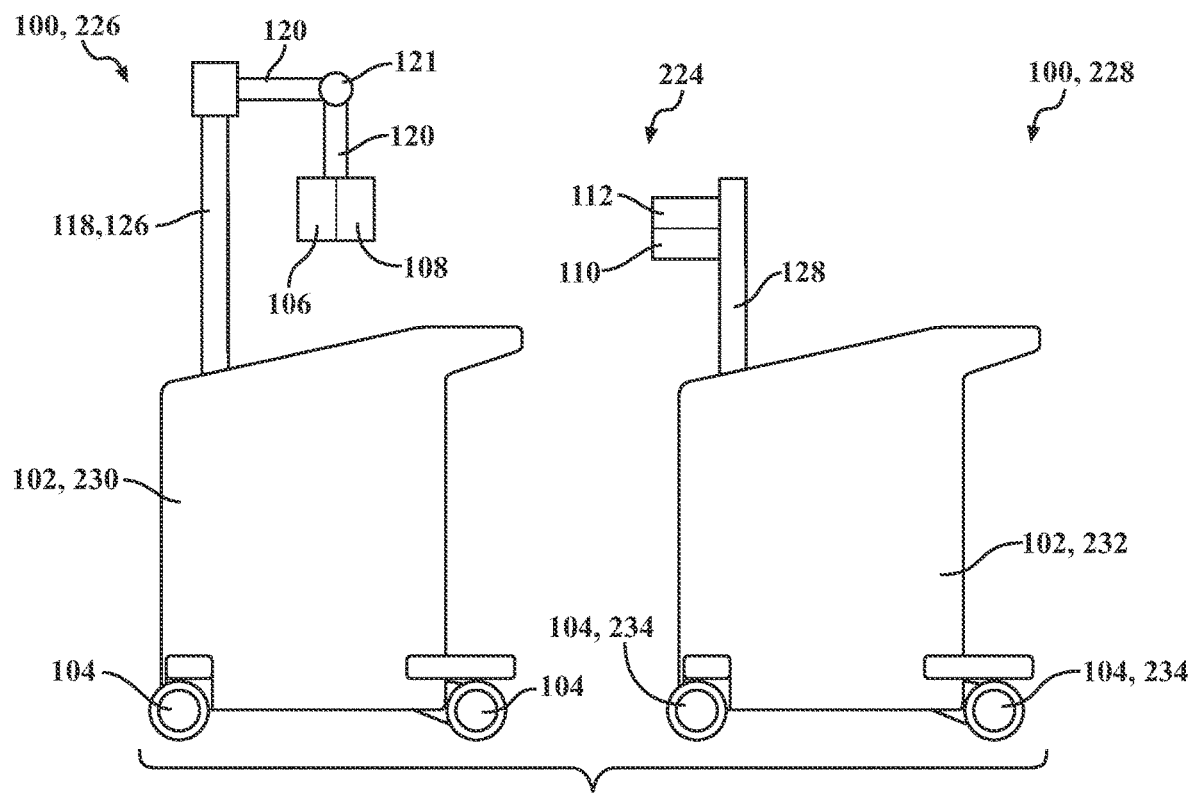
FIG. 11 is a schematic illustration of one implementation of the surgical cart system, with the first surgical cart including the pillar supporting the first arm, the first docking feature, and the first device, and with the second surgical cart including the second pillar supporting the second docking feature and the second device.

Additionally, as shown in FIG. 11 as a non-limiting example, the first surgical cart 226 may include the first pillar 126 supporting the first arm 120, with the first arm 120 supporting the first docking feature 108 and the first device 106. Referring still to FIG. 11, the second surgical cart 228 may include the second pillar 128 supporting the second docking feature 112 and the second device 110.

Figure 12:
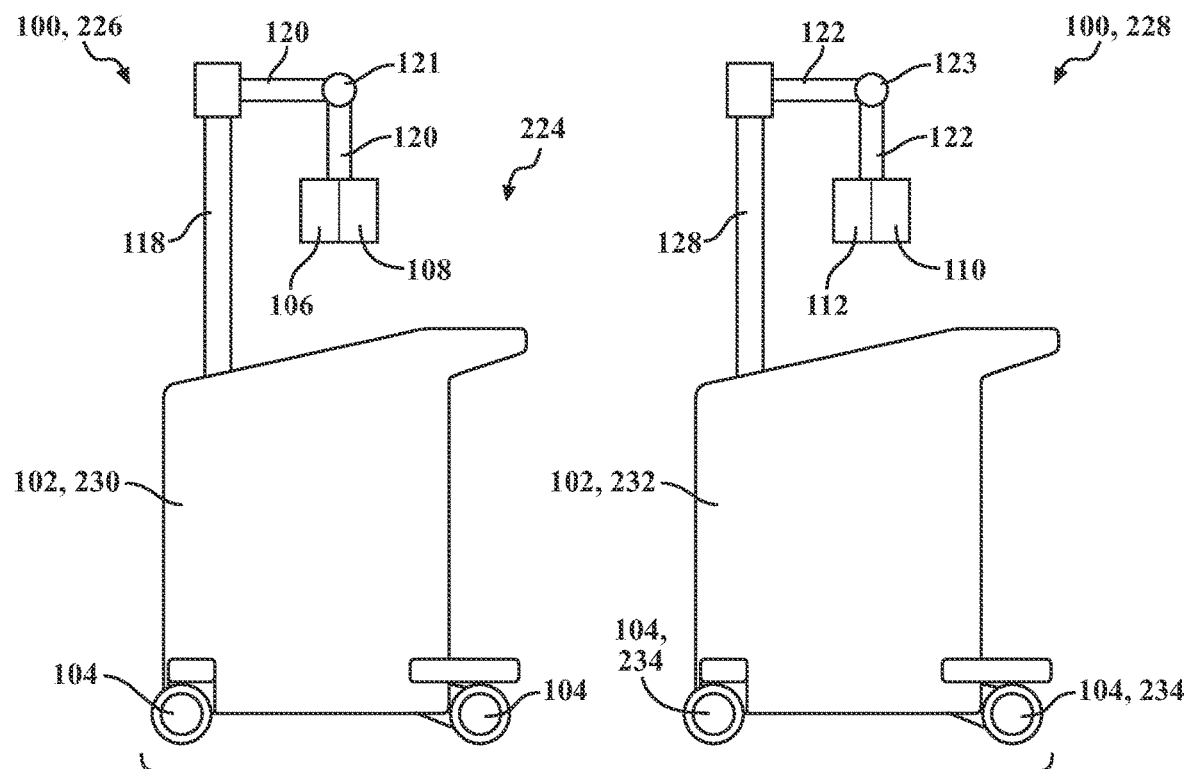
FIG. 12 is a schematic illustration of one implementation of the surgical cart system, with the first surgical cart including the pillar supporting the first arm, the first docking feature, and the first device, and with the second surgical cart including the second pillar supporting the second arm, the second docking feature, and the second device.

Moreover, as shown in FIG. 12 as a non-limiting example, the first surgical cart 226 may include the first pillar 126 supporting the first arm 120, with the first arm 120 supporting the first docking feature 108 and the first device 106. Referring still to FIG. 12, the second surgical cart 228 may include the second pillar 128 supporting the second arm 122, with the second arm 122 supporting the second docking feature 112 and the second device 110.

Further, the first surgical cart 226 may include a third docking feature 114 coupled to the first base 230, as shown in FIGS. 13, 14, and 19-21. The third docking feature 114 may be engageable with the first docking feature 108 and the second docking feature 112 to selectively engage the first docking feature 108, the second docking feature 112, and the third docking feature 114 together. Engagement of the first docking feature 108 of the first surgical cart 226, the second docking feature 112 of the second docking feature 112, and the third docking feature 114 of the third surgical cart may limit relative movement between the first surgical cart 226 and the second surgical cart 228.

Figure 13:
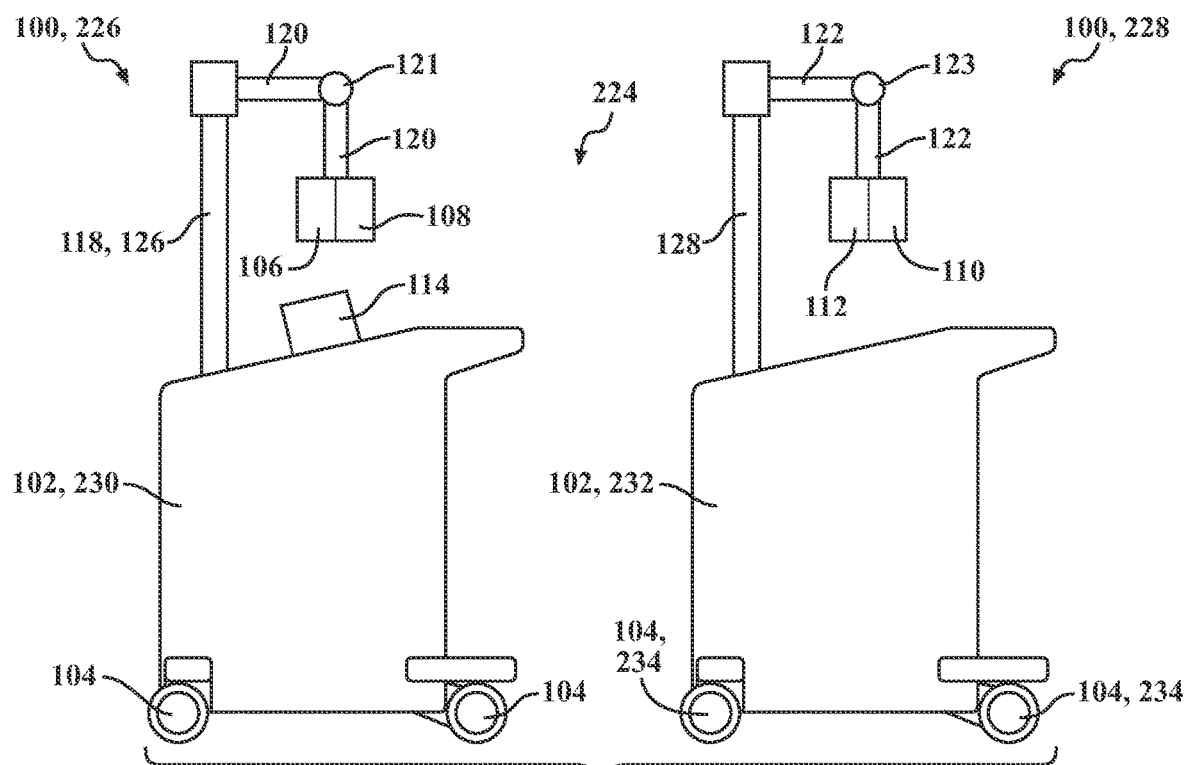
FIG. 13 is a schematic illustration of one implementation of the surgical cart system, with the first surgical cart including the pillar supporting the first arm, the first docking feature, and the first device, with the base of the first surgical cart supporting the third docking feature, and with the second surgical cart including the second pillar supporting the second arm, the second docking feature, and the second device.

As shown in FIG. 13 as a non-limiting example, the first surgical cart 226 may include the first pillar 126 supporting the first arm 120, with the first arm 120 supporting the first docking feature 108 and the first device 106. The first surgical cart 226 may also include the third docking feature 114 supported by the first base 230. Referring still to FIG. 13, the second surgical cart 228 may include the second pillar 128 supporting the second arm 122, with the second arm 122 supporting the second docking feature 112 and the second device 110.

Figure 14:
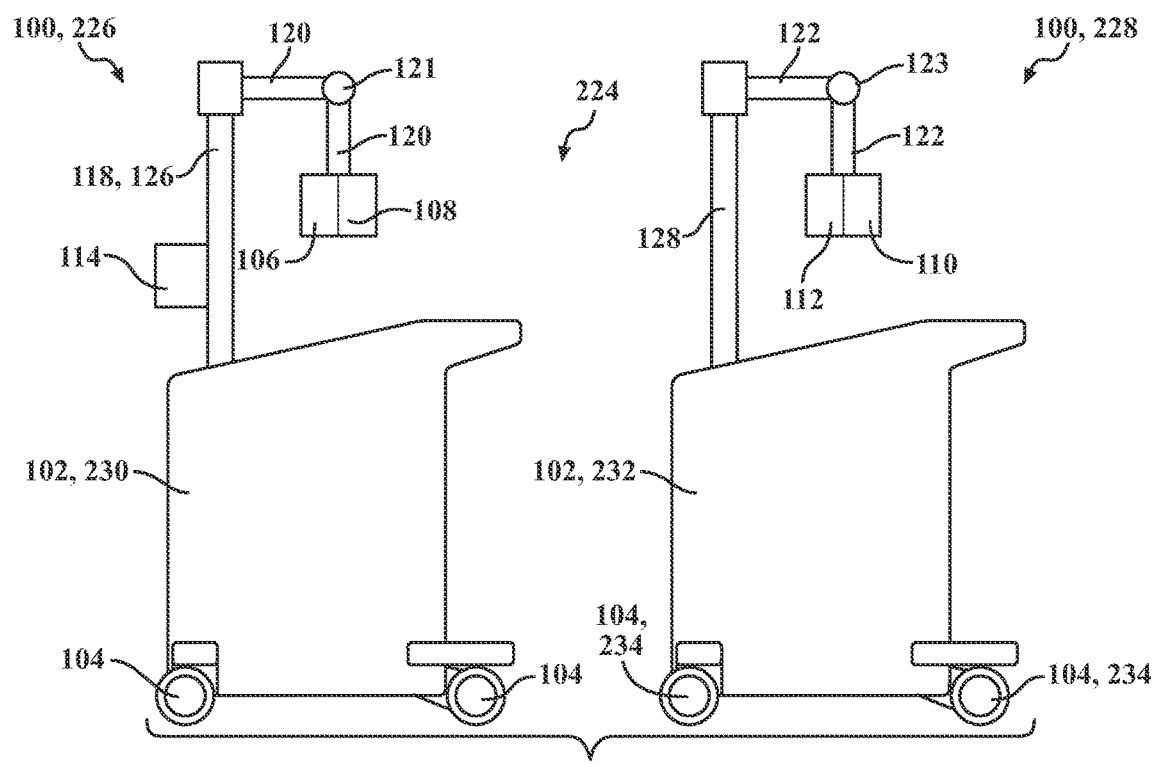
FIG. 14 is a schematic illustration of one implementation of the surgical cart system, with the first surgical cart including the pillar supporting the first arm, the first docking feature, the first device, and the third docking feature, and with the second surgical cart including the second pillar supporting the second arm, the second docking feature, and the second device.

Additionally, as shown in FIG. 14 as a non-limiting example, the first surgical cart 226 may include the first pillar 126 supporting the first arm 120, with the first arm 120 supporting the first docking feature 108 and the first device 106. The first pillar 126 may also support the third docking feature 114. Referring still to FIG. 14, the second surgical cart 228 may include the second pillar 128 supporting the second arm 122, with the second arm 122 supporting the second docking feature 112 and the second device 110.

Figure 19:
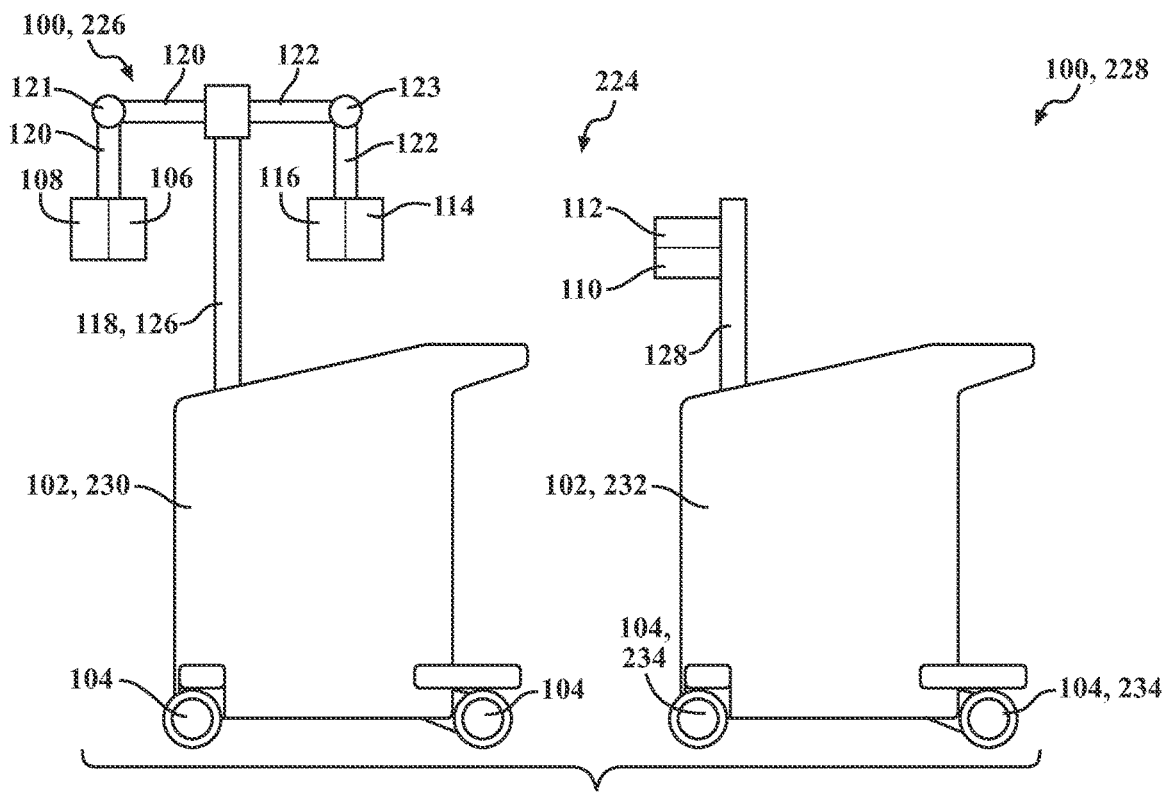
FIG. 19 is a schematic illustration of one implementation of the surgical cart system, with the first surgical cart including the pillar supporting the first arm, the first docking feature, and the first device, and with the pillar supporting the second arm, the third docking feature, and the third device, and with the second surgical cart including the second pillar supporting the second docking feature and the second device.

Moreover, as shown in FIG. 19 as a non-limiting example, the first surgical cart 226 may include the first pillar 126 supporting the first arm 120, with the first arm 120 supporting the first docking feature 108 and the first device 106, and with the first pillar 126 supporting the second arm 122, with the second arm 122 supporting the third docking feature 114 and the third device 116. Referring still to FIG. 19, the second surgical cart 228 may include the second pillar 128, with the second pillar 128 supporting the second docking feature 112 and the second device 110.

Figure 20:
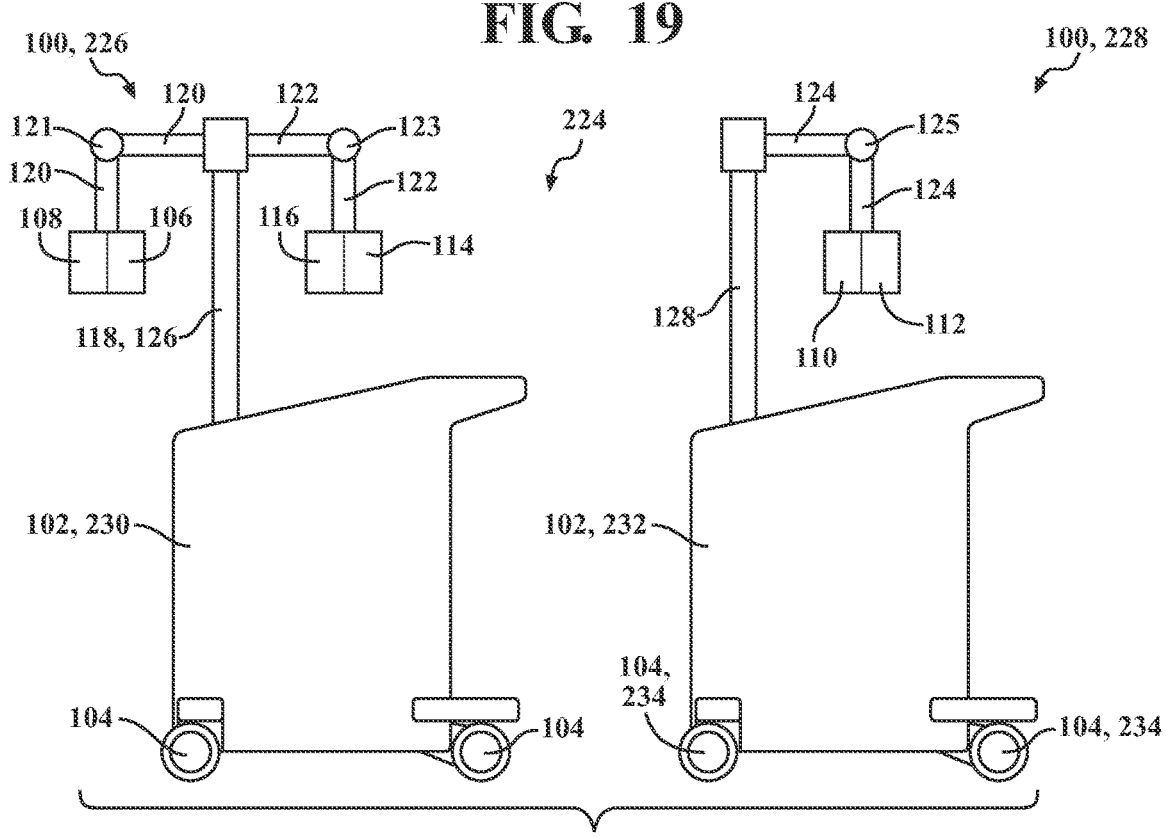
FIG. 20 is a schematic illustration of one implementation of the surgical cart system, with the first surgical cart including the pillar supporting the first arm, the first docking feature, and the first device, and with the pillar supporting the third arm, the third docking feature, and the third device, and with the second surgical cart including the second pillar supporting the second arm, the second docking feature, and the second device.

Further, as shown in FIG. 20 as a non-limiting example, the first surgical cart 226 may include the first pillar 126 supporting the first arm 120, with the first arm 120 supporting the first docking feature 108 and the first device 106, and with the first pillar 126 supporting the second arm 122, with the second arm 122 supporting the third docking feature 114 and the third device 116. Referring still to FIG. 20, the second surgical cart 228 may include the second pillar 128 supporting the third arm 124, with the third arm 124 supporting the second docking feature 112 and the second device 110.

Figure 21:
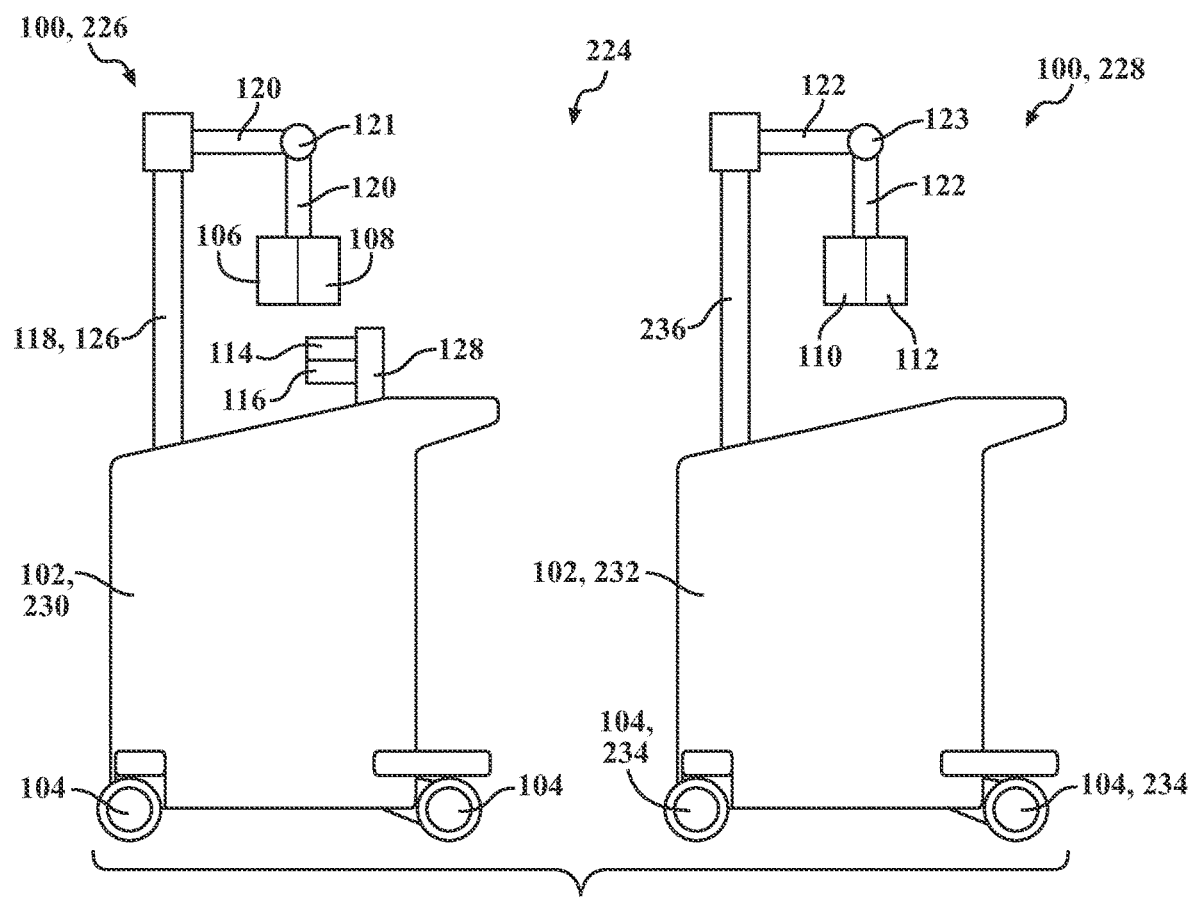
FIG. 21 is a schematic illustration of one implementation of the surgical cart system, with the first surgical cart including the pillar supporting the first arm, the first docking feature, and the first device, with the first surgical cart including the third pillar supporting the third docking feature and the third device, and with the second surgical cart including the second pillar supporting the second arm, the second docking feature, and the second device.

Even further, as shown in FIG. 21 as a non-limiting example, the first surgical cart 226 may include the first pillar 126 supporting the first arm 120, with the first arm 120 supporting the first docking feature 108 and the first device 106. The first surgical cart 226 may also include the second pillar 128, with the second pillar 128 supporting the third docking feature 114 and the third device 116. Referring still to FIG. 21, the second surgical cart 228 may include the third pillar 236 supporting the second arm 122, with the second arm 122 supporting the second docking feature 112 and the second device 110.

In another implementation of the surgical cart system 224, as shown in FIGS. 15-18, the first surgical cart 226 may include a first base 230, a plurality of wheels coupled to the first base 230 such that the first base 230 is moveable, a first device 106 coupled to the first base 230, and a first docking feature 108 supported with the first device 106. The first surgical cart 226 may also include a second device 110 coupled to the first base 230, and a second docking feature 112 supported with the second device 110. The second surgical cart 228 may include a second base 232 and a third docking feature 114 coupled to the second base 232. The third docking feature 114 may be engageable with the first docking feature 108 and the second docking feature 112 to selectively engage the first docking feature 108, the second docking feature 112, and the third docking feature 114 together. Further, the second surgical cart 228 may include a second plurality of wheels 234 coupled to the second base 232 such that the second base 232 is moveable. Engagement of the first docking feature 108 of the first surgical cart 226 and the second docking feature 112 of the second surgical cart 228 may limit relative movement between the first surgical cart 226 and the second surgical cart 228.

Figure 15:
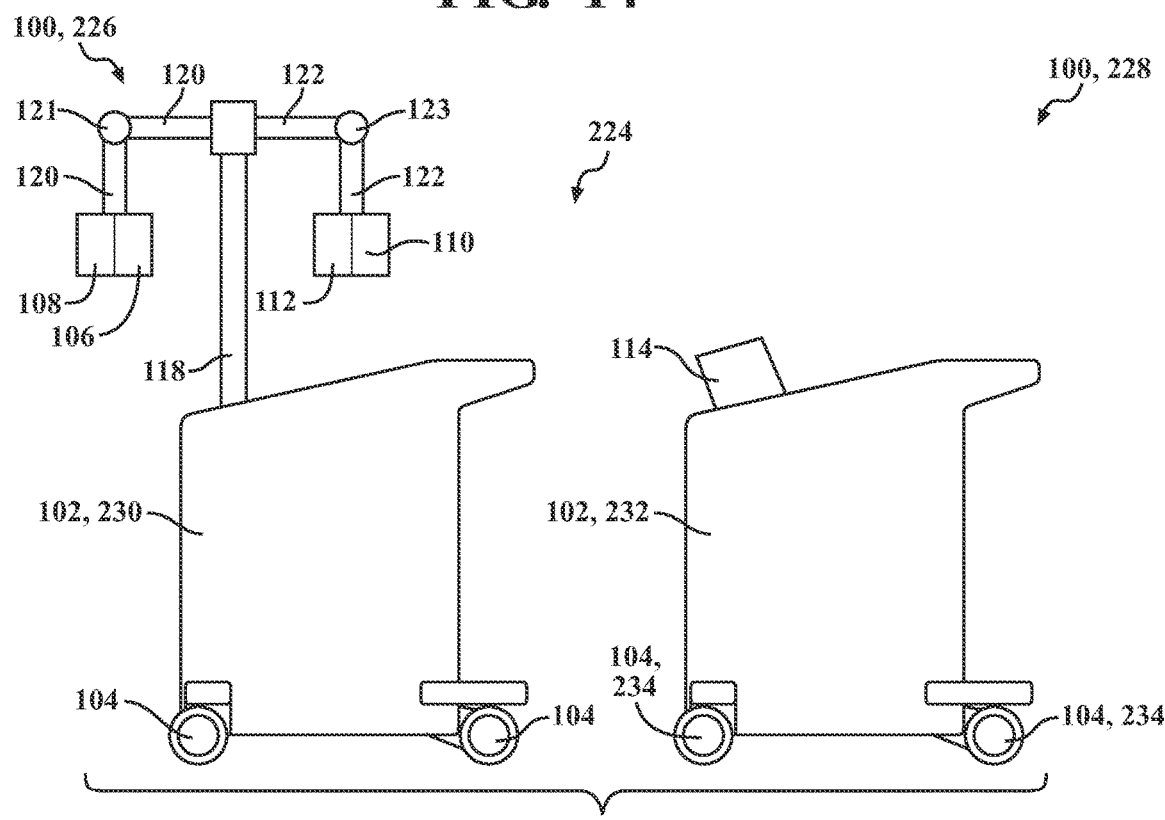
FIG. 15 is a schematic illustration of one implementation of the surgical cart system, with the first surgical cart including the pillar supporting the first arm, the first docking feature, and the first device, and with the pillar supporting the second arm, the second docking feature, and the second device, and with the base of the second surgical cart supporting the third docking feature.

As shown in FIG. 15 as a non-limiting example, the first surgical cart 226 may include the pillar 118 supporting the first arm 120, with the first arm 120 supporting the first docking feature 108 and the first device 106, and with the pillar 118 supporting the second arm 122, with the second arm 122 supporting the second docking feature 112 and the second device 110. Referring still to FIG. 15, the second surgical cart 228 may include the second base 232 supporting the third docking feature 114.

Figure 16:
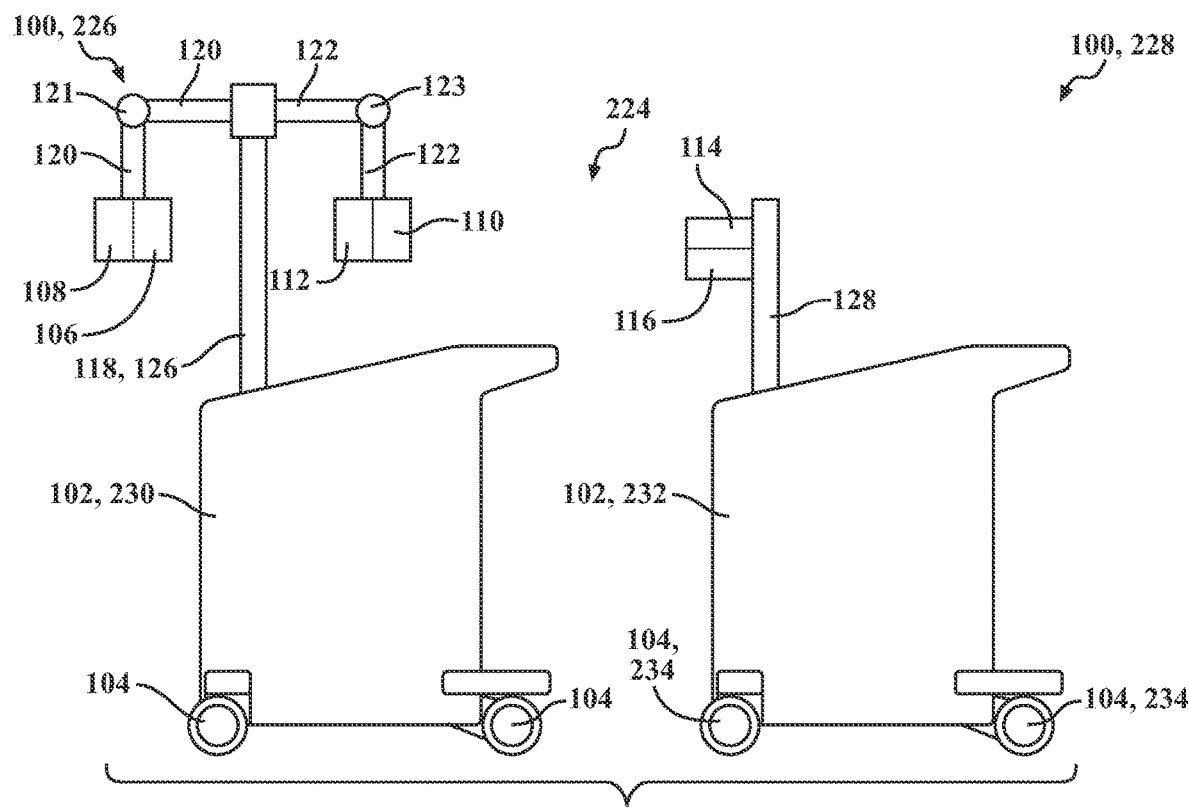
FIG. 16 is a schematic illustration of one implementation of the surgical cart system, with the first surgical cart including the pillar supporting the first arm, the first docking feature, and the first device, and with the pillar supporting the second arm, the second docking feature, and the second device, and with the second surgical cart including the second pillar supporting the third docking feature and the third device.

Additionally, as shown in FIG. 16 as a non-limiting example, the first surgical cart 226 may include the first pillar 126 supporting the first arm 120, with the first arm 120 supporting the first docking feature 108 and the first device 106, and with the first pillar 126 supporting the second arm 122, with the second arm 122 supporting the second docking feature 112 and the second device 110. Referring still to FIG. 16, the second surgical cart 228 may include the second pillar 128 supporting the third docking feature 114 and a third device 116.

Figure 17:
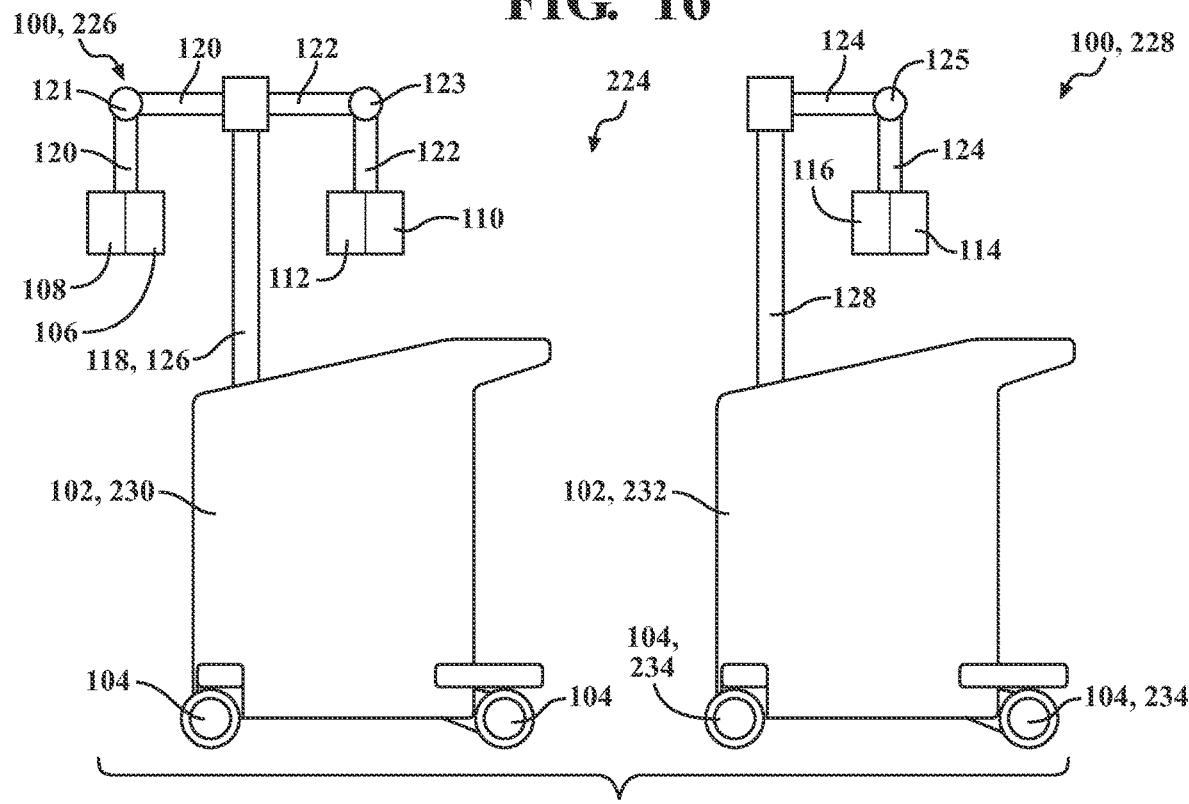
FIG. 17 is a schematic illustration of one implementation of the surgical cart system, with the first surgical cart including the pillar supporting the first arm, the first docking feature, and the first device, and with the pillar supporting the second arm, the second docking feature, and the second device, and with the second surgical cart including the second pillar supporting the third arm, the third docking feature, and the third device.

Moreover, as shown in FIG. 17 as a non-limiting example, the first surgical cart 226 may include the first pillar 126 supporting the first arm 120, with the first arm 120 supporting the first docking feature 108 and the first device 106, and with the first pillar 126 supporting the second arm 122, with the second arm 122 supporting the second docking feature 112 and the second device 110. Referring still to FIG. 17, the second surgical cart 228 may include a second pillar 128 supporting a third arm 124, with the third arm 124 supporting the third docking feature 114 and a third device 116.

Figure 18:
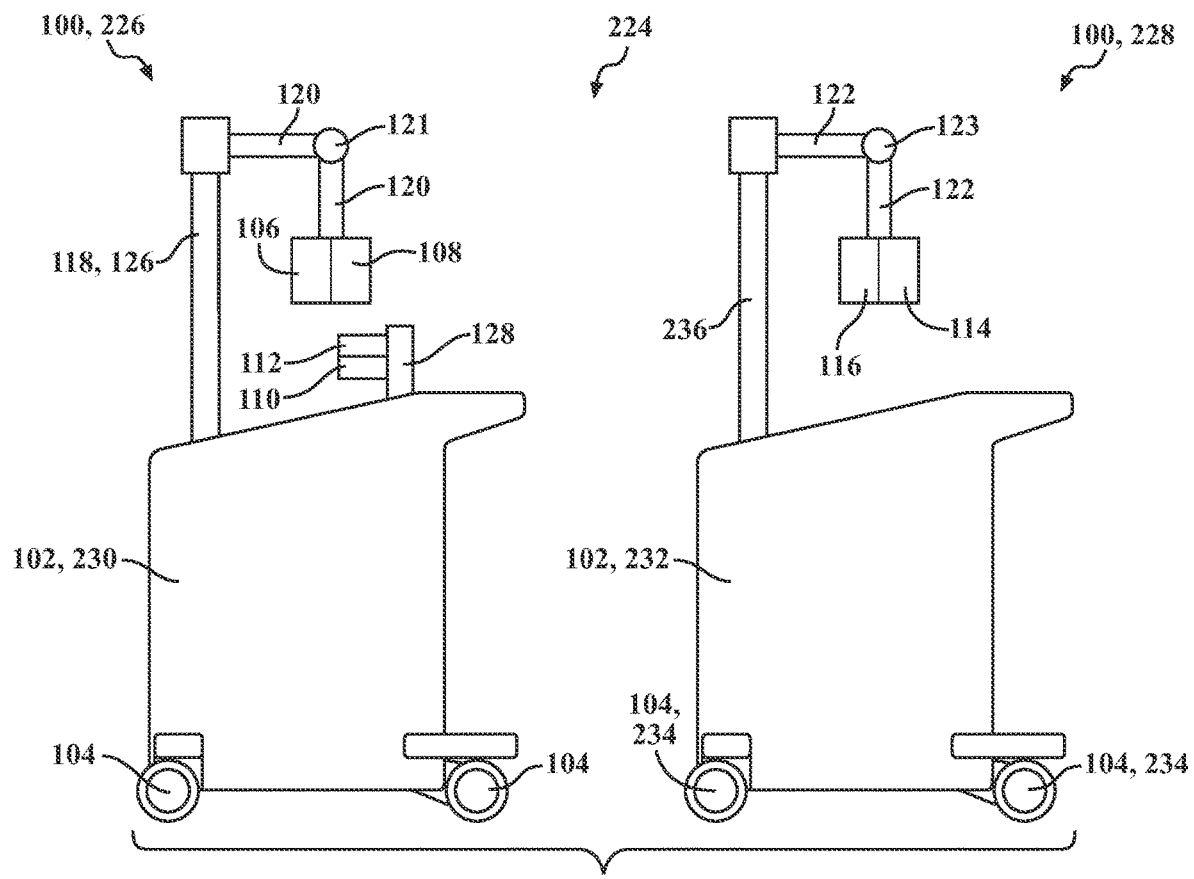
FIG. 18 is a schematic illustration of one implementation of the surgical cart system, with the first surgical cart including the pillar supporting the first arm, the first docking feature, and the first device, and with the first surgical cart including the second pillar supporting the second docking feature and the second device, and with the second surgical cart including a third pillar supporting the third arm, the third docking feature, and the third device.

Further, as shown in FIG. 18 as a non-limiting example, the first surgical cart 226 may include the first pillar 126 supporting the first arm 120, with the first arm 120 supporting the first docking feature 108 and the first device 106. The first surgical cart 226 may also include the second pillar 128, with the second pillar 128 supporting the second docking feature 112 and the second device 110. Referring still to FIG. 18, the second surgical cart 228 may include a third pillar 236 supporting the second arm 122, with the second arm 122 supporting the third docking feature 114 and the third device 116.

The first surgical cart 226 and the second surgical cart 228 of the surgical cart systems 224 shown in FIGS. 10-21 may include any of the configurations of the surgical carts 100 shown in FIGS. 1-9. Additionally, the first docking feature 108, the second docking feature 112, and/or the third docking feature 114 of FIGS. 10-21 may include any of the components as shown in FIGS. 22-33. Moreover, the first device 106, the second device 110, and/or the third device 116 of FIGS. 10-21 may include any of the components of FIGS. 34A-37.

A method of securing components of the surgical cart 100 is also provided. The method includes the step of inserting the handle assembly 156 into the holster 196, as shown between FIGS. 29A, 29B, and 30B, and the step of inserting the camera handle 148 into the slot 174 collectively defined by the holster 196 and the handle assembly 156, as shown between FIGS. 30B and 31. The method may also include the step of engaging the locking mechanism 142 of the holster 196 to the camera handle 148 to selectively secure the camera handle 148 and the handle assembly 156 to the holster 196, as shown between FIGS. 32 and 33.

Another method of securing components of the surgical cart 100 is also provided. The method includes the step of inserting the camera handle 148 into the slot 174 defined by the handle assembly 156 to secure the camera handle 148 to the handle assembly 156, as shown between FIGS. 29A, 29B, and 30A, and the step of inserting the camera handle 148 and the handle assembly 156, in combination, into the holster 196, as shown between FIGS. 30A and 31. The method may also include the step of engaging the locking mechanism 142 of the holster 196 to the camera handle 148 to selectively secure the camera handle 148 and the handle assembly 156 to the holster 196, as shown between FIGS. 32 and 33.

Yet another method of securing components of the surgical cart 100 is provided. The method includes the step of nesting the handle assembly 156 and the camera handle 148 together, as shown between FIGS. 29A, 29B, and 30B, and the step of inserting the nested handle assembly 156 and the camera handle 148 into the holster 196, as shown between FIGS. 30B and 31. The method may further include the step of engaging the locking mechanism 142 of the holster 196 to the handle assembly 156 to selectively secure the camera handle 148 and the handle assembly 156 to the holster 196, as shown between FIGS. 32 and 33.

Further, another method of securing components of the surgical cart 100 is provided. The method includes the step of inserting the camera handle 148 into the holster 196 and the step of inserting the handle assembly 156 into the slot 174 collectively defined by the holster 196 and the camera handle 148. The method may also include the step of engaging the locking mechanism of the holster 196 to the handle assembly 156 to selectively secure the camera handle 148 and the handle assembly 156 to the holster 196.

Further still, another method of securing components of the surgical cart 100 is provided. The method includes the step of engaging the first docking feature 108 with the second docking feature 112, as shown throughout between FIGS. 22-31, and the step of moving the plunger 144 between the first plunger position where the first docking feature 108 and the second docking feature 112 are secured together, as shown in FIG. 32, and the second plunger position where the first docking feature 108 is disengageable from the second docking feature 112, as shown in FIG. 33.

The foregoing description is not intended to be exhaustive or limit the invention to any particular form. The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:
1. A surgical cart comprising:
a base;
a plurality of wheels coupled to the base such that the base is moveable;
a first device coupled to the base and moveable relative to the base;
a first docking feature coupled to the first device and moveable with the first device relative to the base;
a second device coupled to the base and moveable relative to the base; and a second docking feature coupled to the second device and moveable with the second device relative to the base;

a third device coupled to the base;

a third docking feature coupled to the third device;

wherein the first docking feature is engageable with the second docking feature to selectively couple the first device and the second device together, and wherein the third docking feature is engageable with the first docking feature and the second docking feature to selectively engage the first docking feature, the second docking feature, and the third docking feature together.

2. The surgical cart of claim 1, wherein engagement of the first docking feature, the second docking feature, and the third docking feature limits relative movement between the first device and the base, limits relative movement between the second device and the base, and limits relative movement between the third device and the base.

3. The surgical cart of claim 1 further comprising a pillar extending from the base, wherein pillar supports the first device and the first docking feature, and further comprising a first arm supported by the pillar, wherein the first arm supports the first device, and wherein the first docking feature is supported by at least one chosen from the first arm and the first device.

4. The surgical cart of claim 3 further comprising a second arm supported by the pillar, wherein the second arm supports the second device, and wherein the second docking feature is supported by at least one chosen from the second arm and the second device.

5. The surgical cart of claim 3, wherein the pillar is further defined as a first pillar, and further comprising a second pillar extending from the base and spaced from the first pillar, wherein the third device is supported by the second pillar and the third docking feature is supported by at least one chosen from the third device and the second pillar.

6. The surgical cart of claim 3, wherein the pillar is further defined as a first pillar, and further comprising a second pillar extending from the base and spaced from the first pillar, and wherein the second device and the second docking feature are supported by the second pillar.

7. The surgical cart of claim 1, wherein the first device is at least one of: a surgical monitor, a navigation camera, a localizer, a surgical tracker, a cart tracker, a robotic arm, and an end effector, wherein the second device is at least one of: a surgical monitor, a navigation camera, a localizer, a surgical tracker, a cart tracker, a robotic arm, and an end effector, and wherein the third device is at least one of: a surgical monitor, a navigation camera, a localizer, a surgical tracker, a cart tracker a robotic arm, and an end effector.

8. The surgical cart of claim 1, wherein one of the first docking feature and the second docking feature is a pole handle extending longitudinally from a first pole end to a second pole end, wherein the pole handle defines an indentation, and wherein the other of the first docking feature and the second docking feature is a handle assembly, the handle assembly comprising:

a shaft extending along a shaft axis between a proximal shaft end and a distal shaft end spaced from the proximal shaft end along the shaft axis, and a graspable component coupled to the proximal shaft end of the shaft, the graspable component extending radially away from the shaft axis.

9. The surgical cart of claim 8, wherein:

the shaft includes, a first shaft arm extending axially from the proximal shaft end, and a second shaft arm spaced from the first shaft arm and extending axially from the proximal shaft end, and wherein the graspable component includes, a first handle portion coupled to the first shaft arm, and a second handle portion coupled to the second shaft arm, and wherein a slot is collectively defined by the first shaft arm, the second shaft arm, the first handle portion, and the second handle portion, and wherein the slot is configured to receive the pole handle to engage the handle assembly and the pole handle.

10. The surgical cart of claim 9, wherein each of the first handle portion and the second handle portion extend radially with respect to the shaft axis.

11. The surgical cart of claim 9, wherein the handle assembly further includes a connection portion extending between the first handle portion and the second handle portion, and wherein the slot is further defined by the connection portion, and wherein the first handle portion, the second handle portion, and the connection portion collectively define an opening through which the pole handle is exposed.

12. The surgical cart of claim 8, further comprising a locking mechanism configured to selectively secure the pole handle and the handle assembly, wherein the locking mechanism includes:

a plunger couplable to one of the pole handle and the handle assembly, with the plunger moveable between, a first plunger position in which the pole handle and the handle assembly are secured together, and a second plunger position in which the pole handle is disengageable from the handle assembly, and wherein the indentation of the pole handle is configured to receive the plunger to selectively secure the pole handle and the handle assembly together.

13. The surgical cart of claim 12, wherein the plunger is configured to move between the second plunger position and the first plunger position upon engagement of the first docking feature and the second docking feature.

14. The surgical cart of claim 1, wherein one of the first docking feature and the second docking feature is a holster defining a holster interior, wherein the other of the first docking feature and the second docking feature is disposable in the holster interior of the holster to engage the holster and the other of the first docking feature and the second docking feature.

15. The surgical cart of claim 14, wherein the holster has a first wall, a second wall extending away from the first wall, a third wall opposite from the second wall and extending away from the first wall, and a fourth wall opposite from the first wall and extending in part from the second wall and in part from the third wall, wherein the first, second, third, and fourth walls collectively define the holster interior, wherein the fourth wall defines a gap, and wherein at least a portion of one of the first docking feature and the second docking feature is configured to extend through the gap when disposed in the holster interior of the holster.

16. The surgical cart of claim 15, wherein the other of the first docking feature and the second docking feature is a handle assembly, the handle assembly comprising:

a shaft extending along a shaft axis between a proximal shaft end and a distal shaft end spaced from the proximal shaft end along the shaft axis, and a graspable component coupled to the proximal shaft end of the shaft, the graspable component extending radially away from the shaft axis, wherein at least a portion of the graspable component is disposable in the holster interior, and wherein at least a portion of the shaft is disposable in the gap defined by the fourth wall.

17. The surgical cart of claim 16, wherein the graspable component includes:

a first handle portion coupled to the shaft, and a second handle portion coupled to the shaft, and wherein at least a portion of the first handle portion and at least a portion of the second handle portion are disposable in the holster interior, and wherein the first and second handle portions each comprise a tapered handle edge and the holster defines a tapered holster edge in the holster interior that is shaped to correspond to the tapered handle edges.

18. The surgical cart of claim 14, wherein one of the first device and the second device is a surgical monitor having a monitor screen and a back panel opposite the monitor screen, and wherein the holster is fixed to the back panel of the surgical monitor.

19. The surgical cart of claim 1 further comprising a damper disposable between the first docking feature and the second docking feature and configured to dampen movement between the first docking feature and the second docking feature.

20. The surgical cart of claim 1 further comprising a damper disposable between the third docking feature and one of the first docking feature and the second docking feature, wherein the damper is configured to dampen movement between the third docking feature and one of the first docking feature and the second docking feature.

* * * * *